United States Patent
Yang et al.

(10) Patent No.: US 9,721,140 B2
(45) Date of Patent: Aug. 1, 2017

(54) SENSING METHOD OF FINGERPRINT SENSOR AND RELATED SENSING CIRCUIT

(71) Applicant: ELAN MICROELECTRONICS CORPORATION, HsinChu (TW)

(72) Inventors: Chao-Chi Yang, Hsinchu (TW); Jui-Che Lin, Miaoli County (TW)

(73) Assignee: ELAN MICROELECTRONICS CORPORATION, HsinChu (TW)

(*) Notice: Subject to any disclaimer, the term of this patent is extended or adjusted under 35 U.S.C. 154(b) by 4 days.

(21) Appl. No.: 15/044,086

(22) Filed: Feb. 15, 2016

(65) Prior Publication Data

US 2016/0239700 A1    Aug. 18, 2016

Related U.S. Application Data

(60) Provisional application No. 62/116,885, filed on Feb. 16, 2015.

(51) Int. Cl.
G06K 9/00    (2006.01)

(52) U.S. Cl.
CPC ....... *G06K 9/0002* (2013.01); *G06K 9/00053* (2013.01)

(58) Field of Classification Search
CPC .......................... G06K 9/0002; G06K 9/00053
See application file for complete search history.

(56) References Cited

U.S. PATENT DOCUMENTS

| 6,882,164 | B2 * | 4/2005 | Yano | G06K 9/00087 324/663 |
|---|---|---|---|---|
| 2003/0174871 | A1 * | 9/2003 | Yoshioka | G06K 9/00087 382/124 |
| 2005/0024065 | A1 * | 2/2005 | Umeda | G06K 9/0002 324/663 |
| 2011/0298479 | A1 * | 12/2011 | Matsushima | G06F 3/044 324/658 |
| 2012/0274340 | A1 * | 11/2012 | Yang | G01R 17/02 324/680 |
| 2012/0280700 | A1 * | 11/2012 | Yang | G01R 27/2605 324/679 |
| 2015/0233989 | A1 * | 8/2015 | Chou | G01R 27/2605 345/174 |
| 2016/0092713 | A1 * | 3/2016 | Wu | G06K 9/0002 382/124 |
| 2016/0171272 | A1 * | 6/2016 | Yang | G06K 9/0002 324/679 |

(Continued)

*Primary Examiner* — Aaron W Carter
(74) *Attorney, Agent, or Firm* — Winston Hsu

(57) ABSTRACT

A sensing method of a fingerprint sensor includes the following steps: (a) applying a first voltage, a second voltage and a third voltage to a first node connected to an electrode plate to be measured, a second node disconnected from the first node, and a conductor adjacent to the electrode plate to be measured, respectively; (b) providing a first finger drive voltage for a finger; (c) stopping applying the first, second and third voltages to the first node, the second node and the conductor, respectively; (d) after step (c), applying a fourth voltage to the conductor, and connecting the first node to the second node; (e) after steps (b) and (c), providing a second finger drive voltage for the finger; and (f) after steps (d) and (e), obtaining a measurement result of the electrode plate to be measured according to a signal on the second node.

19 Claims, 38 Drawing Sheets

(56) References Cited

U.S. PATENT DOCUMENTS

2016/0188948 A1* 6/2016 Yang .................... G06K 9/0002
                                                          382/124
2016/0188949 A1* 6/2016 Yang .................... G06K 9/0002
                                                          382/124
2016/0239700 A1* 8/2016 Yang .................... G06K 9/0002
2016/0275332 A1* 9/2016 Lin ...................... G06K 9/0002
2016/0307019 A1* 10/2016 Zhang ................. G06K 9/0002
2016/0350577 A1* 12/2016 Yang ................. G06K 9/00053
2017/0046551 A1* 2/2017 Lee ..................... G06K 9/0002
2017/0046555 A1* 2/2017 Lee ..................... G06K 9/0002

* cited by examiner

SENSING METHOD OF FINGERPRINT SENSOR AND RELATED SENSING CIRCUIT

CROSS REFERENCE TO RELATED APPLICATIONS

This application claims the benefit of U.S. provisional application No. 62/116,885, filed on Feb. 16, 2015, the contents of which are incorporated herein by reference.

BACKGROUND OF THE INVENTION

1. Field of the Invention

The disclosed embodiments of the present invention relate to fingerprint sensing, and more particularly, to a sensing method of a fingerprint sensor and a related sensing circuit.

2. Description of the Prior Art

A conventional projective capacitive fingerprint sensor obtains a fingerprint pattern of a finger according to an amount of capacitance between an electrode plate and the finger. However, parasitic capacitance of the electrode plate affects a measurement result of the electrode plate, resulting in difficulties in distinguishing between ridges and valleys of a fingerprint.

Thus, there is a need for a novel fingerprint sensing scheme to increase accuracy of fingerprint identification/recognition.

SUMMARY OF THE INVENTION

It is therefore one objective of the present invention to provide a sensing method of a fingerprint sensor, and a related sensing circuit to solve the above problems.

According to an embodiment of the present invention, an exemplary sensing method of a fingerprint sensor is disclosed. The sensing method is used for sensing a capacitance between an electrode plate to be measured of the fingerprint sensor and a finger. The sensing method comprises the following steps: (a) applying a first voltage to a first node connected to the electrode plate to be measured, applying a second voltage different from the first voltage to a second node disconnected from the first node, and applying a third voltage to a conductor adjacent to the electrode plate to be measured; (b) providing a first finger drive voltage for the finger; (c) stopping applying the first voltage, the second voltage and the third voltage to the first node, the second node and the conductor respectively; (d) after step (c), applying a fourth voltage different from the third voltage to the conductor, and connecting the first node to the second node; (e) after steps (b) and (c), providing a second finger drive voltage different from the first finger drive voltage for the finger; and (f) after steps (d) and (e), obtaining a measurement result of the electrode plate to be measured according to a signal on the second node. The first voltage is greater than the second voltage, the third voltage is greater than the fourth voltage, and the first finger drive voltage is less than the second finger drive voltage; or the first voltage is less than the second voltage, the third voltage is less than the fourth voltage, and the first finger drive voltage is greater than the second finger drive voltage.

According to an embodiment of the present invention, an exemplary sensing circuit for sensing a capacitance between an electrode plate to be measured of a fingerprint sensor and a finger is disclosed. The sensing circuit comprises a first switch unit, a second switch unit, a third switch unit, a readout circuit and a control unit. The first switch unit comprises a first node and a second node. The first node is connected to the electrode plate to be measured. In a first phase, the first node is coupled to a first voltage, the second node is coupled to a second voltage different from the first voltage, and the first node is disconnected from the second node; and in a second phase, the first node is disconnected from the first voltage, the second node is uncoupled to the second voltage, and the first node is connected to the second node. Additionally, in the first phase, the second switch unit couples a third voltage to a conductor adjacent to the electrode plate to be measured; and in the second phase, the second switch unit couples a fourth voltage different from the third voltage to the conductor. Further, in the first phase, the third switch unit couples a first finger drive voltage to a finger drive electrode; and in the second phase, the third switch unit couples a second finger drive voltage different from the first finger drive voltage to the finger drive electrode, wherein the finger drive electrode is arranged for coupling the finger. The readout circuit is coupled to the second node of the first switch unit, and is arranged for reading out a measurement result of the electrode plate to be measured according to a signal on the second node. The control unit is arranged for controlling operations of the first switch unit, the second switch unit and the third switch unit in the first phase and the second phase. The first voltage is greater than the second voltage, the third voltage is greater than the fourth voltage, and the first finger drive voltage is less than the second finger drive voltage; or the first voltage is less than the second voltage, the third voltage is less than the fourth voltage, and the first finger drive voltage is greater than the second finger drive voltage.

These and other objectives of the present invention will no doubt become obvious to those of ordinary skill in the art after reading the following detailed description of the preferred embodiment that is illustrated in the various figures and drawings.

DETAILED DESCRIPTION

In the following paragraphs, for the sake of brevity, switches $SW_{1A}$-$SW_{1D}$ represent switches $SW_{1A}$, $SW_{1B}$, $SW_{1C}$ and $SW_{1D}$, switches $SW_{1A}$-$SW_{3A}$ represent switches $SW_{1A}$, $SW_{2A}$ and $SW_{3A}$, and so on. A person skilled in the art should readily understand the meanings of other terms, such as switches $SW_{2A}$-$SW_{2D}$ and switches $SW_{1B}$-$SW_{3B}$, according to drawings and associated description provided below.

The proposed fingerprint sensing scheme may provide different finger drive voltages for a finger, and provide different voltages for a conductor adjacent to an electrode plate to be measured of a fingerprint sensor in different phases, wherein the conductor may be an electrode for fingerprint sensing, an electrostatic discharge (ESD) protection electrode, or a shielding plate for providing electrical shielding for the electrode plate to be measured.

Figure 1:
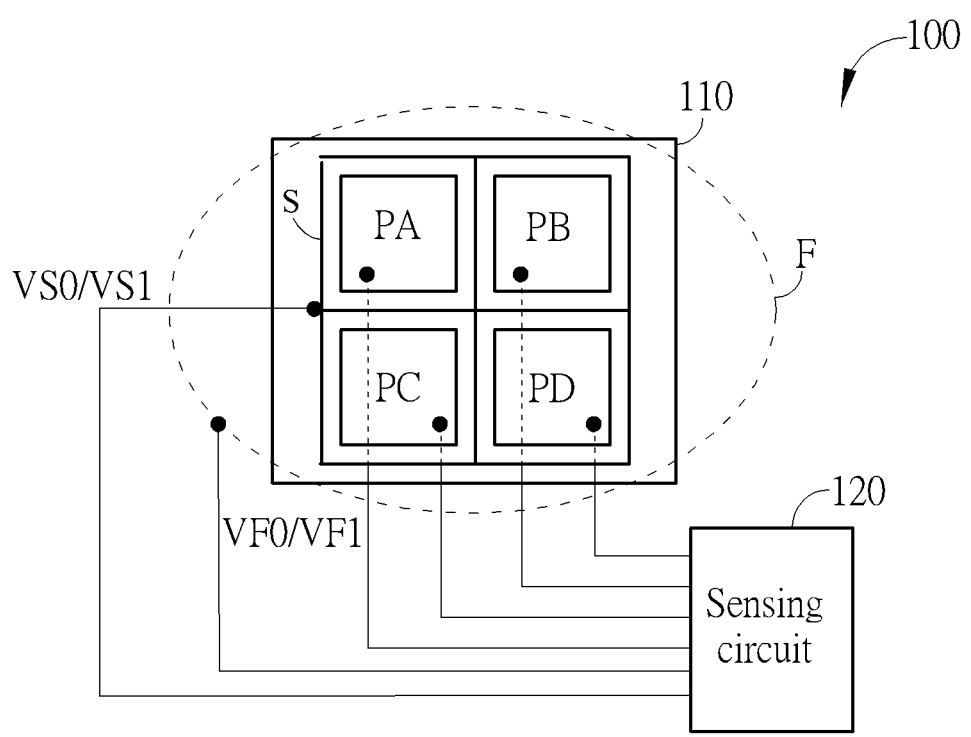
FIG. 1 is a diagram illustrating an exemplary fingerprint sensor according to an embodiment of the present invention.

Please refer to FIG. 1, which is a diagram illustrating an exemplary fingerprint sensor according to an embodiment of the present invention. The fingerprint sensor 100 may include, but is not limited to, a sensor surface 110, a plurality of electrodes PA-PD, a protection electrode S and a sensing circuit 120, wherein the protection electrode S is adjacent to the electrode plates PA-PD and is arranged for ESD protection. When a finger F touches or approaches the sensor surface 110, the sensing circuit 120 may sense a capacitance between the finger F and each electrode plate (an induced capacitance) to thereby identify a fingerprint pattern of the finger F. For the sake of brevity, only four electrode plates PA-PD are illustrated in FIG. 1. However, this is not meant to be a limitation of the number of electrode plates and the arrangement of electrode plates of the proposed fingerprint sensor.

In this embodiment, when the finger F touches or approaches the sensor surface 110, the sensing circuit 120 may provide different finer drive voltages (e.g. voltages VF0 and VF1) for the finger F. The sensing circuit 120 may selectively couple different voltages (e.g. voltages VS0 and VS1) to the protection electrode S in order to reduce a fringe/parasitic capacitance between the electrode plate to be measured (one of the electrode plates PA-PD) and the protection electrode S.

Figure 2:
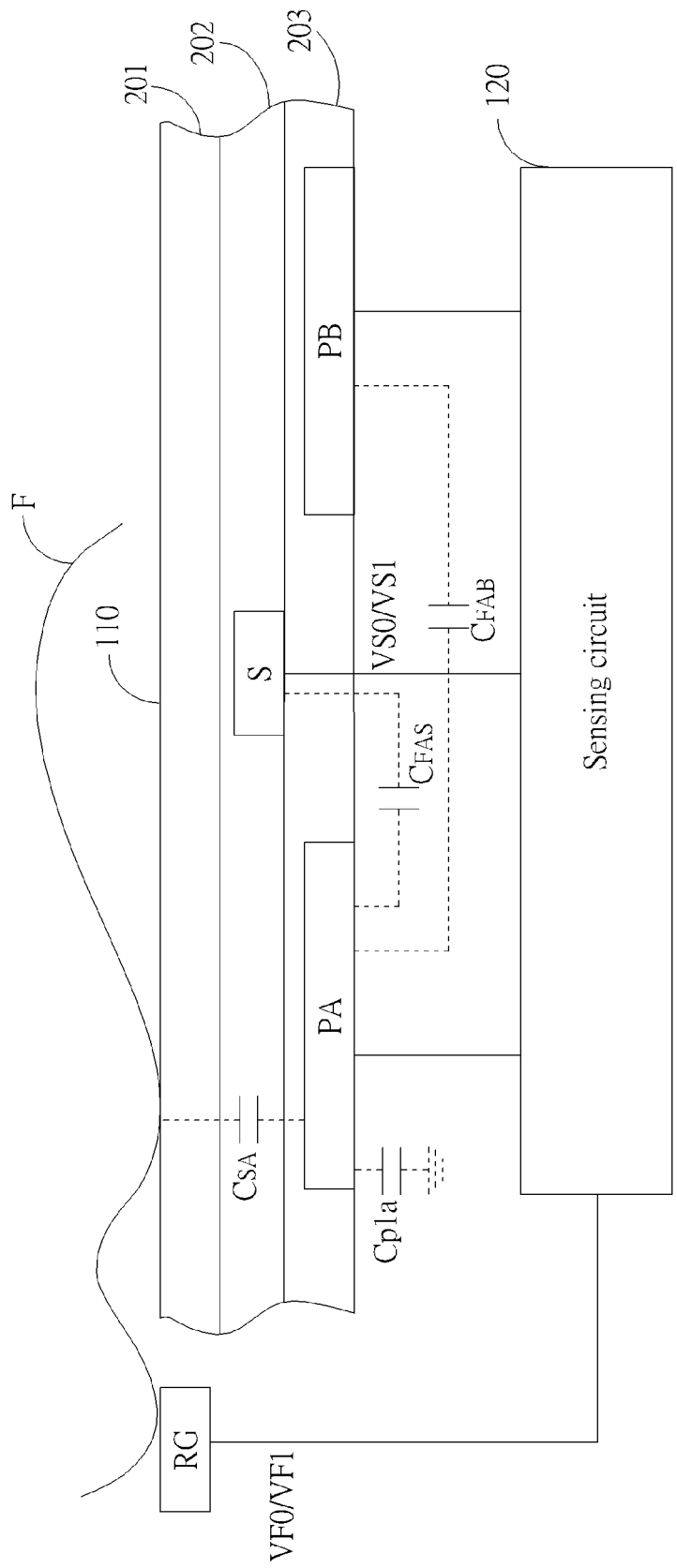
FIG. 2 is a diagram illustrating parasitic capacitances associated with an electrode plate to be measured of the fingerprint sensor shown in FIG. 1 according to an embodiment of the present invention.

FIG. 2 is a diagram illustrating parasitic capacitances associated with an electrode plate to be measured of the fingerprint sensor 100 according to an embodiment of the present invention. In this embodiment, the sensor surface 110 is located on one side of a protection layer 201, the protection electrode S is disposed in a dielectric layer 202, and the electrode plates PA and PB are disposed in a dielectric layer 203. In a case where the electrode plate PA is used as an electrode plate to be measured, the sensing circuit 120 may adaptively apply a finger drive voltage VF0/VF1 to a finger drive electrode RG (e.g. a metal ring around the sensor surface 110) such that the finger drive voltage VF0/VF1 may be applied to the finger F when the finger F touches the finger drive electrode RG. A capacitance between the finger F and the electrode plate PA (the electrode plate to be measured) is labeled $C_{SA}$. Capacitances associated with the electrode plate PA further include a capacitance $C_{FAB}$ between the electrode plate PA and the electrode plate PB (a fringe capacitance), a capacitance $C_{FAS}$ between the electrode plate PA and the protection electrode S, and/or a capacitance $Cp1a$ between the electrode plate PA and other conductor(s) (parasitic capacitance(s) except the capacitance $C_{SA}$ and the aforementioned fringe capacitances).

The device structure shown in FIG. 2 is for illustrative purposes only, and is not meant to be a limitation of the present invention. For example, the protection electrode S and the electrode plates PA-PD may be located on a same plane (e.g. disposed in the dielectric layer 203). In another example, a portion of the protection electrode S may be located above the electrode plates PA-PD (e.g. disposed in the dielectric layer 202), while another portion of the protection electrode S and the electrode plates PA-PD may be located on a same plane (e.g. disposed in the dielectric layer 203).

Figure 3:
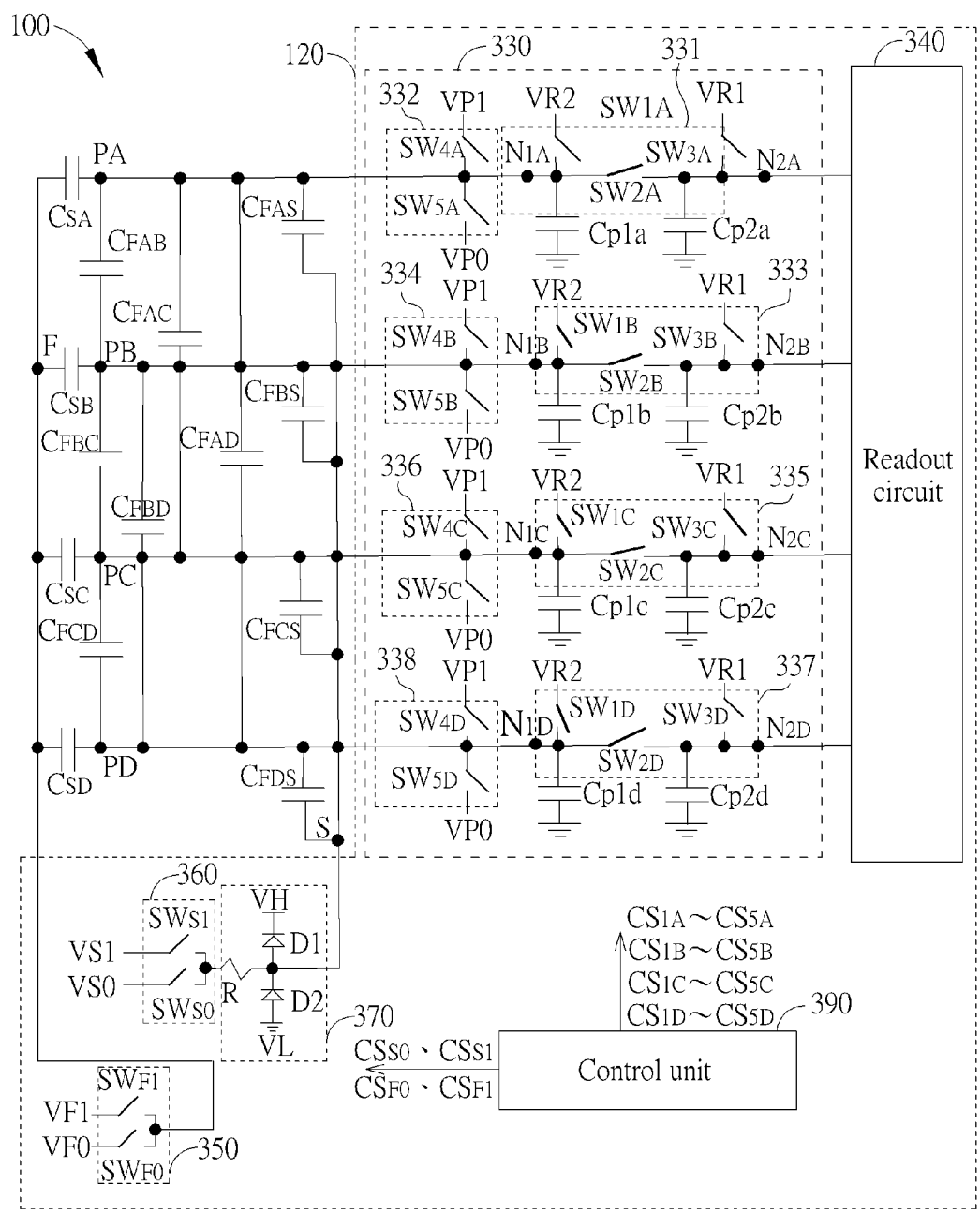
FIG. 3 is a diagram illustrating an exemplary circuit structure of the fingerprint sensor shown in FIG. 1 according to an embodiment of the present invention.

Please refer to FIG. 3, which is a diagram illustrating an exemplary circuit structure of the fingerprint sensor 100 shown in FIG. 1 according to an embodiment of the present invention. The component arrangement of the fingerprint sensor 100 shown in FIG. 3 may be implemented by the structure shown in FIG. 2. In this embodiment, the sensing circuit 120 may include a detection circuit 330, a readout circuit 340, a switch unit 350, a switch unit 360, an electrostatic discharge (ESD) protection circuit 370 and a control unit 390. The detection circuit 330 is used for detecting an electrode plate to be measured, and the readout circuit 340 is used for reading out a measurement result of the detection circuit 330 and performing further processing on the measurement result (e.g. signal amplification). The switch unit 350 is used for coupling the finger drive voltage VF0/VF1 to the finger F.

The switch unit 360 is used for coupling the voltage VS0/VS1 to the protection electrode S. The ESD protection circuit 370 is coupled between the protection electrode S and the switch unit 360, and is arranged for providing ESD protection. By way of example but not limitation, the ESD protection circuit 370 may include a resistive element R and a plurality of diodes D1 and D2. A terminal of the resistive element R is connected to the protection electrode S, and another terminal of the resistive element R is connected to the switch unit 360. An anode and a cathode of the diode D1 are connected to the protection electrode S and an electric potential VH (a high electric potential such as a power supply potential VDD) respectively, and an anode and a cathode of the diode D2 are connected to an electric potential VL (a low electric potential such as a ground potential) and the protection electrode S respectively. Using a high resistance element as the resistive element R may prevent an ESD current from flowing toward the switch unit 360. When an electrostatic voltage of the protection electrode S is greater than a sum of the high electric potential VH (e.g. the power supply potential VDD) and a threshold voltage (turn-on voltage) of the diode D1, the diode D1 turns on to remove electrostatic charges quickly. Similarly, when the electrostatic voltage of the protection electrode S is less than the low electric potential VL (e.g. the ground potential) subtracted by a threshold voltage (turn-on voltage) of the diode D2, the diode D2 turns on to remove electrostatic charges quickly The control unit 390 is coupled to the detection circuit 330, the readout circuit 340, the switch unit 350, the switch unit 360 and the ESD protection circuit 370, and may generate a plurality of control signals $CS_{1A}$-$CS_{5A}$, $CS_{1B}$-$CS_{5B}$, $CS_{1C}$-$CS_{5C}$, $CS_{1D}$-$CS_{5D}$, $CS_{S0}$-$CS_{S1}$ and $CS_{F0}$-$CS_{F1}$ to control operations of a plurality of switches $SW_{1A}$-$SW_{5A}$, $SW_{1B}$-$SW_{5B}$, $SW_{1C}$-$SW_{5C}$, $SW_{1D}$-$SW_{5D}$, $SW_{S0}$-$SW_{S1}$ and $SW_{F0}$-$SW_{F1}$ of the sensing circuit 120, respectively.

In this embodiment, the detection circuit 330 includes a plurality of switch units 331-338, wherein the switch units 331 and 332 are disposed in correspondence with the electrode plate PA, the switch units 333 and 334 are disposed in correspondence with the electrode plate PB, the switch units 335 and 336 are disposed in correspondence with the electrode plate PC, and the switch units 337 and 338 are disposed in correspondence with the electrode plate PD. Nodes $N_{1A}$ and $N_{2A}$ of the switch unit 331 are connected to the electrode plate PA and the readout circuit 340 respectively, nodes $N_{1B}$ and $N_{2B}$ of the switch unit 333 are connected to the electrode plate PB and the readout circuit 340 respectively, nodes $N_{1C}$ and $N_{2C}$ of the switch unit 335 are connected to the electrode plate PC and the readout circuit 340 respectively, and nodes $N_{1D}$ and $N_{2D}$ of the switch unit 337 are connected to the electrode plate PD and the readout circuit 340 respectively. The node $N_{1A}/N_{1B}/N_{1C}/N_{1D}$ is selectively coupled to a voltage VR2, and the node $N_{2A}/N_{2B}/N_{2C}/N_{2D}$ is selectively coupled to a voltage VR1 different from the voltage VR2. In addition, the switch unit 332 may couple the electrode plate PA to a voltage VP0 or a voltage VP1 different from the voltage VP0. The switch unit 334 may couple the electrode plate PB to the voltage VP0 or the voltage VP1. The switch unit 336 may couple the electrode plate PC to the voltage VP0 or the voltage VP1. The switch unit 338 may couple the electrode plate PD to the voltage VP0 or the voltage VP1.

The switch unit 331 may include the switches $SW_{1A}$-$SW_{3A}$, wherein the switch $SW_{2A}$ is coupled between the node $N_{1A}$ and the node $N_{2A}$, the switch $SW_{1A}$ is coupled between the node $N_{1A}$ and the voltage VR2, and the switch $SW_{3A}$ is coupled between the node $N_{2A}$ and the voltage VR1. The switch $SW_{1A}$ couples the voltage VR2 to the node $N_{1A}$ according to the control signal $CS_{1A}$, the switch $SW_{2A}$ couples the node $N_{1A}$ to the node $N_{2A}$ according to the control signal $CS_{2A}$, and the switch $SW_{3A}$ couples the voltage VR1 to the node $N_{2A}$ according to the control signal $CS_{3A}$.

The switch unit 332 includes the switches $SW_{4A}$-$SW_{5A}$, wherein the switch $SW_{4A}$ is coupled between the electrode plate PA and the voltage VP1, and the switch $SW_{5A}$ is coupled between the electrode plate PA and the voltage VP2. The switch $SW_{4A}$ couples the voltage VP1 to the electrode plate PA according to the control signal $CS_{4A}$, and the switch $SW_{5A}$ couples the voltage VP0 to the electrode plate PA according to the control signal $CS_{5A}$. Similarly, the switches $SW_{1B}$-$SW_{3B}$ included in the switch unit 333 may perform switching according to the control signals $CS_{1B}$-$CS_{3B}$ respectively, the switches $SW_{4B}$-$SW_{5B}$ included in the switch unit 334 may perform switching according to the control signals $CS_{4B}$-$CS_{5B}$ respectively, the switches $SW_{1C}$-$SW_{3C}$ included in the switch unit 335 may perform switching according to the control signals $CS_{1C}$-$CS_{3C}$ respectively, the switches $SW_{4C}$-$SW_{5C}$ included in the switch unit 336 may perform switching according to the control signals $CS_{4C}$-$CS_{5C}$ respectively, the switches $SW_{1D}$-$SW_{3D}$ included in the switch unit 337 may perform switching according to the control signals $CS_{1D}$-$CS_{3D}$ respectively, and the switches $SW_{4D}$-$SW_{5D}$ included in the switch unit 338 may perform switching according to the control signals $CS_{4D}$-$CS_{5D}$ respectively. In this embodiment, each of the switch units 333, 335 and 337 is identical to the switch unit 331, and each of the switch units 332, 334 and 338 is identical to the switch unit 332. Hence, further description of components of the switch units 333-338 is omitted here for brevity.

The switch unit 350 is used for switching a voltage applied to the finger F, and includes the switches $SW_{F0}$ and $SW_{F1}$. The switch $SW_{F0}$ is coupled between a finger drive electrode (e.g. the finger drive electrode RG shown in FIG. 2) and the finger drive voltage VF0, and the switch $SW_{F1}$ is coupled between the finger drive electrode and the finger drive voltage VF1, wherein the finger drive electrode is disposed around a sensor surface (e.g. the sensor surface 110 shown in FIG. 2) to allow finger contact. The finger drive voltages VF0 and VF1 are coupled to the finger F through the finger drive electrode. The switch $SW_{F0}$ may couple the finger drive voltage VF0 to the finger F according to the control signal $CS_{F0}$, and the switch $SW_{F0}$ may couple the finger drive voltage VF1 to the finger F according to the control signal $CS_{F1}$.

The switch unit 360 may include switches $SW_{S0}$ and $SW_{S1}$, wherein the switch $SW_{S0}$ is coupled between the resistive element R and the voltage VS0, and the switch $SW_{S1}$ is coupled between the resistive element R and the voltage VS1. The switch $SW_{S0}$ may couple the voltage VS0 to the protection electrode S according to the control signal $CS_{S0}$, and the switch $SW_{S1}$ may couple the voltage VS1 to the protection electrode S according to the control signal $CS_{S1}$.

As shown in FIG. 3, a plurality of capacitances $C_{SA}$-$C_{SD}$ are plate capacitances formed between the finger F and the electrode plates PA-PD, a plurality of capacitances $C_{FAB}$, $C_{FBC}$, $C_{FCD}$, $C_{FBD}$, $C_{FAC}$ and $C_{FAD}$ are a fringe capacitance formed between the electrode plates PA and PB, a fringe capacitance formed between the electrode plates PB and PC, a fringe capacitance formed between the electrode plates PC and PD, a fringe capacitance formed between the electrode plates PB and PD, a fringe capacitance formed between the electrode plates PA and PC, and a fringe capacitance formed between the electrode plates PA and PD, respectively. A plurality of capacitances $C_{FAS}$-$C_{FDS}$ are fringe capacitances formed between the protection electrode S and the electrode plates PA-PD, respectively. A plurality of capacitances Cp1a-Cp1d are parasitic capacitances formed between other conductor (s) and the nodes $N_{1A}$-$N_{1D}$, respectively, and a plurality of capacitances Cp2a-Cp2d are parasitic capacitances formed between other conductor (s) and the nodes $N_{2A}$-$N_{2D}$, respectively.

Figure 4:
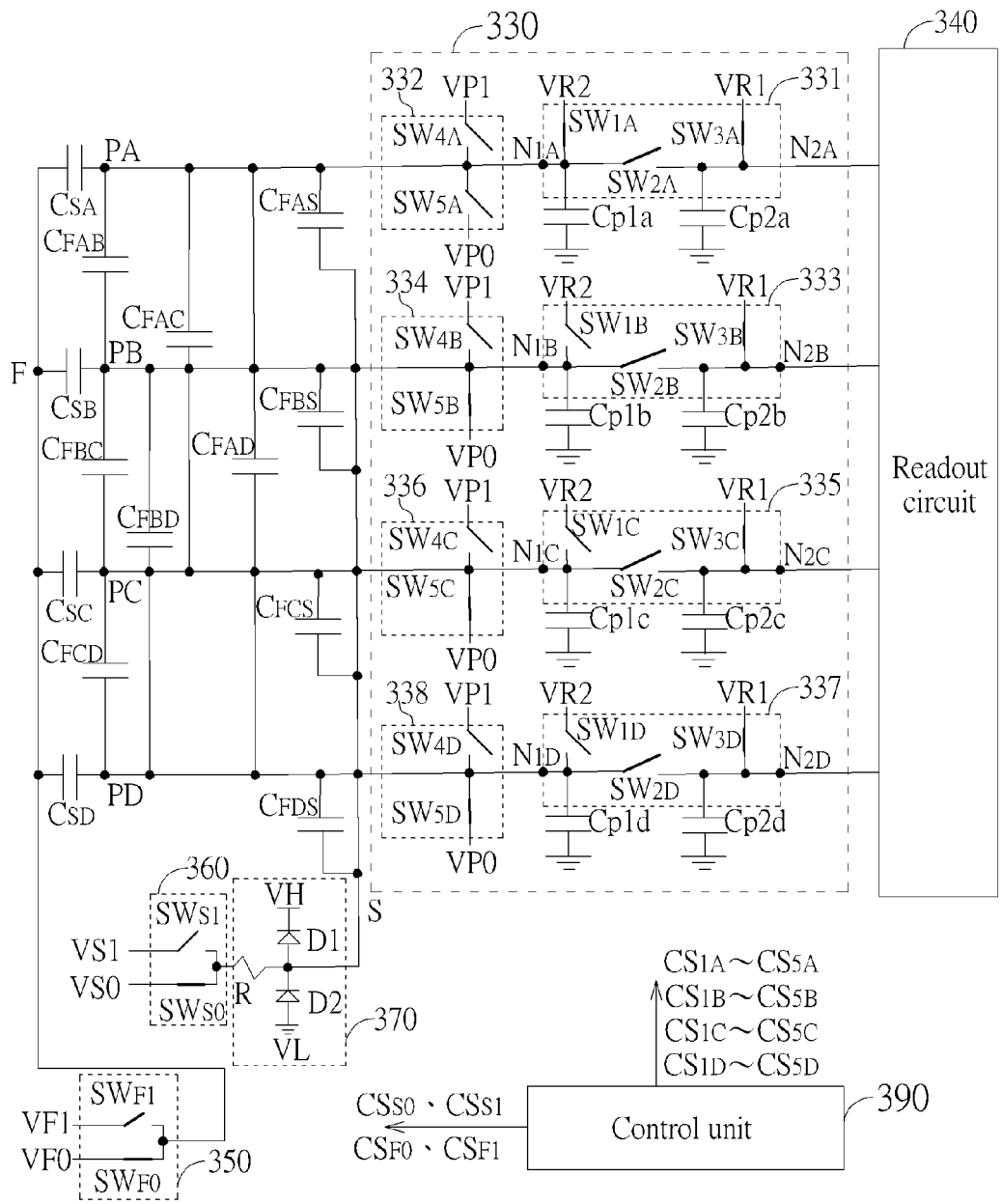
FIG. 4 is a circuit diagram of the fingerprint sensor shown in FIG. 3 in a first phase according to an embodiment of the present invention.

For better understanding of the present invention, the electrode plate PA is used as an electrode plate to be measured in the following for further description of the proposed fingerprint sensing scheme. Please refer to FIG. 4, which is a circuit diagram of the fingerprint sensor 100 shown in FIG. 3 in a first phase according to an embodiment of the present invention. In the first phase (e.g. a pre-charge mode), the control unit 390 controls the switch unit 331 to couple the node $N_{1A}$ to the voltage VR2 and couple the node $N_{2A}$ to the voltage VR1, wherein the node $N_{1A}$ is disconnected from the node $N_{2A}$. The control unit 390 controls the switch unit 350 to couple the finger drive voltage VF0 to the finger F. Additionally, the control unit 390 may make a conductor adjacent to the electrode plate PA coupled to a specific voltage. For example, the control unit 390 controls the switch unit 334/336/338 to couple the electrode plate PB/PC/PD to the voltage VP0 (i.e. the conductor adjacent to the electrode plate PA is the electrode plate PB/PC/PD used for fingerprint sensing). In another example, the control unit 390 controls the switch unit 360 to couple the protection electrode S to the voltage VS0 (i.e. the conductor adjacent to the electrode plate PA is the protection electrode S). Further, in the first phase, the node $N_{1B}/N_{1C}/N_{1D}$ is coupled to the voltage VP0, and the node $N_{2B}/N_{2C}/N_{2D}$ is coupled to the voltage VR1. In other embodiments, the node $N_{2B}/N_{2C}/N_{2D}$ may be uncoupled to the voltage VR1 in the first phase.

In the first phase, the switches $SW_{1A}$, $SW_{3A}$-$SW_{3D}$, $SW_{5B}$-$SW_{5D}$, $SW_{S0}$ and $SW_{F0}$ turn on according to corresponding control signals, and the switches $SW_{1B}$-$SW_{1D}$, $SW_{2A}$-$SW_{2D}$, $SW_{4A}$-$SW_{4D}$, $SW_{5A}$, $SW_{S1}$ and $SW_{F1}$ turn off according to corresponding control signals.

Figure 5:
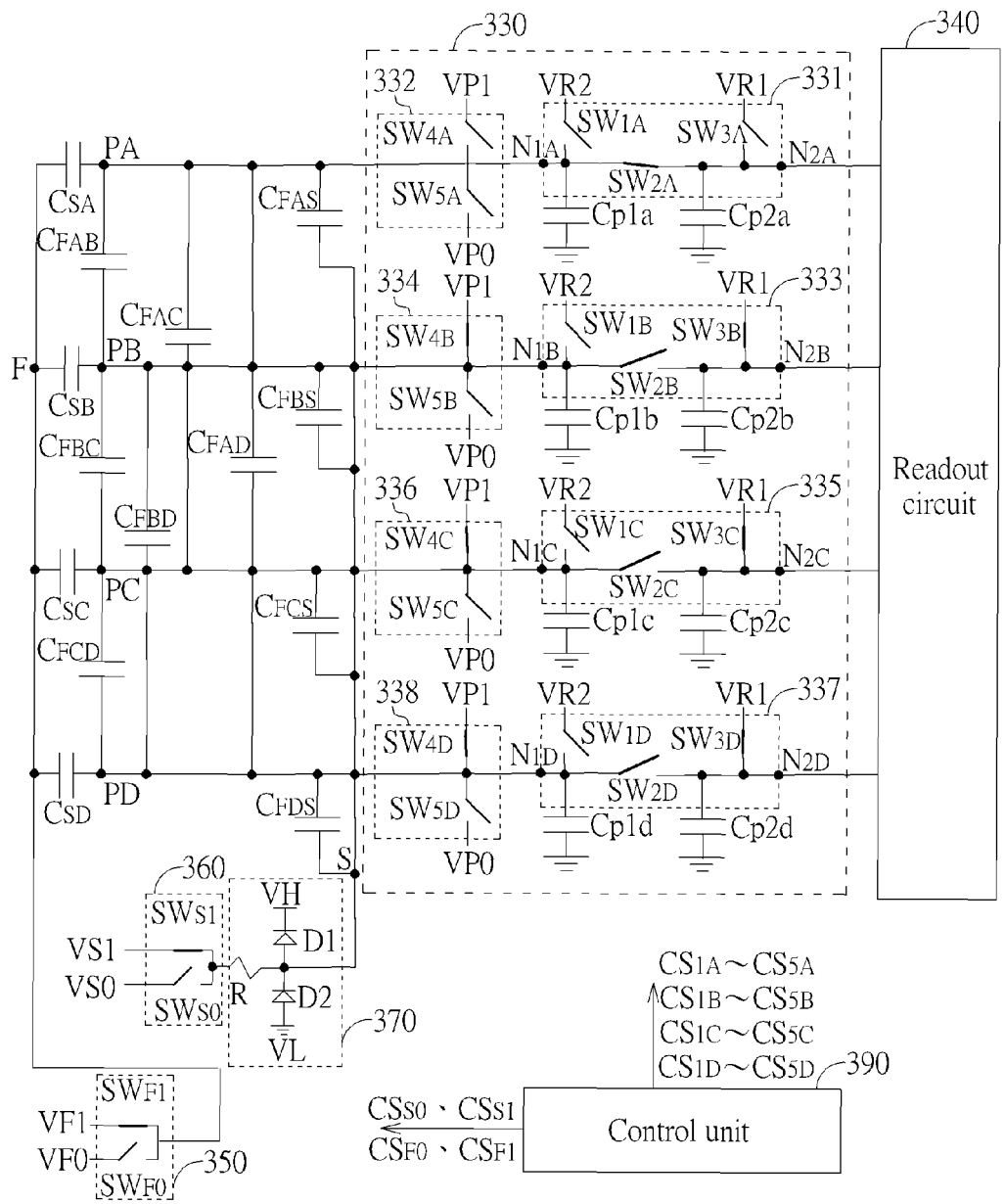
FIG. 5 is a circuit diagram of the fingerprint sensor shown in FIG. 3 in a second phase according to an embodiment of the present invention.

Next, in a second phase (e.g. a detection mode; as shown in FIG. 5), the control unit 390 controls the switch unit 331 to have the nodes $N_{1A}$ and $N_{2A}$ uncoupled to the voltages VR2 and VR1 respectively, and to connect the node $N_{1A}$ to the node $N_{2A}$. The control unit 390 further controls the switch unit 350 to couple the finger drive voltage VF1 to the finger F. Additionally, the control unit 390 makes the conductor adjacent to the electrode plate PA coupled to another specific voltage. For example, the control unit 390 controls the switch unit 334/336/338 to couple the electrode plate PB/PC/PD to the voltage VP1 (i.e. the conductor adjacent to the electrode plate PA is the electrode plate PB/PC/PD used for fingerprint sensing). In another example, the control unit 390 controls the switch unit 360 to couple the protection electrode S to the voltage VS1 (i.e. the conductor adjacent to the electrode plate PA is the protection electrode S). Further, in the second phase, the status of the switch unit 333/335/337 may be the same as in the first phase.

In the second phase, the switches $SW_{2A}$, $SW_{3B}$-$SW_{3D}$, $SW_{4B}$-$SW_{4D}$, $SW_{S1}$ and $SW_{F1}$ turn on according to corresponding control signals, and the switches $SW_{1A}$-$SW_{1D}$, $SW_{2B}$-$SW_{2D}$, $SW_{3A}$, $SW_{4A}$, $SW_{5A}$-$SW_{5D}$, $SW_{S0}$ and $SW_{F0}$ turn off according to corresponding control signals. In other embodiments, the switches $SW_{3B}$-$SW_{3D}$ may turn off in the first phase or in the second phase.

After the operations in the second phase are performed, the readout circuit 340 reads a signal on the node $N_{2A}$ and the signal on the node $N_{2A}$ may be further processed (e.g. signal amplification) so as to obtain a measurement result of the electrode plate to be measured (the electrode plate PA).

In other embodiment, accumulation of sensing signals may increase a dynamic range of a measurement result. Please refer to FIG. 6, which is a circuit diagram of the fingerprint sensor 100 shown in FIG. 3 in a third phase according to an embodiment of the present invention. The third phase is next to the second phase. In the third phase, the control unit 390 controls the switch unit 331 to couple the node $N_{1A}$ to the voltage VR2, and to disconnect the node $N_{1A}$ from the node $N_{2A}$, wherein the node $N_{2A}$ is uncoupled to the voltage VR1. The control unit 390 controls the switch unit 334/336/338 to couple the electrode plate PB/PC/PD to the voltage VP0, controls the switch unit 360 to couple the protection electrode S to the voltage VS0, and controls the switch unit 350 to couple the finger drive voltage VF0 to the finger F. The voltage switching operation in the third phase is substantially identical to that in the first phase, wherein the main difference is that the switch unit 331 corresponding to the electrode to be measured (the electrode plate PA) does not couple the voltage VR1 to the node $N_{2A}$ in order to preserve a sensing signal obtained in the second phase.

Figure 6:
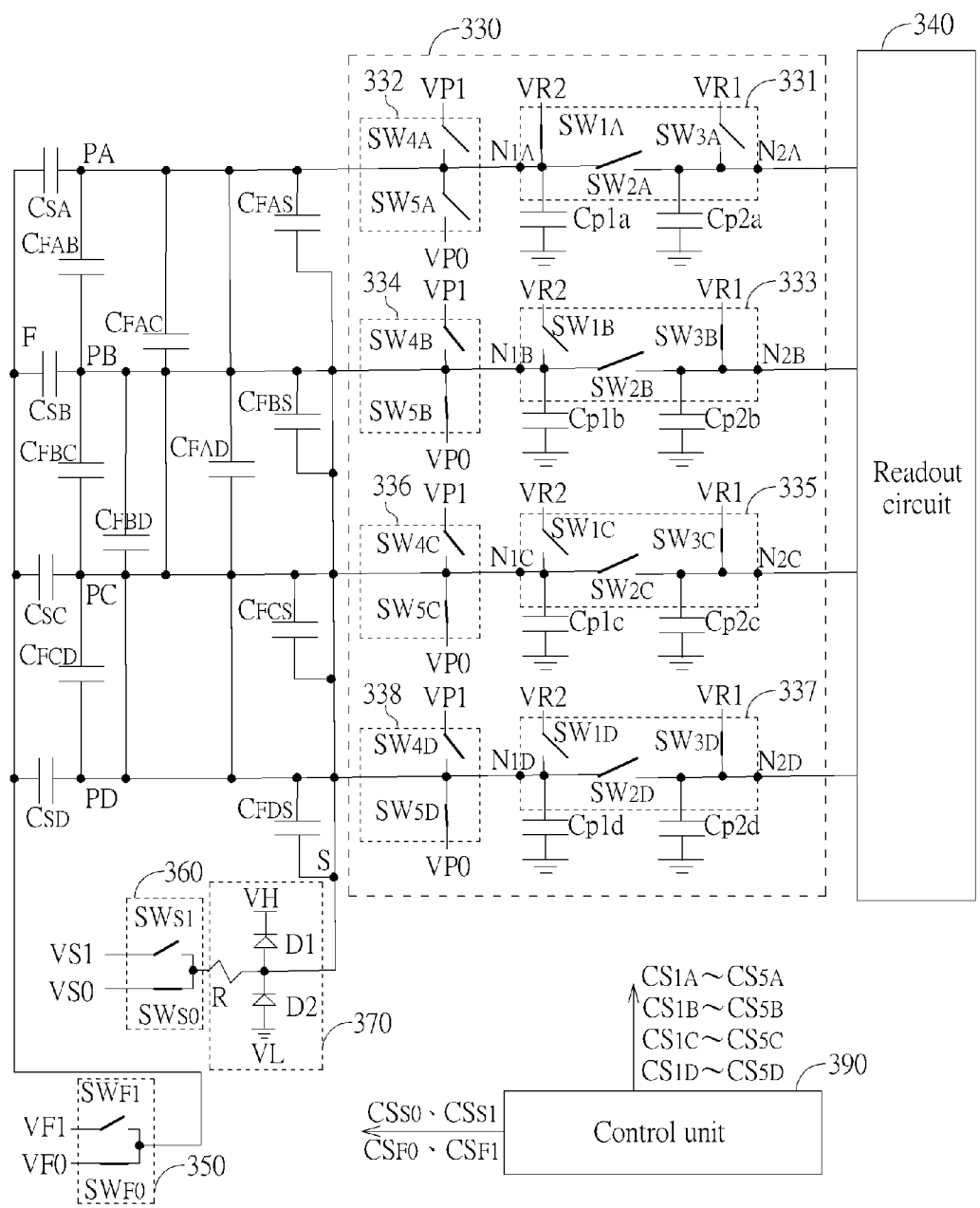
FIG. 6 is a circuit diagram of the fingerprint sensor shown in FIG. 3 in a third phase according to an embodiment of the present invention.

After the third phase shown in FIG. 6, the fingerprint sensor 100 may perform again the operations in the second phase shown in FIG. 5, and then read out the signal on the node $N_{2A}$. The fingerprint sensor 100 may switch between the third phase and the second phase multiple times.

Figure 7:
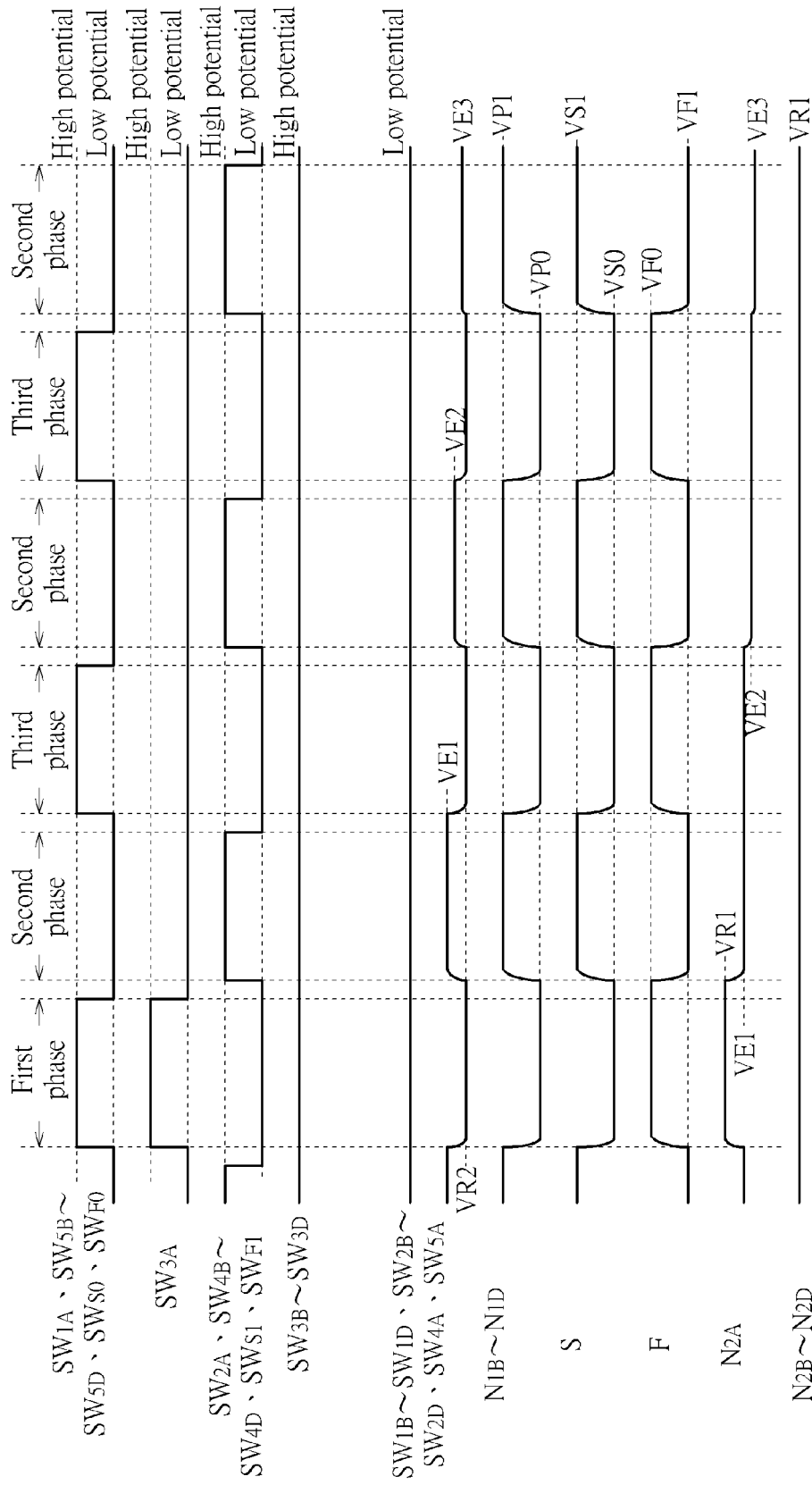
FIG. 7 is a timing diagram of fingerprint sensing operations of the fingerprint sensor shown in FIG. 3.

The aforementioned voltage switching operations may be summarized in the timing diagram shown in FIG. 7. Regarding each switch, a high electric potential corresponds to an ON state (the switch turns on), and a low electric potential corresponds to an OFF state (the switch turns off). In the embodiment shown in FIG. 7, the voltage VR1 is greater than the voltage VR2. Further, in this embodiment, after the completion of the operations performed in the third phase, the control unit 390 shown in FIG. 3 performs again the operations performed in the second phase so as to accumulate sensing signals, wherein a plurality of voltages VE1-VE3 represent measurement results which have undergone signal accumulation one to three times respectively. Over a period of time during which the fingerprint sensor 100 switches from the first phase (or the third phase) to the second phase, the switches $SW_{2A}$, $SW_{4A}$-$SW_{4D}$, $SW_{S1}$ and $SW_{F1}$ turn on after the switches $SW_{1A}$, $SW_{3A}$, $SW_{5B}$-$SW_{5D}$, $SW_{S0}$ and $SW_{F0}$ turn off. Over a period of time during which the fingerprint sensor 100 switches from the second phase to the third phase, the switches $SW_{1A}$, $SW_{3A}$, $SW_{5B}$-$SW_{5D}$, $SW_{S0}$ and $SW_{F0}$ turn on after the switches $SW_{2A}$, $SW_{4A}$-$SW_{4D}$, $SW_{S1}$ and $SW_{F1}$ turn off.

Based on the timing control shown in FIG. 7, where the fingerprint sensor 100 operates in the first phase, the second phase, the third phase, the second phase, the third phase and so on, a voltage $V_{P2}$ at the node $N_{2A}$ corresponding to the electrode plate PA may be expressed by the following formula after n times of operations in the second phase.

$$V_{P2} = \left[ \frac{C_{SA} \times (VR2 - VR1 + VF1 - VF0) + C_{FPPA} \times (VR2 - VR1 + VP1 - VP0)}{C_{SA} + C_{FPPA} + C_{FAS} + Cp1a + Cp2a} + \frac{C_{FSA} \times (VR2 - VR1 + VS1 - VS0) + \frac{Cp1a \times (VR2 - VR1)}{C_{SA} + C_{FPPA} + C_{FAS} + Cp1a + Cp2a}} \right] \left( \sum_{i=1}^{n} x^{j-1} \right) + VR1,$$

where $C_{FPPA} = C_{FAB} + C_{FAC} + C_{FAD}$, and $x = Cp2a / (C_{SA} + C_{FPPA} + C_{FAS} + Cp1a + Cp2a)$.

It should be noted that the capacitance $C_{SA}$ is the plate capacitance formed between the electrode plate PA and the finger F, wherein the closer the electrode plate PA and the finger F, the larger the capacitance $C_{SA}$, and the farther away the finger F is from the electrode plate PA, the smaller the capacitance $C_{SA}$. However, the capacitance $C_{FAB}/C_{FAC}/C_{FAD}$ (formed between the electrode plate PA and the electrode plate PB/PC/PD) and the capacitance $C_{SA}$ change in opposite ways in response to depth variations of fingerprints, and the capacitance $C_{FAS}$ (formed between the electrode plate PA and the protection electrode S) and the capacitance $C_{SA}$ change in opposite ways in response to depth variations of fingerprints. In brief, a capacitance formed between the electrode plate PA (the electrode plate to be measured) and an adjacent conductor affects the measurement result of the capacitance $C_{SA}$. This problem can be solved/lessened using the proposed fingerprint sensing scheme which switches an electric potential of the adjacent conductor, wherein when the voltage VR1 is greater than the voltage VR2, the voltage VP1 is greater than VP0, the voltage VS1 is greater than the voltage VS0, and the finger drive voltage VF1 is less than the finger drive voltage VF0. By means of the aforementioned operations, the voltage $V_{P2}$ at the node $N_{2A}$ may have a greater magnitude. Additionally, multiple measurement results are accumulated after the operations in the second phase are performed multiple times. A magnitude of the voltage $V_{P2}$ may increase, thus conductive to distinguishing between a fingerprint ridge and a fingerprint valley. Hence, the proposed fingerprint sensing scheme may increase accuracy of fingerprint recognition.

In other embodiment, the voltage VR1 is equal to the voltage VP1, and the voltage VR2 is equal to the voltage VP0. This may reduce/eliminate effects of a parasitic capacitance formed between the electrode plate to be measured and the adjacent electrode plate. In another embodiment, the voltage VR1 is equal to the voltage VS1, and the voltage VR2 is equal to the voltage VS0, thus reducing/eliminating effects of a parasitic capacitance formed between the protection electrode S and the electrode plate to be measured.

The above is for illustrative purposes only, and is not meant to be a limitation of the present invention. In other embodiments, the voltage VR1 is less than the voltage VR2, the voltage VP1 is less than the voltage VP0, the voltage VS1 is less than the voltage VS0, and the finger drive voltage VF1 is greater than the finger drive voltage VF0.

Figure 8:
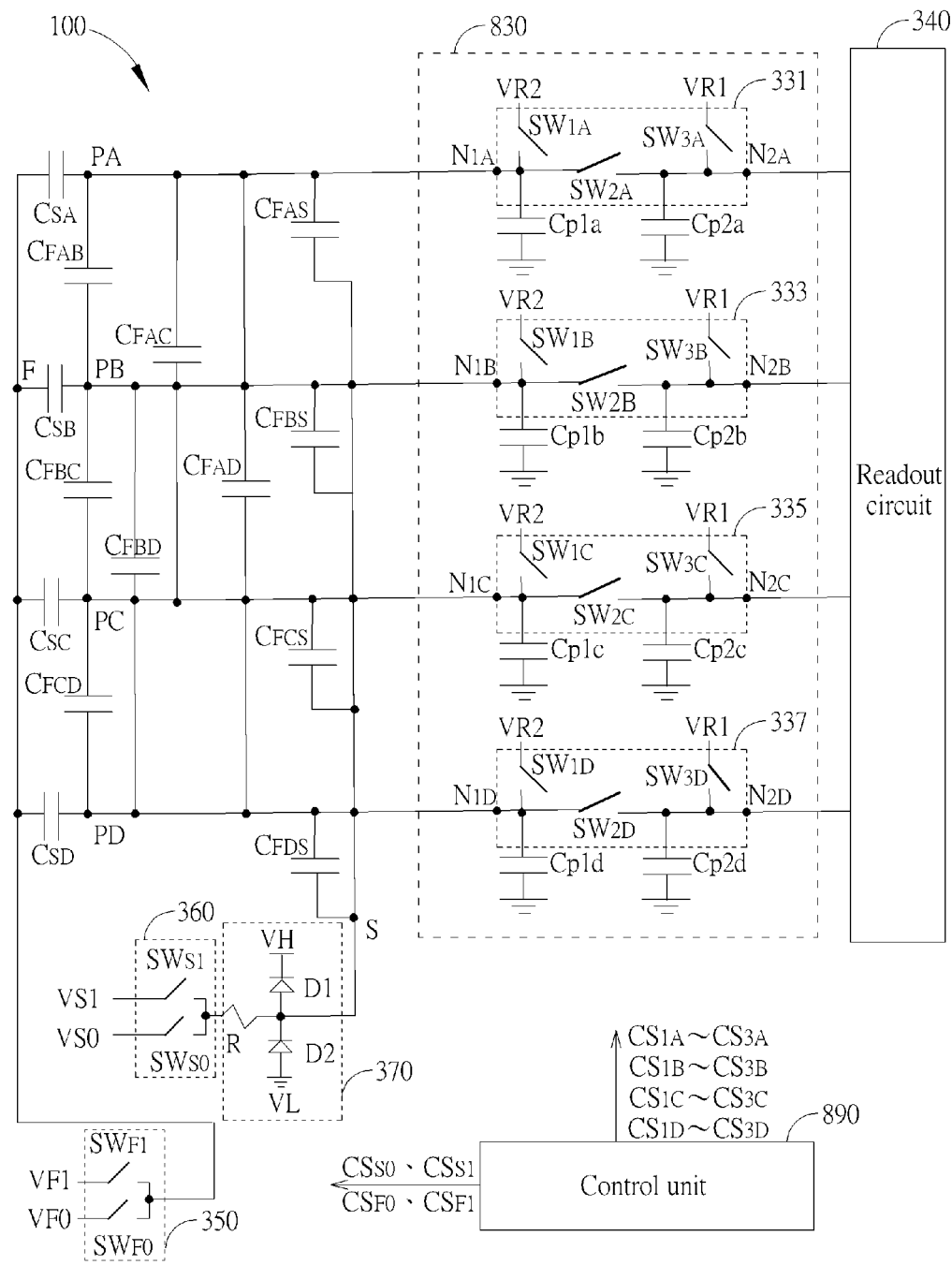
FIG. 8 is a diagram illustrating an exemplary circuit structure of the fingerprint sensor shown in FIG. 1 according to another embodiment of the present invention.

Please refer to FIG. 8, which is a diagram illustrating an exemplary circuit structure of the fingerprint sensor 100 shown in FIG. 1 according to another embodiment of the present invention. The main difference between the circuit structure shown in FIG. 8 and the circuit structure shown in FIG. 3 is that the switches 332, 334, 336 and 338 are not disposed in a detection circuit 830. Description associated with other circuit elements shown in FIG. 8 having the same reference numerals as those shown in FIG. 3 is not repeated here for brevity.

In the following, the electrode plate PA is used as an electrode plate to be measured for further description of the fingerprint sensing scheme employed in the circuit structure shown in FIG. 8. Please refer to FIG. 9, which is a circuit diagram of the fingerprint sensor 100 shown in FIG. 8 in a first phase according to an embodiment of the present invention. In the first phase (e.g. a pre-charge mode), the control unit 890 controls the switch unit 331 to couple the node $N_{1A}$ to the voltage VR2 and couple the node $N_{2A}$ to the voltage VR1, wherein the node $N_{1A}$ is disconnected from the node $N_{2A}$. The control unit 890 controls the switch unit 350 to couple the finger drive voltage VF0 to the finger F. Additionally, the control unit 890 makes a conductor adjacent to the electrode plate PA coupled to a specific voltage. For example, the control unit 890 may control the switch unit 333/335/337 to couple the electrode plate PB/PC/PD to the voltage VR2. In another example, the control unit 890 may control the switch unit 360 to couple the protection electrode S to the voltage VS0. Further, in the first phase, the node $N_{1B}/N_{1C}/N_{1D}$ may be coupled to the voltage VR2, and the node $N_{2B}/N_{2C}/N_{2D}$ may be coupled to the voltage VR1.

In other embodiments, the node $N_{2B}/N_{2C}/N_{2D}$ may be uncoupled to the voltage VR1 in the first phase.

In the first phase, the switches $SW_{1A}$-$SW_{1D}$, $SW_{3A}$-$SW_{3D}$, $SW_{S0}$ and $SW_{F0}$ turn on according to corresponding control signals, and the switches $SW_{2A}$-$SW_{2D}$, $SW_{S1}$ and $SW_{F1}$ turn off according to corresponding control signals. In other embodiments, the switches $SW_{3B}$-$SW_{3D}$ may turn off.

Figure 10:
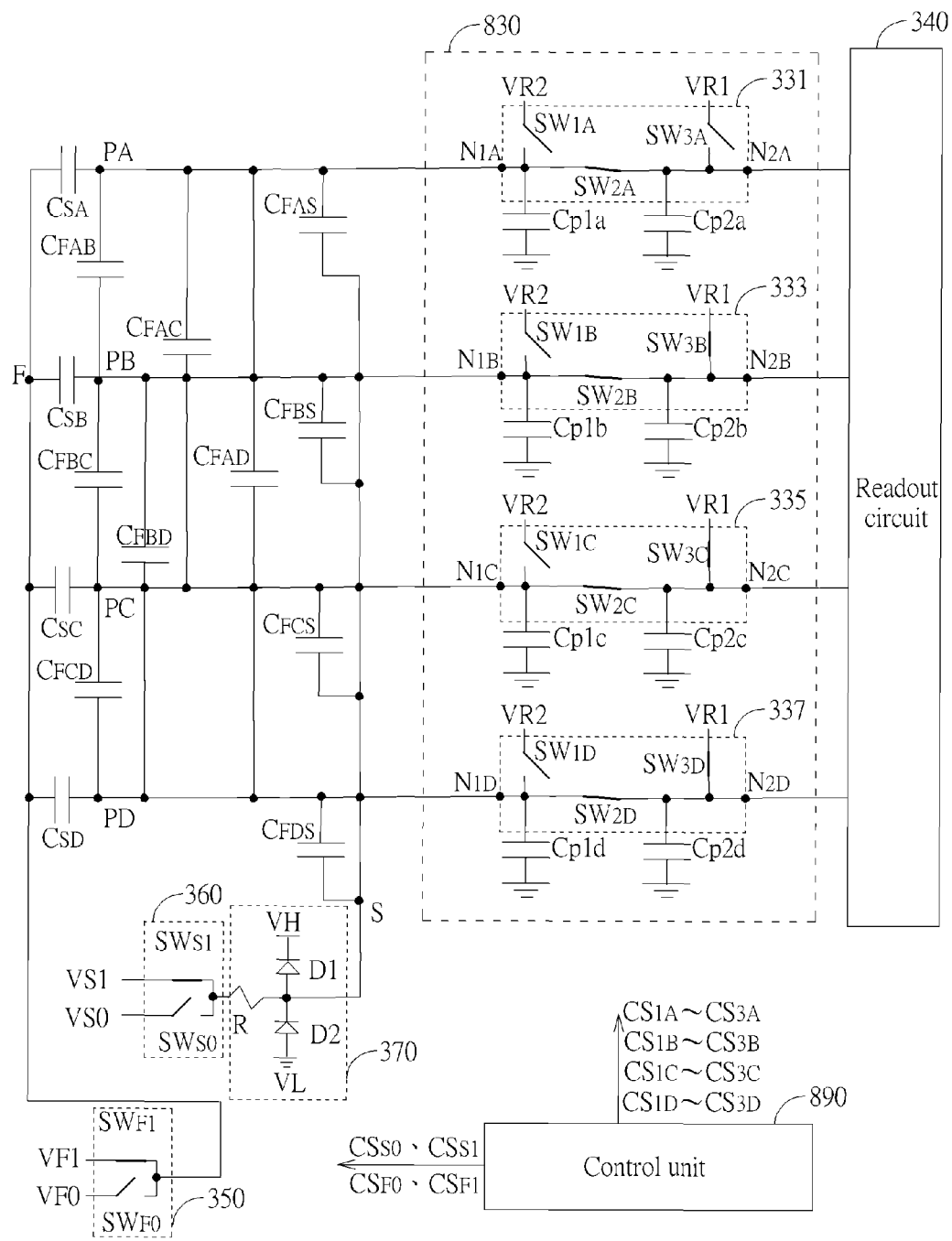
FIG. 10 is a circuit diagram of the fingerprint sensor shown in FIG. 8 in a second phase according to an embodiment of the present invention.

Next, in a second phase (e.g. a detection mode; as shown in FIG. 10), the control unit 890 may control the switch unit 331 to have the node $N_{1A}$ uncoupled to the voltage VR2, have the node $N_{2A}$ uncoupled to the voltage VR1, and connect the node $N_{1A}$ to the node $N_{2A}$. The control unit 890 further controls the switch unit 350 to couple the finger drive voltage VF1 to the finger F. Additionally, the control unit 890 makes the conductor adjacent to the electrode plate PA coupled to another specific voltage. For example, the control unit 890 controls the switch unit 333/335/337 to couple the electrode plate PB/PC/PD to the voltage VR1. In another example, the control unit 890 controls the switch unit 360 to couple the protection electrode S to the voltage VS1.

In the second phase, the switches $SW_{2A}$-$SW_{2D}$, $SW_{3B}$-$SW_{3D}$, $SW_{S1}$ and $SW_{F1}$ turn on according to corresponding control signals, and the switches $SW_{1A}$-$SW_{1D}$, $SW_{3A}$, $SW_{S0}$ and $SW_{F0}$ turn off according to corresponding control signals.

After the operations in the second phase are performed, the readout circuit 340 reads a signal on the node $N_{2A}$ and the signal on the node $N_{2A}$ may be further processed (e.g. signal amplification) so as to obtain a measurement result of the electrode plate to be measured (the electrode plate PA).

In other embodiment, accumulation of sensing signals may increase a dynamic range of a measurement result. Please refer to FIG. 11, which is a circuit diagram of the fingerprint sensor 100 shown in FIG. 8 in a third phase according to an embodiment of the present invention. The third phase is next to the second phase. In other words, the fingerprint sensor 100 shown in FIG. 8 performs operations in the third phase shown in FIG. 11 after performing operations in the second phase shown in FIG. 10. Similar to the operations of the circuit structure shown in FIG. 6, the voltage switching operation in the third phase shown in FIG. 11 is substantially identical to that in the first phase shown in FIG. 9, wherein the main difference between the voltage switching operations shown in FIG. 11 and FIG. 9 is that the switch unit 331 corresponding to the electrode to be measured (the electrode plate PA) does not couple the voltage VR1 to the node $N_{2A}$ in order to preserve a sensing signal obtained in the second phase.

Figure 11:
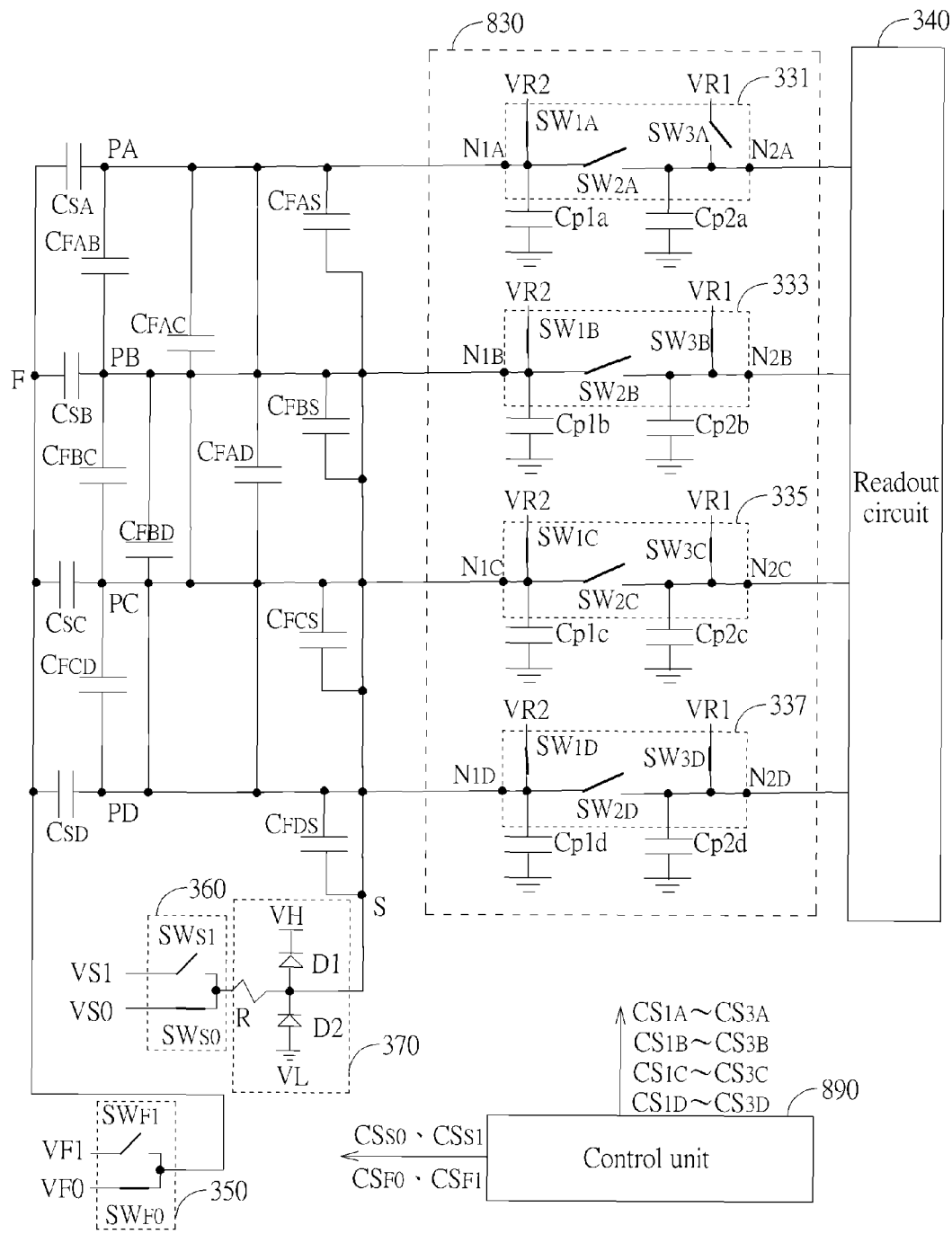
FIG. 11 is a circuit diagram of the fingerprint sensor shown in FIG. 8 in a third phase according to an embodiment of the present invention.

After the third phase shown in FIG. 11, the fingerprint sensor 100 may perform again the operations in the second phase shown in FIG. 10, and then read out the signal on the node $N_{2A}$. The fingerprint sensor 100 may switch between the third phase and the second phase multiple times.

Figure 9:
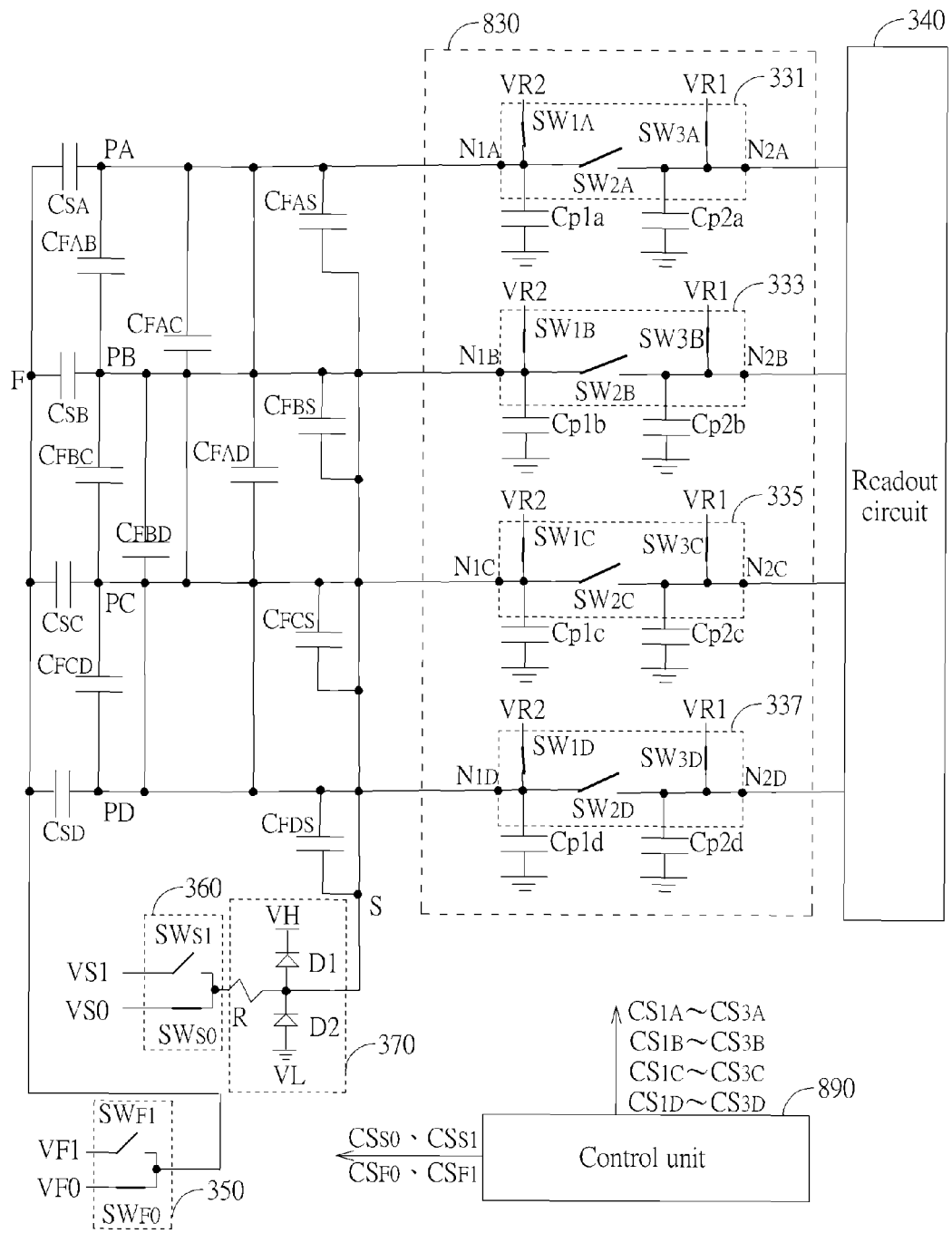
FIG. 9 is a circuit diagram of the fingerprint sensor shown in FIG. 8 in a first phase according to an embodiment of the present invention.
Figure 12:
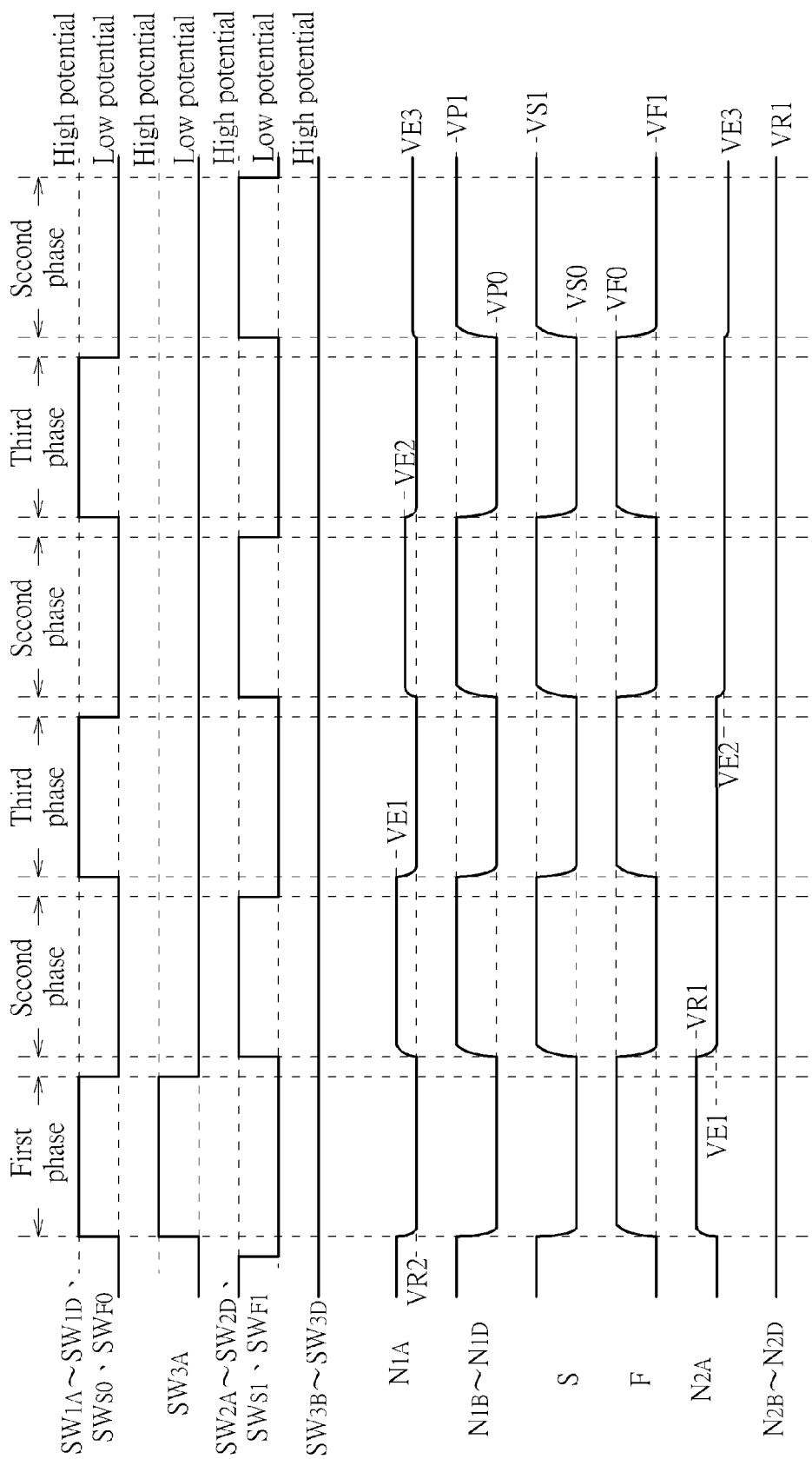
FIG. 12 is a timing diagram of fingerprint sensing operations of the fingerprint sensor shown in FIG. 8.

The aforementioned voltage switching operations shown in FIGS. 9-11 may be summarized in the timing diagram shown in FIG. 12. Regarding each switch, a high electric potential corresponds to an ON state (the switch turns on), and a low electric potential corresponds to an OFF state (the switch turns off). In the embodiment shown in FIG. 12, the voltage VR1 is greater than the voltage VR2. As a person skilled in the art should understand operations shown in FIG. 12 after reading paragraphs directed to FIGS. 7-11, further description is omitted here for brevity. In addition, over a period of time during which the fingerprint sensor 100 switches from the first phase (or the third phase) to the second phase, the switches $SW_{2A}$-$SW_{2D}$, $SW_{S1}$ and $SW_{F1}$ turn on after the switches $SW_{1A}$-$SW_{1D}$, $SW_{3A}$, $SW_{S0}$ and $SW_{F0}$ turn off. Over a period of time during which the fingerprint sensor 100 switches from the second phase to the third phase, the switches $SW_{1A}$-$SW_{1D}$, $SW_{3A}$, $SW_{S0}$ and $SW_{F0}$ turn on after the switches $SW_{2A}$-$SW_{2D}$, $SW_{S1}$ and $SW_{F1}$ turn off.

Figure 13:
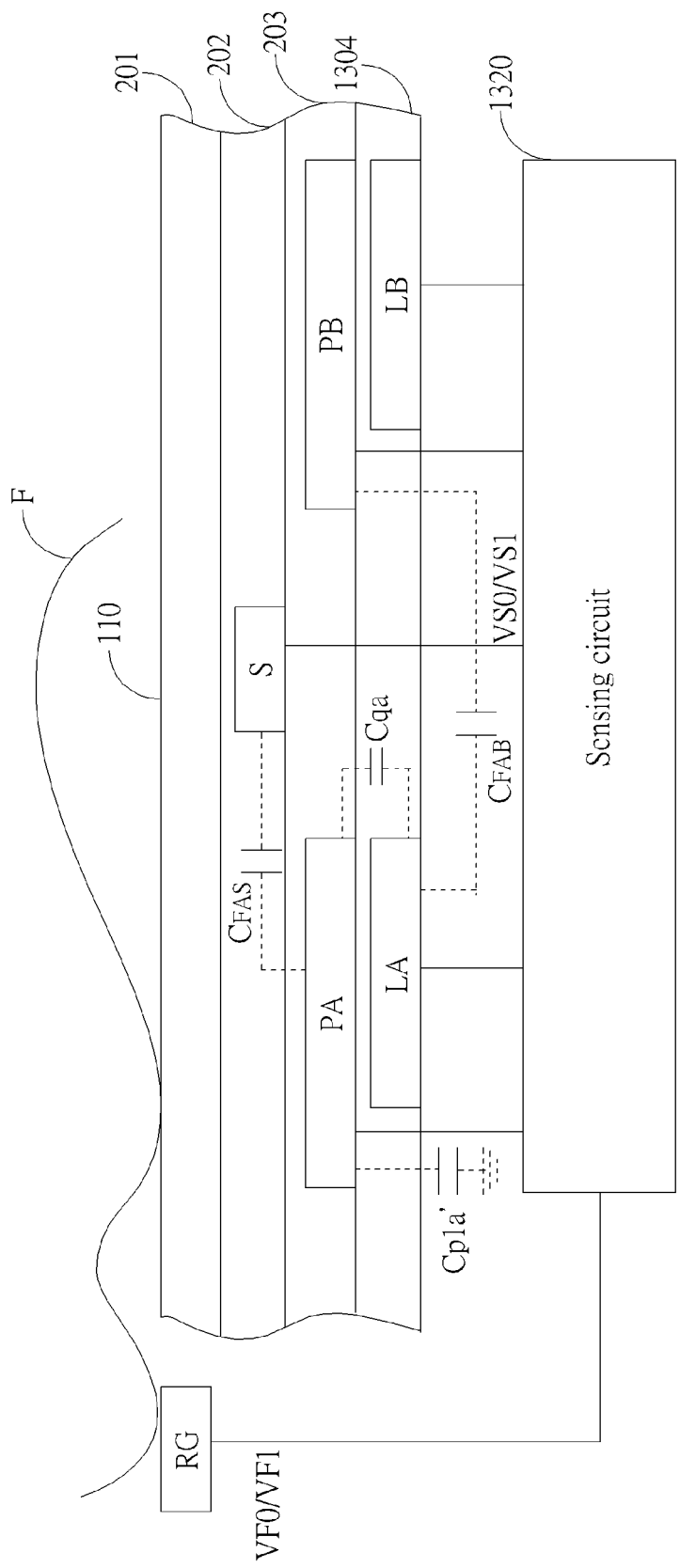
FIG. 13 is a diagram illustrating parasitic capacitances associated with an electrode plate to be measured of the fingerprint sensor shown in FIG. 1 according to another embodiment of the present invention.

In another embodiment, the proposed fingerprint sensor may use a shielding plate to reduce parasitic capacitances between an electrode plate to be measured and circuit element(s) located therebelow. The device structure shown in FIG. 13 is similar to that shown in FIG. 2, wherein the main difference is that the device structure shown in FIG. 13 further includes a dielectric layer 1304, wherein at least one shielding plate (e.g. shielding plates LA and LB) is disposed in the dielectric layer 1304 in order to reduce parasitic capacitances between an electrode plate to be measured and circuit element(s) located therebelow. The shielding plate may be a conductor (e.g. a metal element) which is located below the electrode plate to be measured. In other words, the shielding plate may be disposed between a sensing circuit and the electrode plate to be measured. For example, in a case where the electrode plate PA is used as an electrode plate to be measured, a capacitance between the electrode plate to be measured (the electrode plate PA) and other conductor(s) may be reduced from the capacitance Cp1a shown in FIG. 2 to capacitance Cp1a'. Although a capacitance Cqa (a parasitic capacitance) exists between the electrode plate PA and the shielding plate LA, the sensing circuit 1320 may adaptively switch a voltage coupled to the shielding plate LA to thereby reduce/eliminate effects of the capacitance Cqa on the measurement result.

Figure 14:
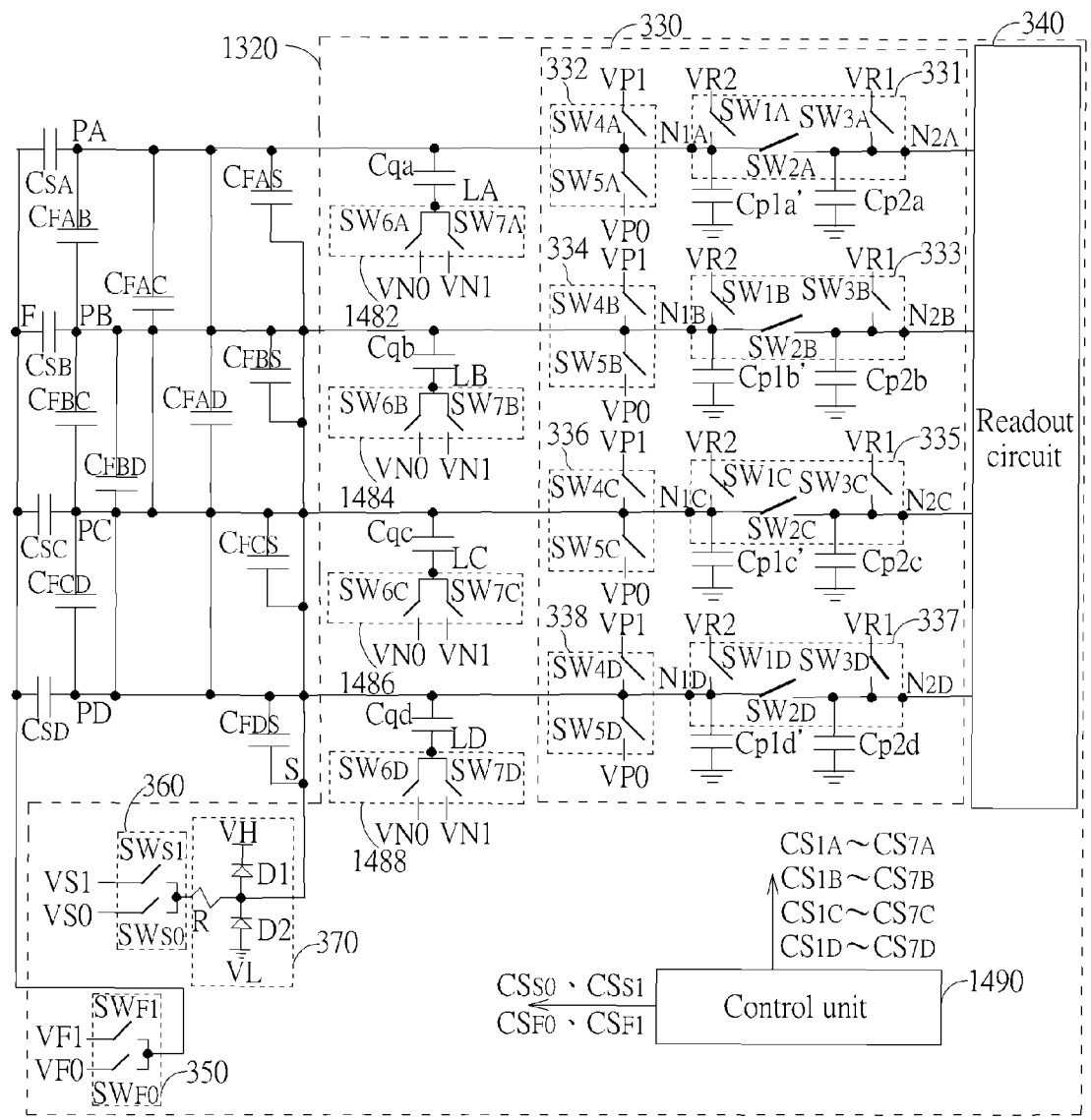
FIG. 14 is a diagram illustrating an exemplary circuit structure of the fingerprint sensor shown in FIG. 1 according to another embodiment of the present invention.

The device structure shown in FIG. 13 is employed in the embodiment shown in FIG. 14. In this embodiment, a plurality of capacitances Cqa-Cqd are parasitic capacitances formed between the electrode plates PA-PD and a corresponding shielding plate (one of the shielding plates LA-LD), respectively, and a plurality of capacitances Cp1a'-Cp1d' are parasitic capacitances formed between the electrode plates PA-PD and other conductor(s). The circuit structure of the sensing circuit 1320 is similar to that of the sensing circuit 120 shown in FIG. 3, wherein the main difference is that the sensing circuit 1320 further includes a plurality of switch units 1482-1484 (respectively connected to the shielding plates LA-LD). The control unit 1490 controls the switch units 1482-1484 to couple different voltages VN0 and VN1 to corresponding shielding plates.

In this embodiment, a plurality of switches $SW_{6A}$-$SW_{7A}$ of the switch unit 1482 may perform switching according a plurality of control signals $CS_{6A}$-$CS_{7A}$ respectively, a plurality of switches $SW_{6B}$-$SW_{7B}$ of the switch unit 1484 may perform switching according a plurality of control signals $CS_{6B}$-$CS_{7B}$ respectively, a plurality of switches $SW_{6C}$-$SW_{7C}$ of the switch unit 1486 may perform switching according a plurality of control signals $CS_{6C}$-$CS_{7C}$ respectively, and a plurality of switches $SW_{6D}$-$SW_{7D}$ of the switch unit 1488 may perform switching according a plurality of control signals $CS_{6D}$-$CS_{7D}$ respectively.

An operation of the switch unit 1482/1484/1486/1488 controlled by the control unit 1490 in a first phase, a second phase and a third phase is substantially similar/identical to an above-described operation of a switch unit corresponding to a conductor adjacent to an electrode plate to be measured. Regarding operations of other switch units in the first phase, the second phase and the third phase, description provided in the paragraphs directed to FIGS. 4-7 may be applied thereto as well.

In a case where the electrode plate PA is used as an electrode plate to be measured, the control unit 1490 controls the switch unit 1482 to couple the shielding plate LA to the voltage VN0 in the first phase (e.g. a pre-charge mode), controls the switch unit 1482 to couple the shielding plate LA to the voltage VN1 in the second phase (e.g. a detection mode), and controls the switch unit 1482 to couple the shielding plate LA to the voltage VN0 in the third phase. In this embodiment, the voltage VR2 is greater than the voltage VR1, and the voltage VN0 is greater than the voltage VN1. In another embodiment, the voltage VR2 is less than the voltage VR1, and the voltage VN0 is less than the voltage VN1.

In other embodiments, the control unit 1490 controls the switch unit 1484/1486/1488 to couple the shielding plate LB/LC/LD to the voltage VN0 in the first phase, and controls the switch unit 1484/1486/1488 to couple the shielding plate LB/LC/LD to the voltage VN1 in the second phase.

The shielding plates LA-LD, the switch units 1482-1488 and the corresponding voltage switching operations may be employed in the circuit structure shown in FIGS. 8-11 or other circuit structures.

Figure 15:
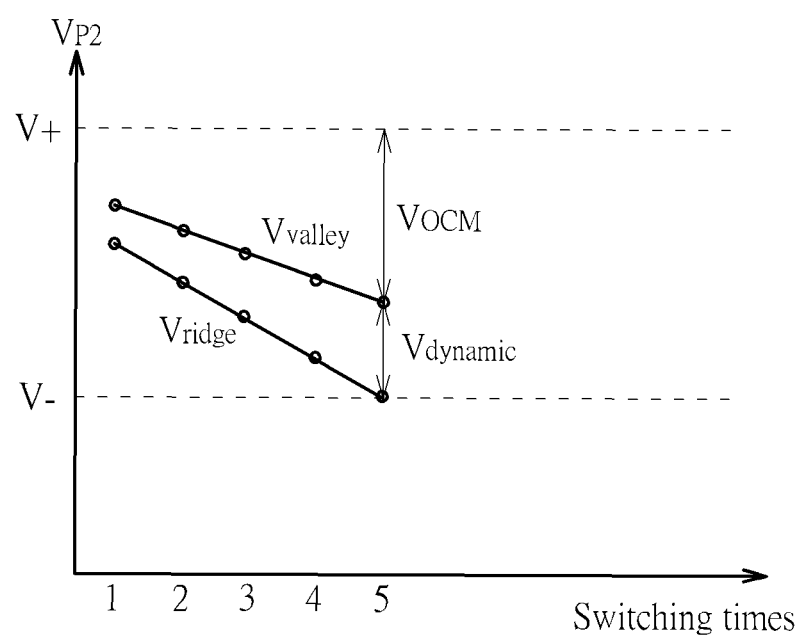
FIG. 15 is a diagram illustrating an exemplary voltage dynamic range and switching times of a fingerprint sensor according to an embodiment of the present invention.

In the embodiment shown in FIG. 7 or FIG. 12, alternate switching between the second phase and the third phase may accumulate measurement results of the electrode plate to be measured (the electrode plate PA) on the node $N_{2A}$ multiple times, wherein the readout circuit reads the signal on the node $N_{2A}$ in the second phase. FIG. 15 illustrates the relationship between the voltage $V_{P2}$ at the node $N_{2A}$ and the switching times in a case where the voltage VR1 is greater than the voltage VR2. A symbol $V_{valley}$ represents a voltage caused by a valley portion of a fingerprint, and a symbol $V_{ridge}$ represents a voltage caused by a ridge portion of the fingerprint. As the number of switching times increases, a difference between $V_{valley}$ and $V_{ridge}$ increases accordingly. This helps determine whether the measurement result corresponds to the valley portion or ridge portion of the fingerprint, thus increasing accuracy of fingerprint recognition.

Figure 16:
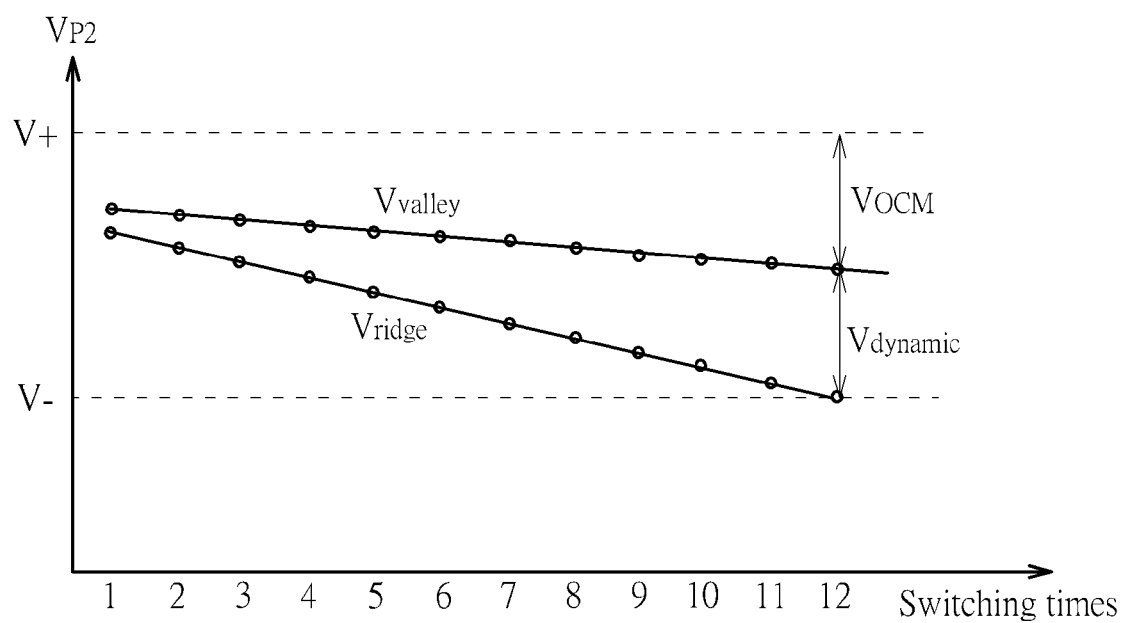
FIG. 16 is a diagram illustrating an exemplary voltage dynamic range and switching times of a fingerprint sensor according to another embodiment of the present invention.

In the embodiments shown in FIG. 13 and FIG. 14, a parasitic capacitance of the electrode plate to be measured may be decreased from the capacitance Cp1a to the capacitance Cp1a' by disposing shielding plates and switching electric potentials thereof. A common-mode voltage level is decreased accordingly. In the embodiment shown in FIG. 14, alternate switching between the second phase and the third phase may accumulate measurement results of the electrode plate to be measured (the electrode plate PA) on the node $N_{2A}$ multiple times. FIG. 16 illustrates the relationship between the voltage $V_{P2}$ at the node $N_{2A}$ and the switching times in a case where the voltage VR1 is greater than the voltage VR2. Compared to the relationship shown in FIG. 15, the number of switching times shown in FIG. 16 may increase due to the decreased common-mode voltage level $V_{OCM}$, thus obtaining a greater voltage dynamic range $V_{dynamic}$ between a maximum operating voltage V+ and a minimum operating voltage V−.

Increasing the difference between the voltage VR2 and the voltage VR1 shown in FIG. 14 (e.g. using a greater voltage as the voltage VR2) may increase the voltage dynamic range $V_{dynamic}$. In this embodiment, the voltage VR2 is greater than the voltage VR1, the voltage VN0 is greater than the voltage VN1, and a difference value obtained by subtracting the voltage VN1 from the voltage VN0 is greater than a difference value obtained by subtracting the voltage VR1 from the voltage VR2 (i.e. (VN0−VN1)>(VR2−VR1)). The voltage VR2 is a high voltage (e.g. 15V), the voltage VR1 is a low voltage (e.g. 1V), the voltage VN0 is a high voltage (e.g. 18V), and the voltage VN1 is a low voltage (e.g. 0V). In this embodiment, an input voltage of the readout circuit 340 falls within a voltage range suitable for a low-voltage device. This means that devices of the readout circuit 340 don't have to be implemented by high-voltage devices. A chip size and power consumption can be reduced accordingly. Specifically, if the voltage VR1 is a high voltage and the voltage VR2 is a low voltage, high-voltage devices has to be utilized in the readout circuit 340. As a size of a high-voltage device is larger than that of a low-voltage device, a size of the readout circuit 340 will increase. On the other hand, if the high-voltage devices are used in the readout circuit 340, a high voltage power source is needed, which increases a circuit size and power consumption of a voltage doubler.

In one embodiment where a high voltage is used as the voltage VR2, increasing the difference between the voltage VP0 and the voltage VP1 may increase the voltage dynamic range $V_{dynamic}$. In this embodiment, the voltage VP0 is greater than the voltage VP1, and a difference value obtained by subtracting the voltage VP1 from the voltage VP0 is greater than the difference value obtained by subtracting the voltage VR1 from the voltage VR2 (i.e. (VP0−VP1)>(VR2−VR1)).

In the above embodiments, the fingerprint sensor switches respective voltages applied to a finger, an ESD protection electrode, an electrode plate adjacent to an electrode plate to be measured, and a shielding plate. However, this is not meant to be a limitation of the present invention. In other embodiments, it is possible to switch the voltage applied to the finger, and only one of the voltages applied to the ESD protection electrode, the electrode plate adjacent to the electrode plate to be measured, and the shielding plate. It still can reduce/eliminate part of the parasitic capacitance, and increase a signal level of a sensing signal.

The readout circuit 340 shown in FIG. 8 may be implemented by a plurality of differential circuits. In the embodiment shown in FIG. 17, the readout circuit 1740 includes four differential circuits 13a-13d, wherein respective non-inverting input terminals (+) of the differential circuits 13a-13d are connected to the nodes $N_{2A}$-$N_{2D}$. The differential circuits 13a-13d are used for reading out the signals on the nodes $N_{2A}$-$N_{2D}$, respectively, to thereby obtain measurement results of the electrode plates PA-PD. Regarding the differential circuit 13a, the differential circuit 13a includes a non-inverting input terminal (+), an inverting input terminal (−) and a voltage output terminal $V_{OA}$, wherein the differential circuit 13a has a gain $G_A$.

The switches $SW_{8A}$-$SW_{8D}$ are coupled between the voltage VR1 and respective inverting input terminals (−) of the differential circuits 13a-13d, respectively. In a case where the electrode plate PA is used as an electrode plate to be measured, the control unit 1790 controls the switch $SW_{8A}$ to turn on in a first phase, and controls the switch $SW_{8A}$ to turn off in a second phase. In this embodiment, the switches $SW_{8B}$-$SW_{8D}$ may turn on in the first and second phases. In other embodiments, the switches $SW_{8B}$-$SW_{8D}$ may turn off in the first and second phases. Regarding operations of other switch units in the first phase, the second phase and the third phase, description provided in the paragraphs directed to FIGS. 8-12 may be applied thereto as well.

Regarding the differential circuit 13a, an output voltage $V_{OA}$ represents a measurement result of the electrode plate to be measured (the electrode plate PA), and is expressed by the formula $V_{OA}=G_A \times (V_{IPA}-V_{INA})+V_{OCM}$, wherein $G_A$ is the gain of the differential circuit 13a, $V_{IPA}$ is the voltage at the non-inverting input terminal $I_{PA}$, $V_{INA}$ is the voltage at the inverting input terminal $I_{N4}$, and $V_{OCM}$ is the common-mode voltage level. After the operations in the first phase and the second phased are performed, the output voltage $V_{OA}$ of the differential circuit 13a connected to the electrode plate PA may be expressed by the following formula:

$$V_{OA} = G_A \times \{[C_{SA} \times (V_{R1} - V_{R2})]/C_T + [C_{FPPA} \times (V_{R1} - V_{R2} - V_{R1} + V_{R2})]/C_T + [C_{FAS} \times (V_{R1} - V_{R2} - V_{R1} + V_{R2})]/C_T + [C_{p1a} \times (V_{R1} - V_{R2})]/C_T\} + V_{OCM},$$

where $C_{FPPA}$ is a sum of $C_{FAB}$, $C_{FAC}$ and $C_{FAD}$.

The above formula may be simplified as follows:

$$V_{OA} = G_A \times \{[C_{SA} \times (V_{R1} - V_{R2})]/C_T + [C_{p1a} \times (V_{R1} - V_{R2})]/C_T\} + V_{OCM},$$

where $C_T = C_{SA} + C_{FPPA} + C_{FAS} + C_{p1a} + C_{p2a}$. In view of the above simplified formula, the fringe capacitance terms $C_{FPPA}$ and $C_{FAS}$ of the numerator are removed. This means that the proposed fingerprint sensor scheme can reduce the effects of a capacitance between the electrode plate PA and an adjacent electrode plate and a capacitance between the electrode plate PA and an ESD protection electrode on the output of the differential circuit 13a.

Figure 17:
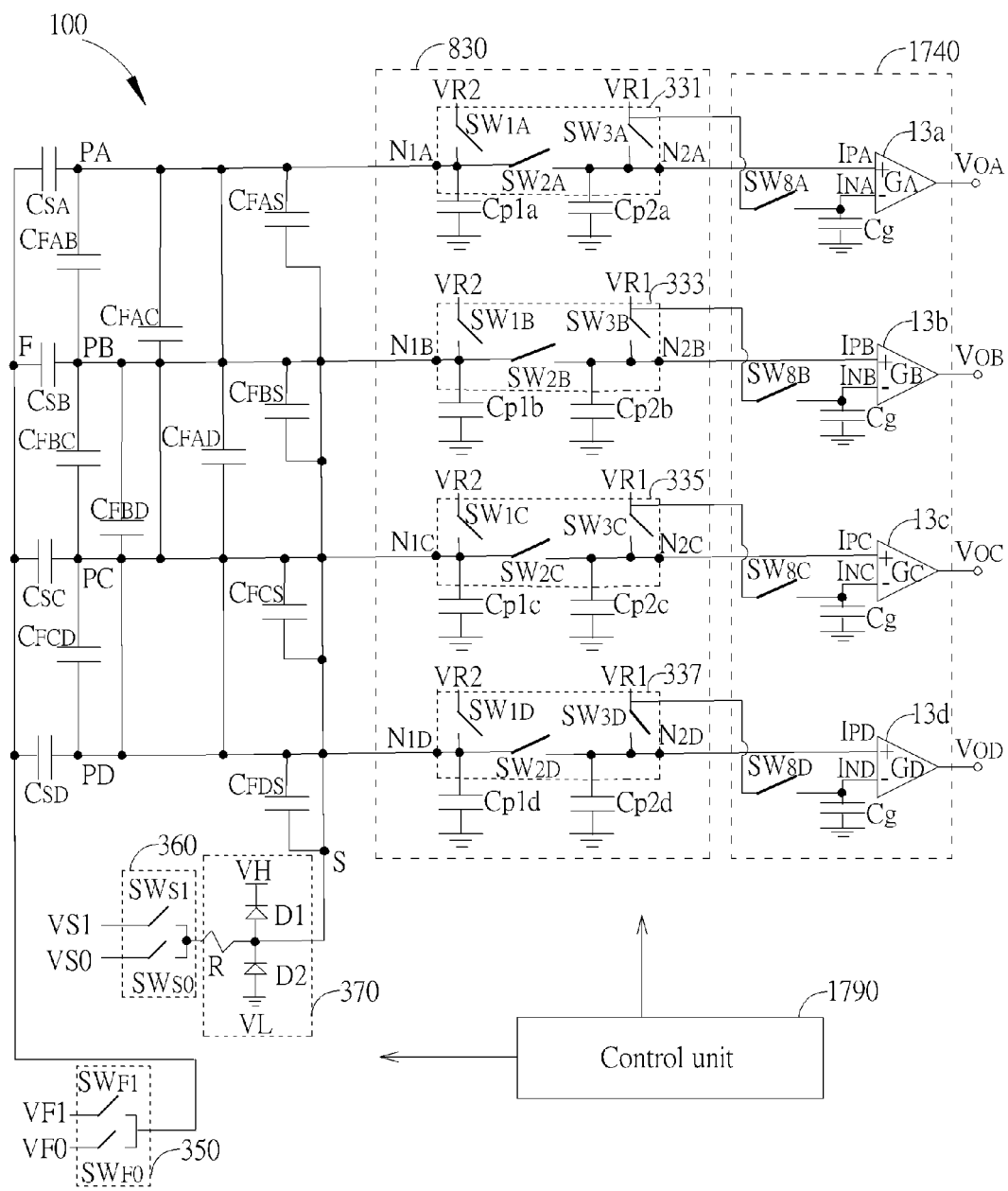
FIG. 17 is a circuit diagram of an exemplary sensing circuit of a fingerprint sensor according to an embodiment of the present invention.
Figure 18:
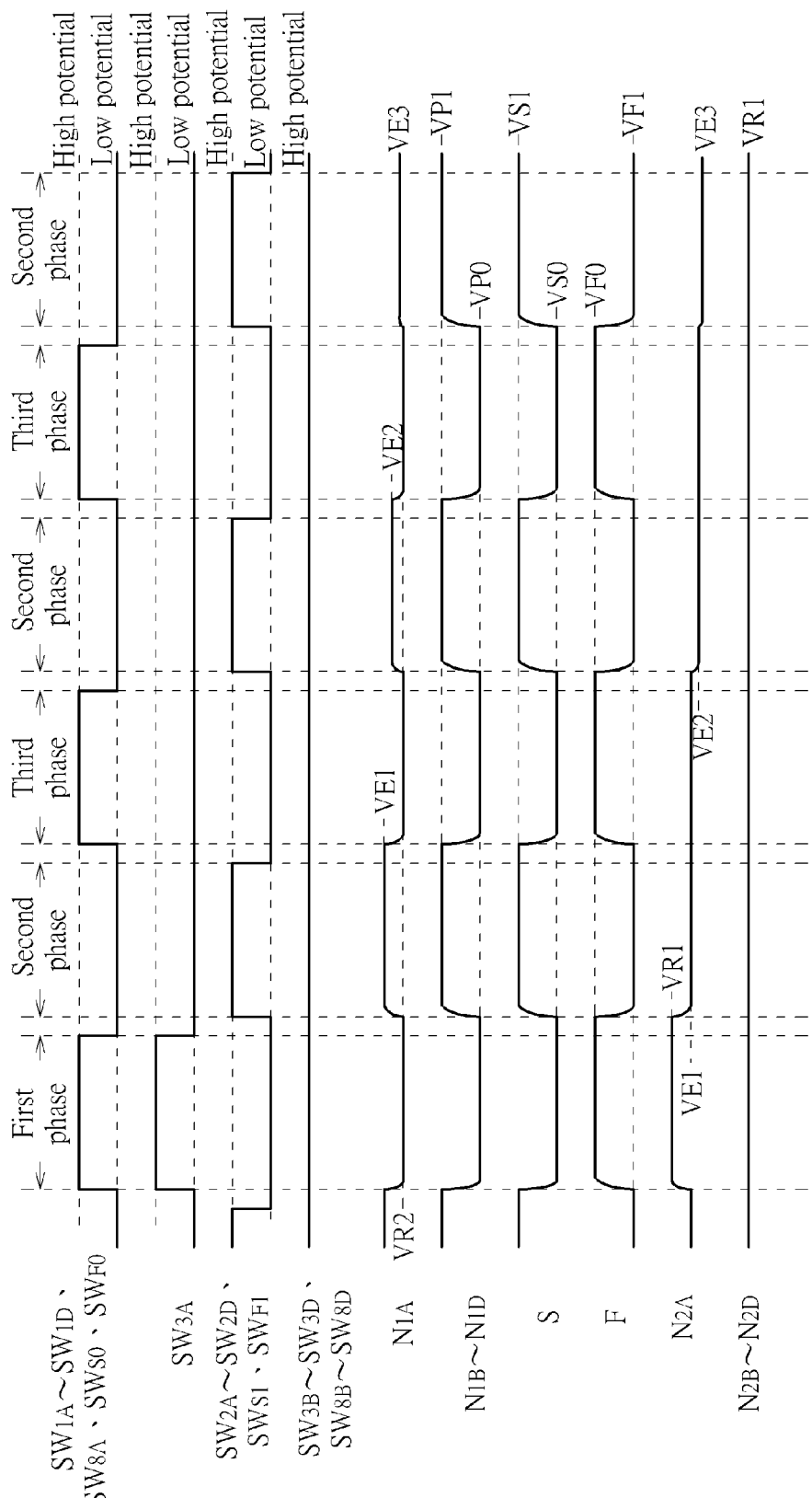
FIG. 18 illustrates a timing diagram of respective switch states of the switches and respective voltage levels of the nodes of the circuit shown in FIG. 17 according to an embodiment of the present invention.

FIG. 18 illustrates a timing diagram of respective switch states of the switches and respective voltage levels of the nodes of the circuit shown in FIG. 17 in the first phase and the second phase according to an embodiment of the present invention. FIG. 18 is similar to FIG. 12, wherein the main difference is that switch states of the switches $SW_{8A}$-$SW_{8D}$ are depicted in FIG. 18.

Figure 19:
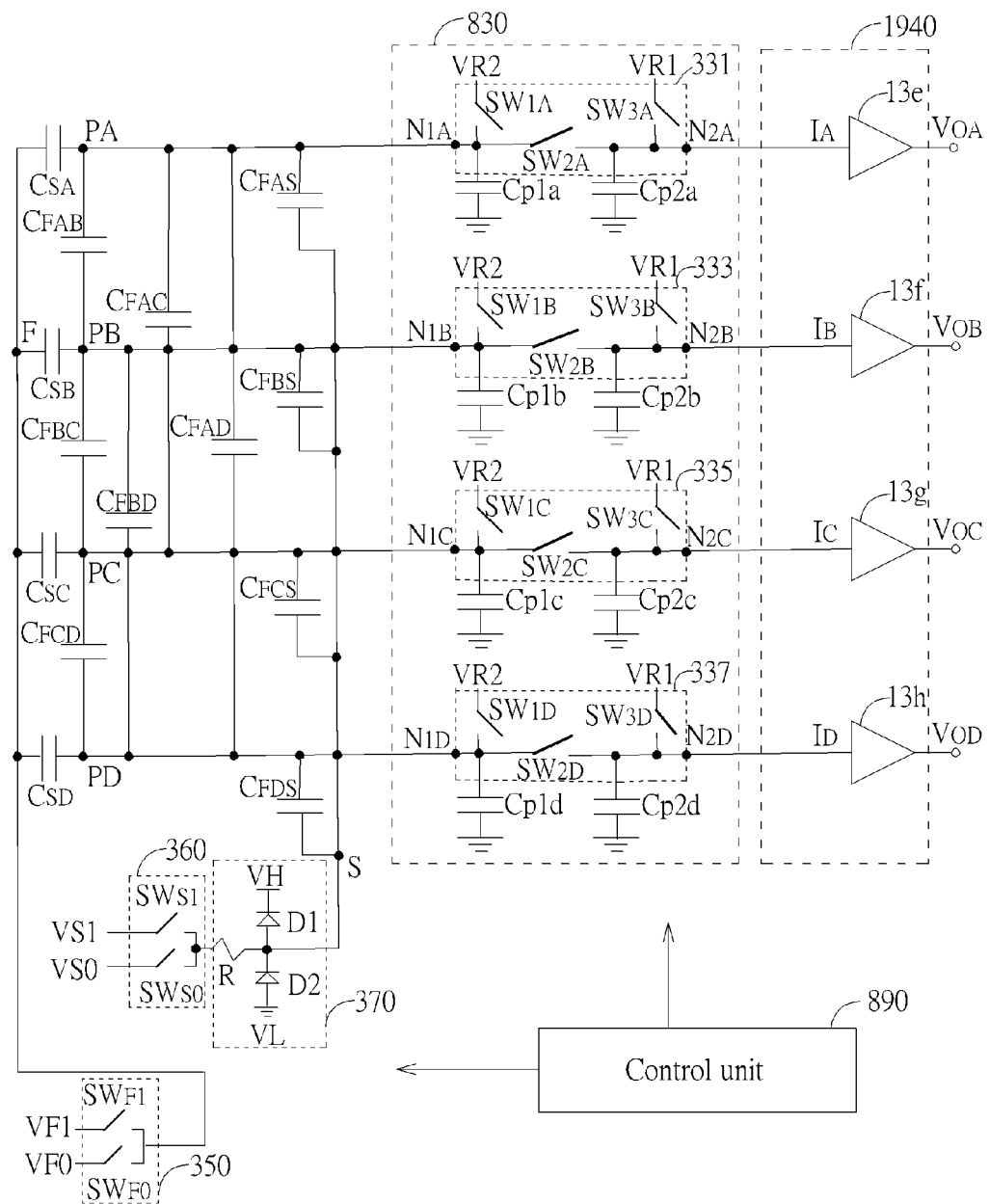
FIG. 19 is a circuit diagram of an exemplary sensing circuit of a fingerprint sensor according to another embodiment of the present invention.

The main difference between the embodiment shown in FIG. 19 and the embodiment shown in FIG. 17 is that buffers are used as readout circuit elements for corresponding electrode plates. In the embodiment shown in FIG. 19, the readout circuit 1940 includes four buffers 13e-13h, wherein respective single input terminals $I_A$-$I_D$ of the buffers 13e-13h are connected to the nodes $N_{2A}$-$N_{2D}$ respectively. The buffers 13e-13h are used for reading out the signals on the nodes $N_{2A}$-$N_{2D}$ to thereby obtain the measurement results of the electrode plates PA-PD.

Regarding the buffer 13e, the output voltage $V_{OA}$ is expressed by the formula $V_{OA} = G_U \times V_{IA} + V_{shift}$, wherein $G_U$ is the gain of the buffer 13e, $V_{IA}$ is the voltage at the input terminal $I_A$, and $V_{shift}$ is the shifted voltage of the output of the buffer 13e. After the operations in the first phase and the second phase are performed, the output voltage $V_{OA}$ of the buffer 13e connected to the electrode plate PA (the electrode plate to be measured) may be expressed by the following formula:

$$V_{OA} = G_A \times \{[C_{SA} \times (V_{R1} - V_{R2})]/C_T + [C_{FPPA} \times (V_{R1} - V_{R2} - V_{R1} + V_{R2})]/C_T + [C_{FAS} \times (V_{R1} - V_{R2} - V_{R1} + V_{R2})]/C_T + [C_{p1a} \times (V_{R1} - V_{R2})]/C_T + V_{R2}\} + V_{shift},$$

The above formula may be simplified as follows:

$$V_{OA} = G_A \times \{[C_{SA} \times (V_{R1} - V_{R2})]/C_T + [C_{p1a} \times (V_{R1} - V_{R2})]/C_T + V_{R2}\} + V_{shift},$$

where $C_T = C_{SA} + C_{FPPA} + C_{FAS} + C_{p1a} + C_{p2a}$.

In view of the above simplified formula, the fringe capacitance terms $C_{FPPA}$ and $C_{FAS}$ of the numerator are removed. In other words, the aforementioned control operations in the first and second phases can reduce/eliminate the effects of the fringe capacitances $C_{FPPA}$ and $C_{FAS}$ on the output of the buffer 13e.

Figure 20:
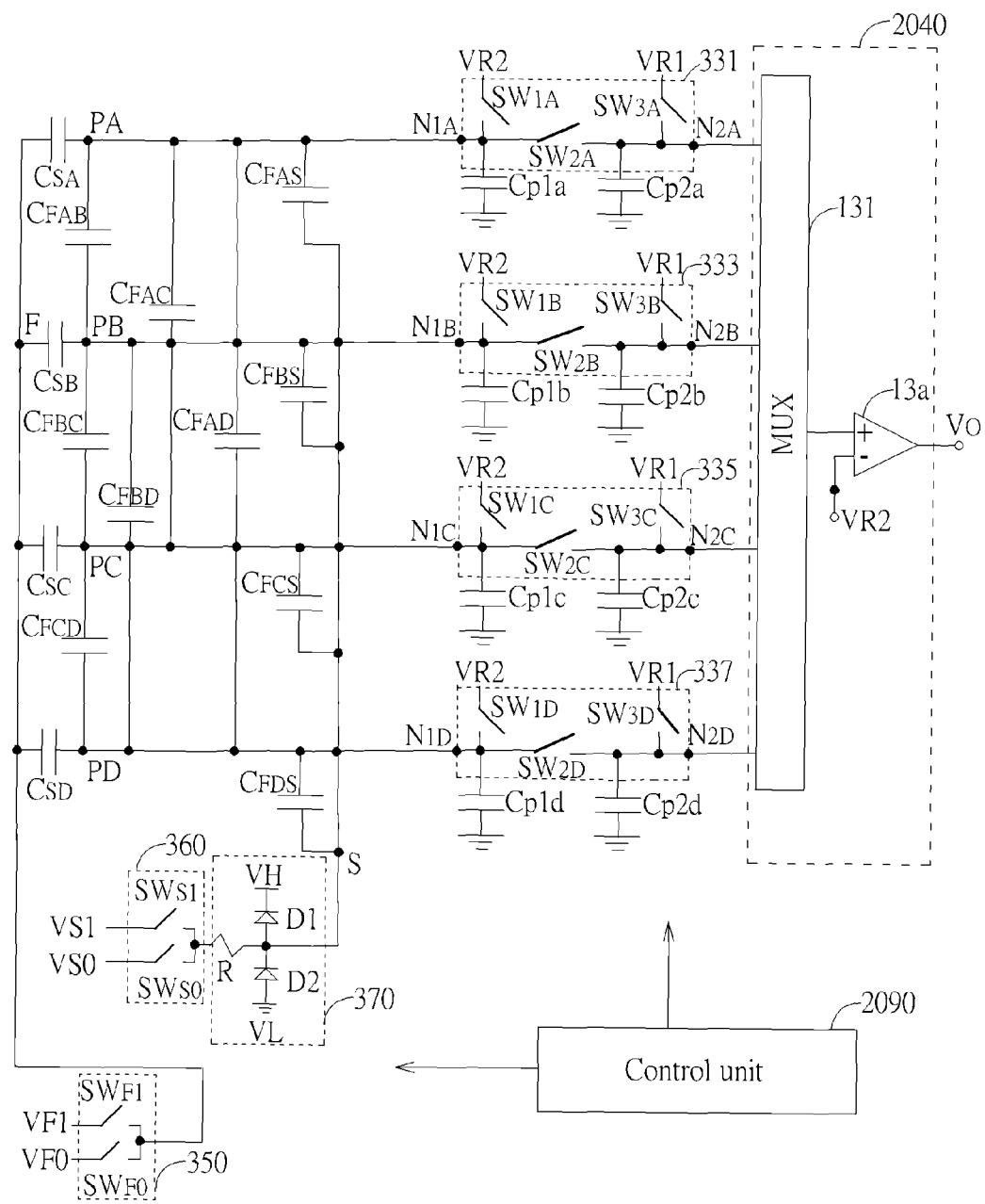
FIG. 20 is a circuit diagram of an exemplary sensing circuit of a fingerprint sensor according to another embodiment of the present invention.

The readout circuit 340 shown in FIG. 8 may be implemented by a multiplexer and a differential circuit connected in series. As shown in FIG. 20, the readout circuit 2040 includes a multiplexer (MUX) 131 and the differential circuit 13a connected to each other. The MUX 131 is connected between the non-inverting input terminal (+) of the differential circuit 13a and the nodes $N_{2A}$-$N_{2D}$, and is controlled by the control unit 2090. As shown in FIG. 20, each of the electrode plates PA-PD is connected to the differential circuit 13a through the MUX 131. When the electrode plate PA is under measurement, the control unit 2090 controls the MUX 131 to connect the node $N_{2A}$ to the non-inverting input terminal (+) to thereby read out the signal on the node $N_{2A}$.

Figure 21:
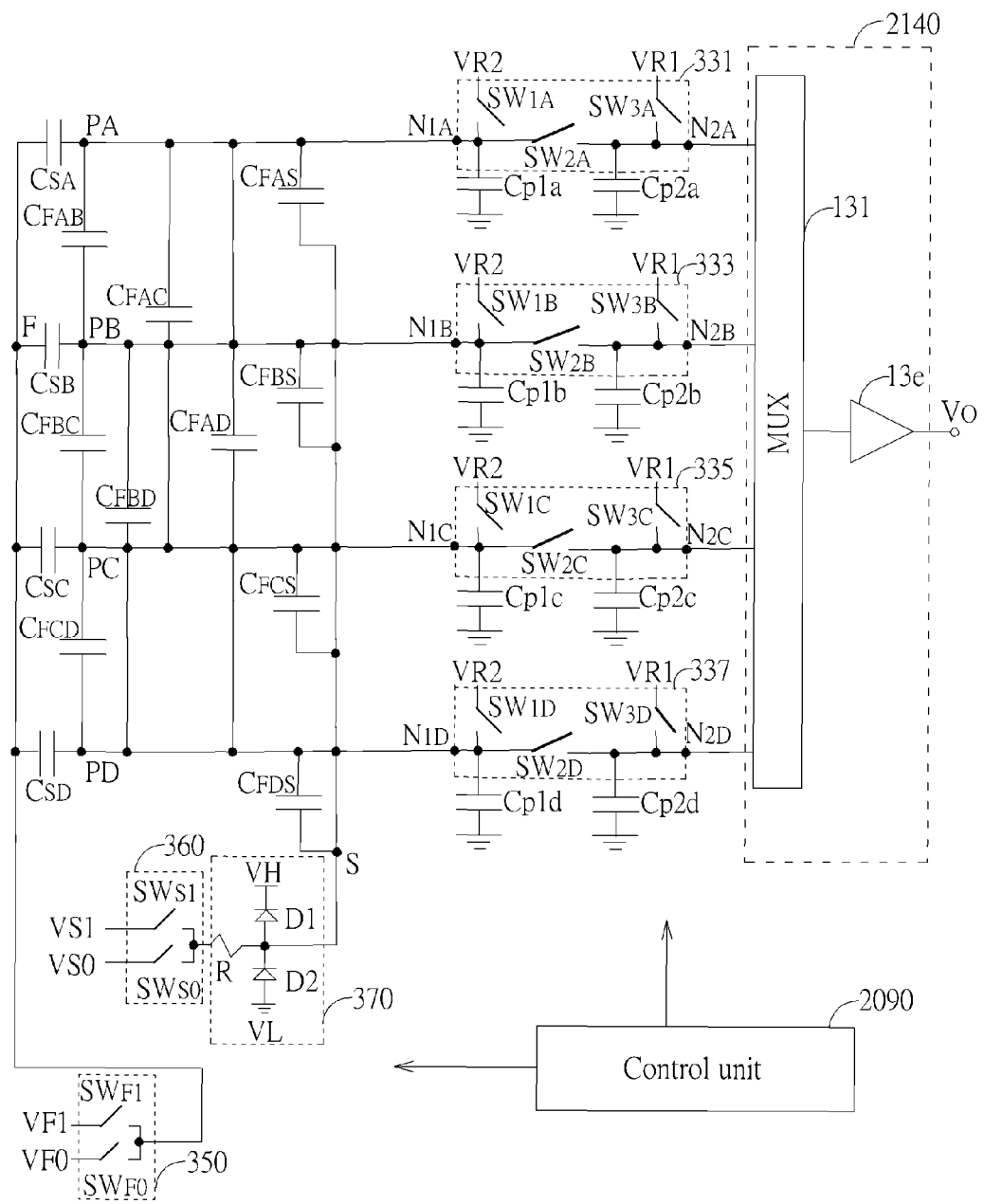
FIG. 21 is a circuit diagram of an exemplary sensing circuit of a fingerprint sensor according to another embodiment of the present invention.

The readout circuit 340 shown in FIG. 8 may be implemented by a multiplexer and a buffer connected in series. As shown in FIG. 21, the readout circuit 2140 includes the multiplexer (MUX) 131 and the buffer 13e connected to each other. The MUX 131 is connected between the single input terminal of the buffer 13e and the nodes $N_{2A}$-$N_{2D}$, and is controlled by the control unit 2090. As shown in FIG. 21, each of the electrode plates PA-PD is connected to the buffer 13e through the MUX 131. When the electrode plate PA is under measurement, the control unit 2090 controls the MUX 131 to connect the node $N_{2A}$ to the input terminal of the buffer 13e to thereby read out the signal on the node $N_{2A}$.

In the embodiment shown in FIG. 20, the differential circuit 13a is shared by the electrode plates PA-PD. In the embodiment shown in FIG. 21, the buffer 13e is shared by the electrode plates PA-PD. This arrangement may reduce the number of circuit elements, thus reducing costs and complexity.

The readout circuits shown in FIG. 17, FIG. 19, FIG. 20 and FIG. 21 may be employed in the circuit structure shown in FIG. 3. Similar description is not repeated here for brevity.

In other embodiments, more than one electrode plates may be measured concurrently. In other words, respective sensing signals of multiple electrode plates may be read concurrently. For example, sensing signals of electrode plates corresponding to the first row are read concurrently, while sensing signals of electrode plates corresponding to other rows are not read.

The above embodiments using four electrodes for fingerprint sensing are for illustrative purposes only. In the aforementioned embodiments, respective switch units of other three adjacent electrodes may employ the same/similar control mechanism. In one embodiment, switches unit(s) of at least one electrode adjacent to the electrode plate to be measured may employ the proposed control mechanism. In another embodiment, switch units of all of electrodes plates excluding the electrode plate to be measured may employ the proposed control mechanism. In still another embodiment, multiple electrode plates are under measurement concurrently, and switch units of a plurality of electrode plates adjacent to the multiple electrode plates to be measured may employ the proposed control mechanism.

In accordance with the description of the above embodiments and related timing diagrams, the proposed sensing method may be summarized below.

Step (a): Apply a first voltage to a first node connected to the electrode plate to be measured, apply a second voltage different from the first voltage to a second node disconnected from the first node, and apply a third voltage to a conductor adjacent to the electrode plate to be measured.

Step (b): Provide a first finger drive voltage, wherein the first finger drive voltage is arranged for coupling the finger.

Step (c): Stop applying the first voltage, the second voltage and the third voltage to the first node, the second node and the conductor respectively.

Step (d): After step (c), apply a fourth voltage different from the third voltage to the conductor, and connect the first node to the second node.

Step (e): After steps (b) and (c), provide a second finger drive voltage different from the first finger drive voltage, wherein the second finger drive voltage is arranged for coupling the finger (or a finger drive electrode coupled to the finger).

Step (f): After steps (d) and (e), obtain a measurement result of the electrode plate to be measured according to a signal on the second node.

In one embodiment, the first voltage is greater than the second voltage, the third voltage is greater than the fourth voltage, and the first finger drive voltage is less than the second finger drive voltage. In another embodiment, the first voltage is less than the second voltage, the third voltage is less than the fourth voltage, and the first finger drive voltage is greater than the second finger drive voltage.

In one embodiment, the first voltage subtracted by the second voltage is equal to the third voltage subtracted by the fourth voltage.

Additionally, after step (d) is performed and before the signal on the second node is read out, the proposed sensing method may further include the following steps: disconnecting the first node from the second node; applying the first voltage to the first node, and applying the third voltage to the conductor; applying the first finger drive voltage to the finger (or the drive electrode); stopping applying the first voltage and the third voltage, and then performing step (d) again; and applying the second finger drive voltage to the finger (or the finger drive electrode).

Figure 22:
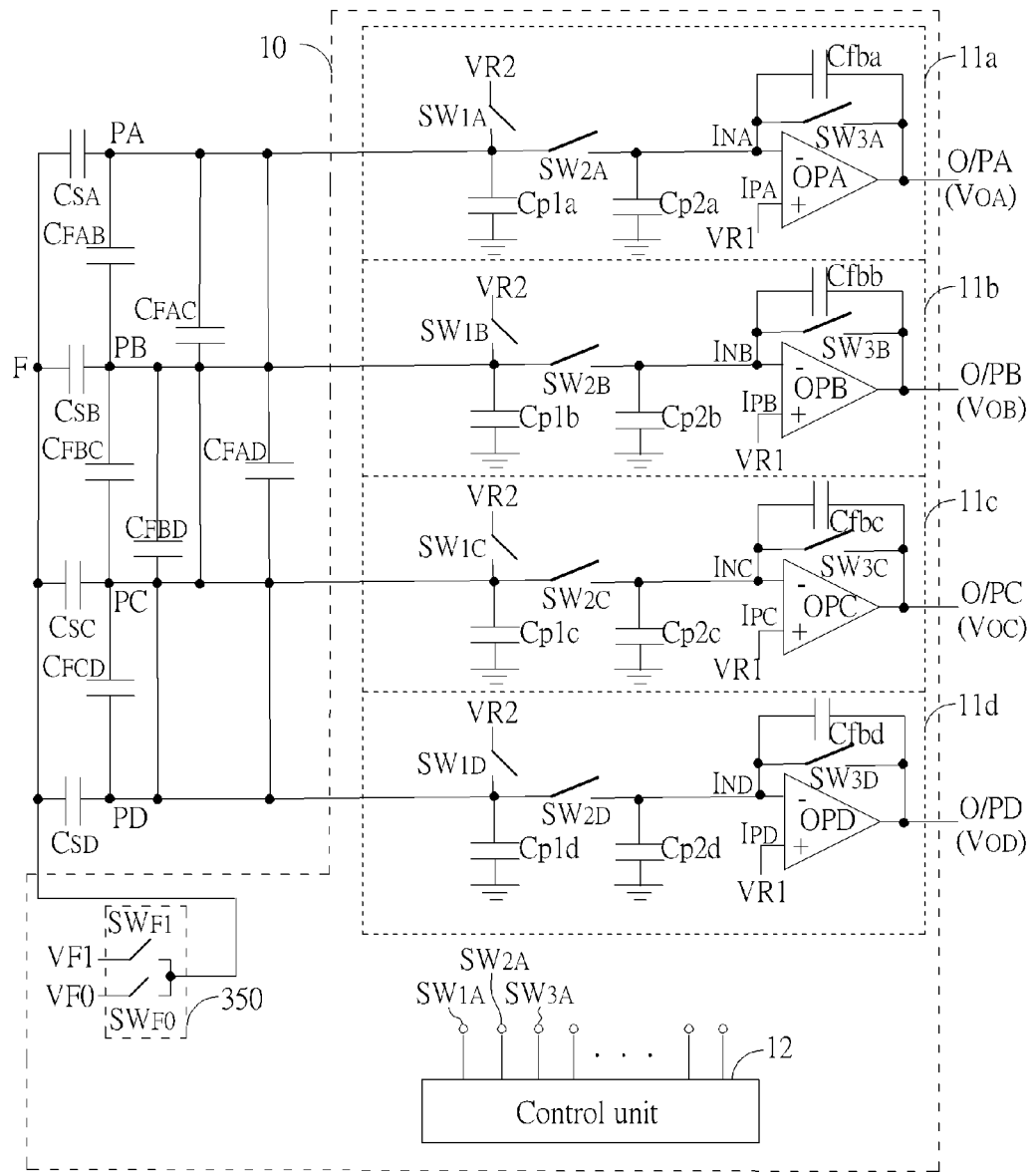
FIG. 22 is a circuit diagram of an exemplary sensing circuit of a fingerprint sensor according to another embodiment of the present invention.

FIG. 22 illustrates another exemplary fingerprint sensing scheme used for the electrode plates PA-PD shown in FIG. 1 according to an embodiment of the present invention. The sensing circuit 10 includes the switch unit 350 shown in FIG. 3 and a plurality of measurement units 11a-11d. The switch unit 350 is used for switching a voltage applied to the finger F, and includes a plurality of switches $SW_{F0}$-$SW_{F1}$. The switch $SW_{F0}$ is coupled between a finger drive electrode (not shown in FIG. 22) and the finger drive voltage VF0, and the switch $SW_{F1}$ is coupled between the finger drive electrode and the finger drive voltage VF1. The finger drive electrode is located around a fingerprint sensor surface (e.g. the sensor surface 110 shown in FIG. 2) to allow finger contact. The finger drive voltages VF0 and VF1 are coupled to the finger F through the finger drive electrode. The control unit 12 controls the switch $SW_{F0}$ to couple the finger drive voltage VF0 to the finger F, and controls the switch $SW_{F1}$ to couple the finger drive voltage VF1 to the finger F.

Each measurement unit includes an operational amplifier (i.e. operational amplifiers OPA-OPD), a sensing capacitor (i.e. sensing capacitors Cfba-Cfbd) and a plurality of switches (i.e. switches $SW_{1A}$-$SW_{3A}$, $SW_{1B}$-$SW_{3B}$, $SW_{1C}$-$SW_{3C}$ and $SW_{1D}$-$SW_{3D}$). The control unit 12 is used for controlling operations of the switches $SW_{1A}$-$SW_{3A}$, $SW_{1B}$-$SW_{3B}$, $SW_{1C}$-$SW_{3C}$ and $SW_{1D}$-$SW_{3D}$.

As shown in FIG. 22, respective circuit structures of the measurement units 11a-11d are substantially the same. Regarding the measurement unit 11a connected to the electrode plate PA, the operational amplifier OPA includes an inverting input terminal $I_{NA}$, non-inverting input terminal $I_{PA}$ and an output terminal O/PA. The capacitor Cfba is coupled between the inverting input terminal $I_{NA}$ and the output terminal O/PA of the operational amplifier OPA. One terminal of the switch $SW_{1A}$ is connected to the electrode plate PA, and another terminal of the switch $SW_{1A}$ is connected to the voltage VR2. The switch $SW_{2A}$ is coupled between the electrode plate PA and the inverting input terminal $I_{NA}$ of the operational amplifier OPA. The switch $SW_{3A}$ is coupled between the output terminal O/PA and the inverting input terminal $I_{NA}$ of the operational amplifier OPA. The non-inverting input terminal $I_{PA}$ of the operational amplifier OPA is connected to the voltage VR1.

Each of symbols $C_{FAB}$, $C_{FBC}$, $C_{FCD}$, $C_{FAC}$, $C_{FBD}$ and $C_{FAD}$ represents a capacitance between two electrode plates (a fringe capacitance). Parasitic capacitances associated with the electrode plates PA-PD, excluding the aforementioned fringe capacitance and plate capacitance (formed between the finger F and a corresponding electrode plate), are labeled Cp1a-Cp1d. Parasitic capacitances associated with the inverting input terminals $I_{NA}$-$I_{ND}$ are labeled Cp2a-Cp2d.

In the following, the electrode plate PA is used as an electrode plate to be measured for further description of the fingerprint sensing scheme employed in the circuit structure shown in FIG. 22.

Figure 23:
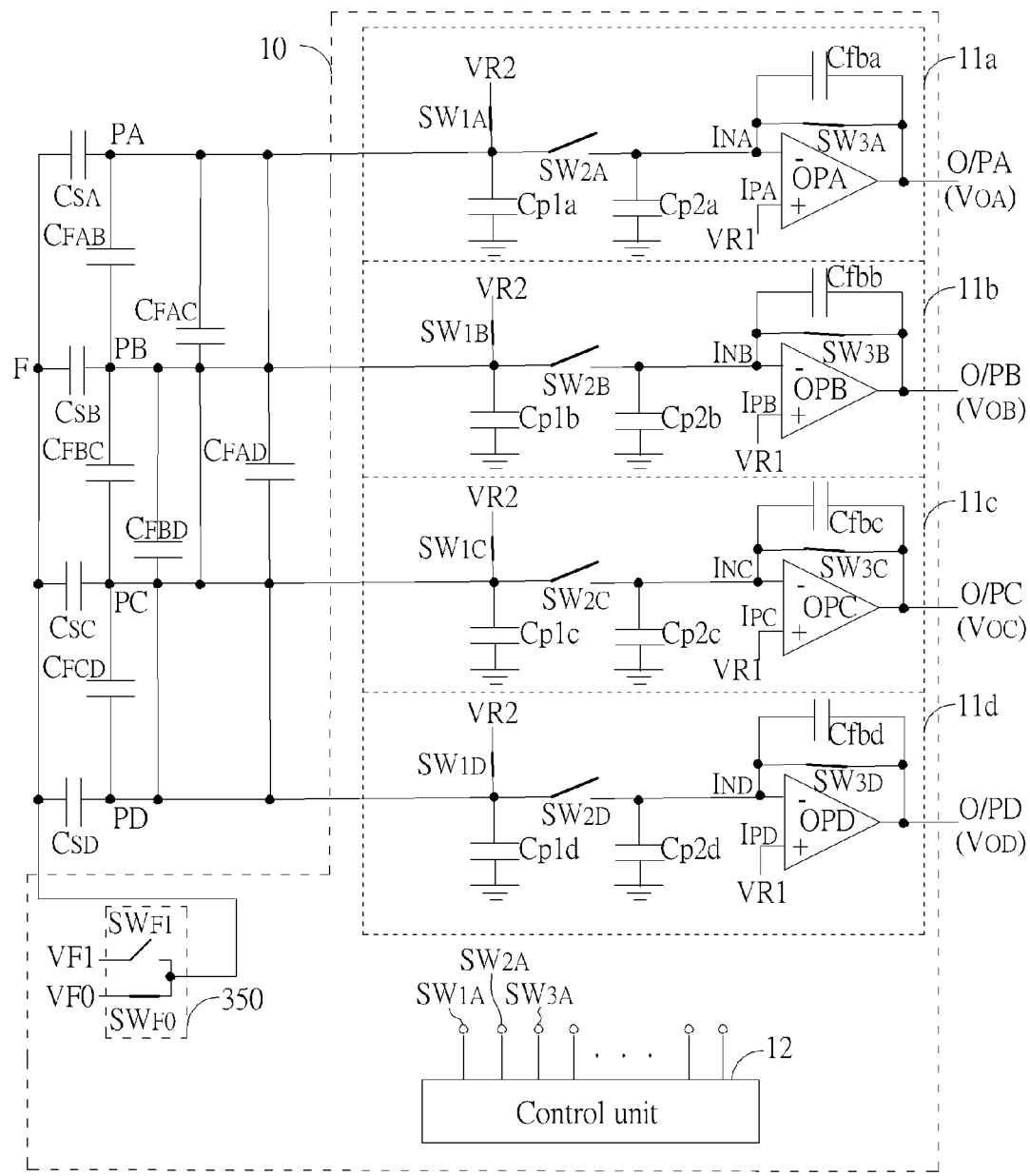
FIG. 23 is a circuit diagram of the sensing circuit shown in FIG. 22 in a first phase according to an embodiment of the present invention.

In a first phase (e.g. an excitation phase) shown in FIG. 23, the control unit 12 turns on the switch $SW_{F0}$ of the switch unit 350 such that the finger drive voltage VF0 is coupled to the finger F. The switches $SW_{2A}$-$SW_{2D}$ turn off. The switches $SW_{1A}$-$SW_{1D}$ turn on such that the nodes $N_{1A}$-$N_{1D}$ are coupled to the voltage VR2. In other words, the electrode plates PA-PD are connected to the voltage VR2. In FIG. 23, the switches $SW_{3A}$-$SW_{3D}$ turn on. In other embodiments, the switches $SW_{3B}$-$SW_{3D}$ turn off, and the switch $SW_{3A}$ of the measurement 11a connected to the electrode plate to be measured (the electrode plate PA) turns on. The output terminal O/PA and the inverting input terminal $I_{NA}$ of the operational amplifier OPA are short, and a voltage across the sensing capacitor Cfba equals zero (a theoretical value). The switch $SW_{3A}$ turns on in order to set the voltage across the sensing capacitor Cfba.

Figure 24:
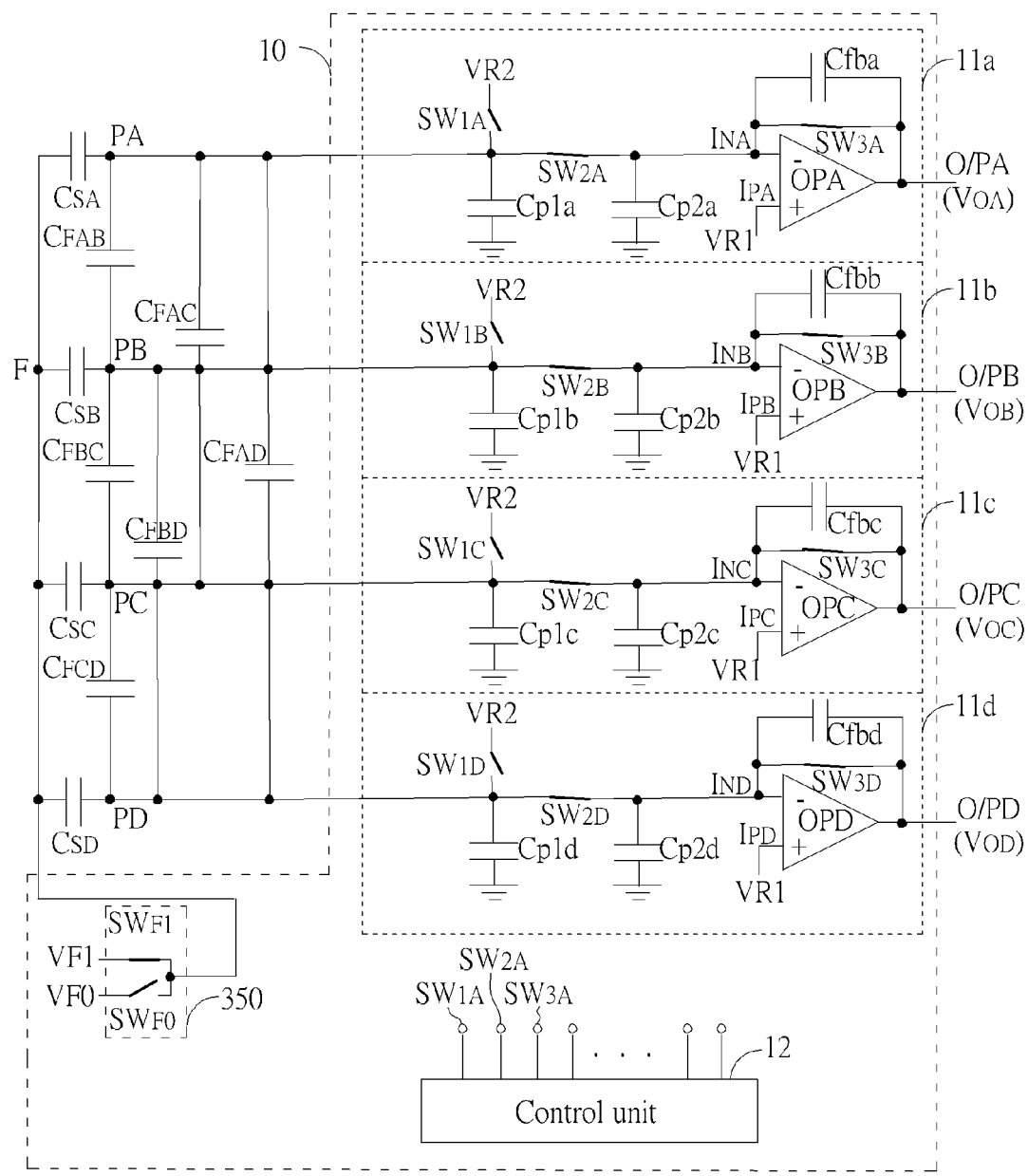
FIG. 24 is a circuit diagram of the sensing circuit shown in FIG. 22 in a second phase according to an embodiment of the present invention.

Next, as shown in FIG. 24, in a second phase (e.g. a readout phase), the control unit 12 turns on the switch $SW_{F1}$ of the switch unit 350 such that the finger drive voltage VF1 is coupled to the finger F. The non-inverting input terminals $I_{PA}$-$I_{PD}$ of the operational amplifiers OPA-OPD are coupled to the voltage VR1. The switch $SW_{3A}$ turns off, and the switches $SW_{1A}$-$SW_{1D}$ turn off. The switches $SW_{2A}$-$SW_{2D}$ turn on such that the electrode plates PA-PD are connected to the inverting input terminals $I_{NA}$-$I_{ND}$ of the operational amplifiers OPA-OPD. In this embodiment, the switches $SW_{3B}$-$SW_{3D}$ turn on. In another embodiment, the switches $SW_{3B}$-$SW_{3D}$ may turn off. In the embodiments shown in FIG. 23 and FIG. 24, the non-inverting input terminals $I_{PA}$ of the operational amplifier OPA is coupled to the voltage VR1.

In the second phase, the voltage across the capacitor Cfba varies. According to the output voltage $V_{OA}$ at the output terminal O/PA of the operational amplifier OPA, the amount of the capacitance $C_{SA}$ between the electrode plate to be measured PA and the finger F may be calculated.

In the first phase, the electrode plate PA and the adjacent electrode plates PB-PD are coupled to the voltage VR2. In the second phase, the electrode plates PA-PD are connected to the inverting input terminals $I_{NA}$-$I_{ND}$ of the operational amplifiers OPA-OPD, respectively. Due to a virtual ground characteristic of an operational amplifier, respective electric potentials of the inverting input terminals $I_{NA}$-$I_{ND}$ of the operational amplifiers OPA-OPD equals to the voltage VR1. Hence, the electrode plate PA and the adjacent electrode plates PB-PD are coupled to the voltage VR1.

After the operations described in the embodiments shown in FIG. 23 and FIG. 24 are performed, the fringe capacitances formed between the electrode plate to be measured PA and the electrode plates PB-PD provide little or no contribution to the resulting output voltage $V_{OA}$. Accordingly, the measured amount of the plate capacitance $C_{SA}$ is not affected by the fringe capacitances.

Figure 25:
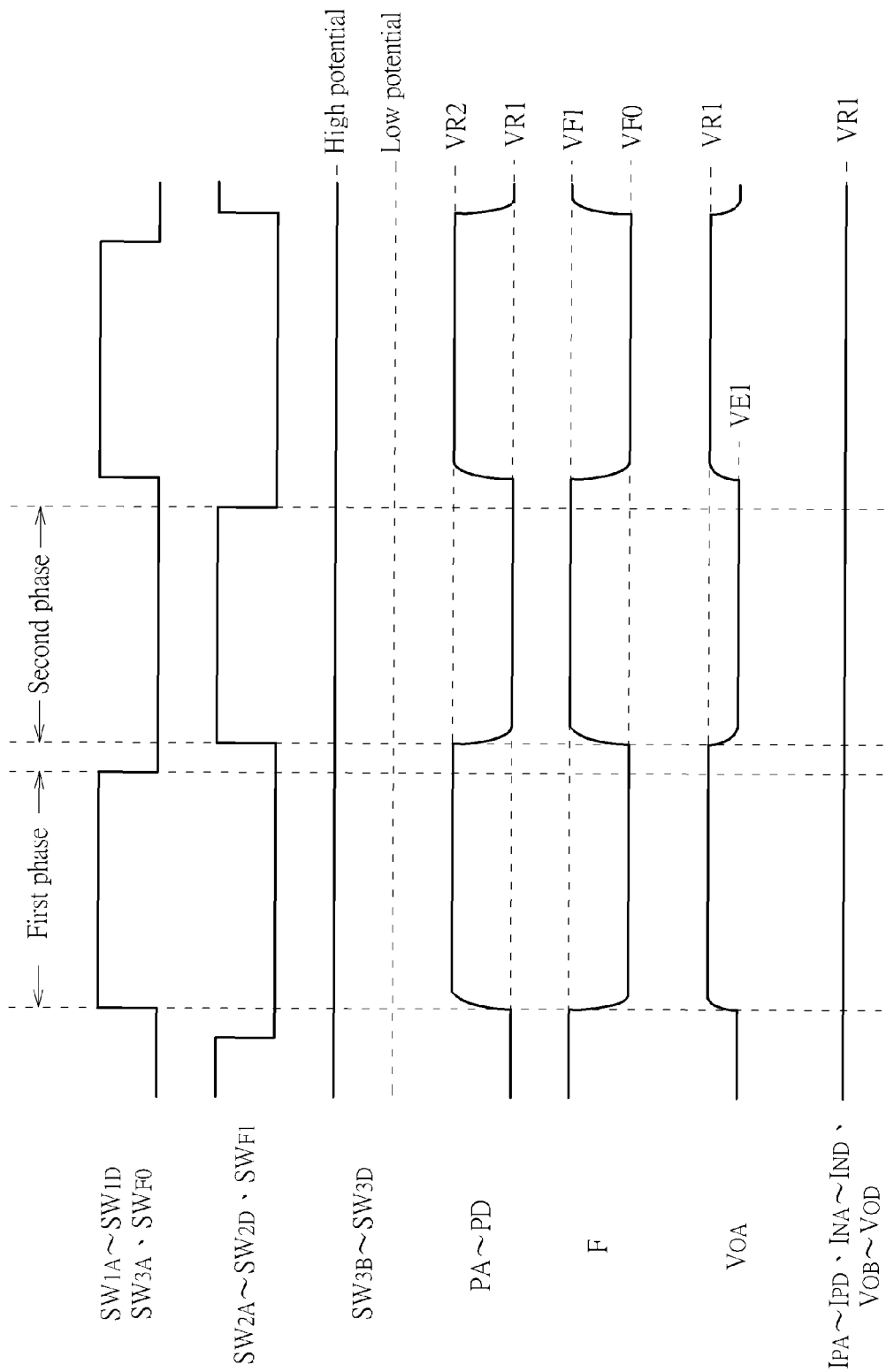
FIG. 25 illustrates a timing diagram of respective switch states of the switches and respective voltage levels of the nodes of the circuits shown in FIG. 23 and FIG. 24 according to an embodiment of the present invention.

FIG. 25 illustrates a timing diagram of respective switch states of the switches and respective voltage levels of the nodes of the fingerprint sensor in the first phase shown in FIG. 23 and in the second phase shown in FIG. 24 according to an embodiment of the present invention. Regarding each switch, a high electric potential corresponds to an ON state (the switch turns on), and a low electric potential corresponds to an OFF state (the switch turns off). In the embodiment shown in FIG. 25, the voltage VR2 is greater than the voltage VR1. In addition, over a period of time during which the fingerprint sensor switches from the first phase to the second phase, the switches $SW_{2A}$-$SW_{2D}$ and $SW_{F1}$ turn on after the switches $SW_{1A}$-$SW_{1D}$, $SW_{3A}$ and $SW_{F0}$ turn off.

In the embodiments shown in FIG. 23 and FIG. 24, a voltage at the inverting terminal $I_{NA}$ of the operational amplifier OPA equals to the voltage VR1 in the first and second phases. Hence, in the second phase during which a sensing signal is read out, no charge flows into (or flows out of) the parasitic capacitor (having the capacitance Cp2a) of the inverting input terminal $I_{NA}$. The proposed fingerprint sensing scheme may be employed in other fingerprint sensors.

In view of the above, it is appreciated that the proposed operations shown in FIG. 23 and FIG. 24 may reduce/eliminate the fringe capacitances between the electrode plate to be measured and the adjacent conductors. The adjacent conductors herein may be other adjacent electrode plates (e.g. the aforementioned electro plates PB-PD), an electrode used for ESD protection, or an electrode used for shielding noises. These electrodes may be disposed in a layer where the electrode plate to be measured is disposed, or in a layer above or below the layer where the electrode plate to be measured is disposed.

Figure 26:
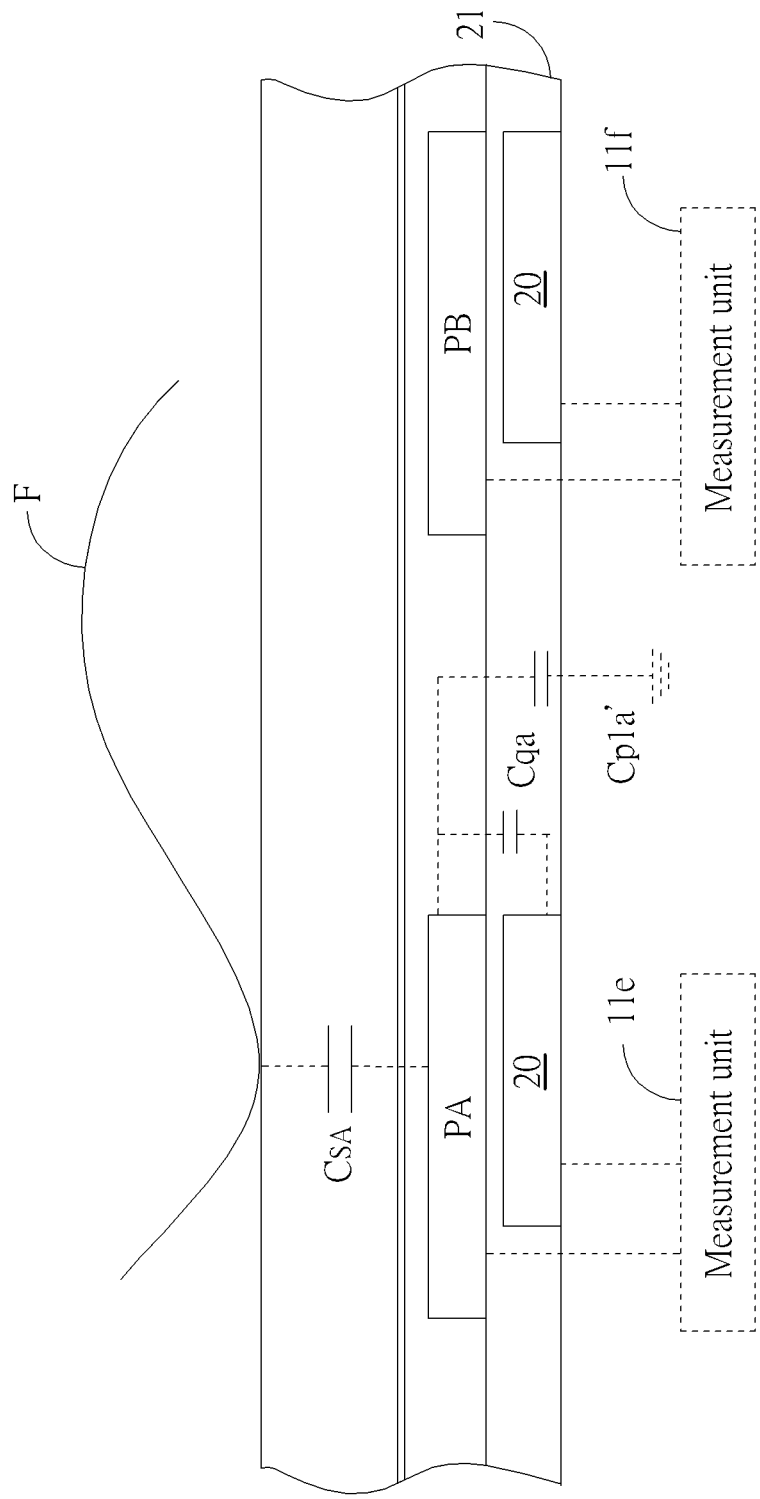
FIG. 26 illustrates an exemplary device structure of a fingerprint sensor according to an embodiment of the present invention.

FIG. 26 illustrates an exemplary device structure of a fingerprint sensor according to an embodiment of the present invention. In this embodiment, a shielding plate 20 is formed below each of the electrode plates PA and PB, wherein the shielding plate 20 is a conductor, and is arranged for shielding most of parasitic capacitances formed between an electrode plate and circuit elements disposed therebelow. A dielectric layer 21 is formed between the shielding plate 20 and each electrode plate. Regarding the electrode plate PA (the electrode plate to be measured), a parasitic capacitance formed between the electrode plate PA and other conductors may decrease to the capacitance Cp1a'. The capacitance Cqa represents a capacitance formed between the shielding plate 20 and the electrode plate to be measured PA.

Figure 27:
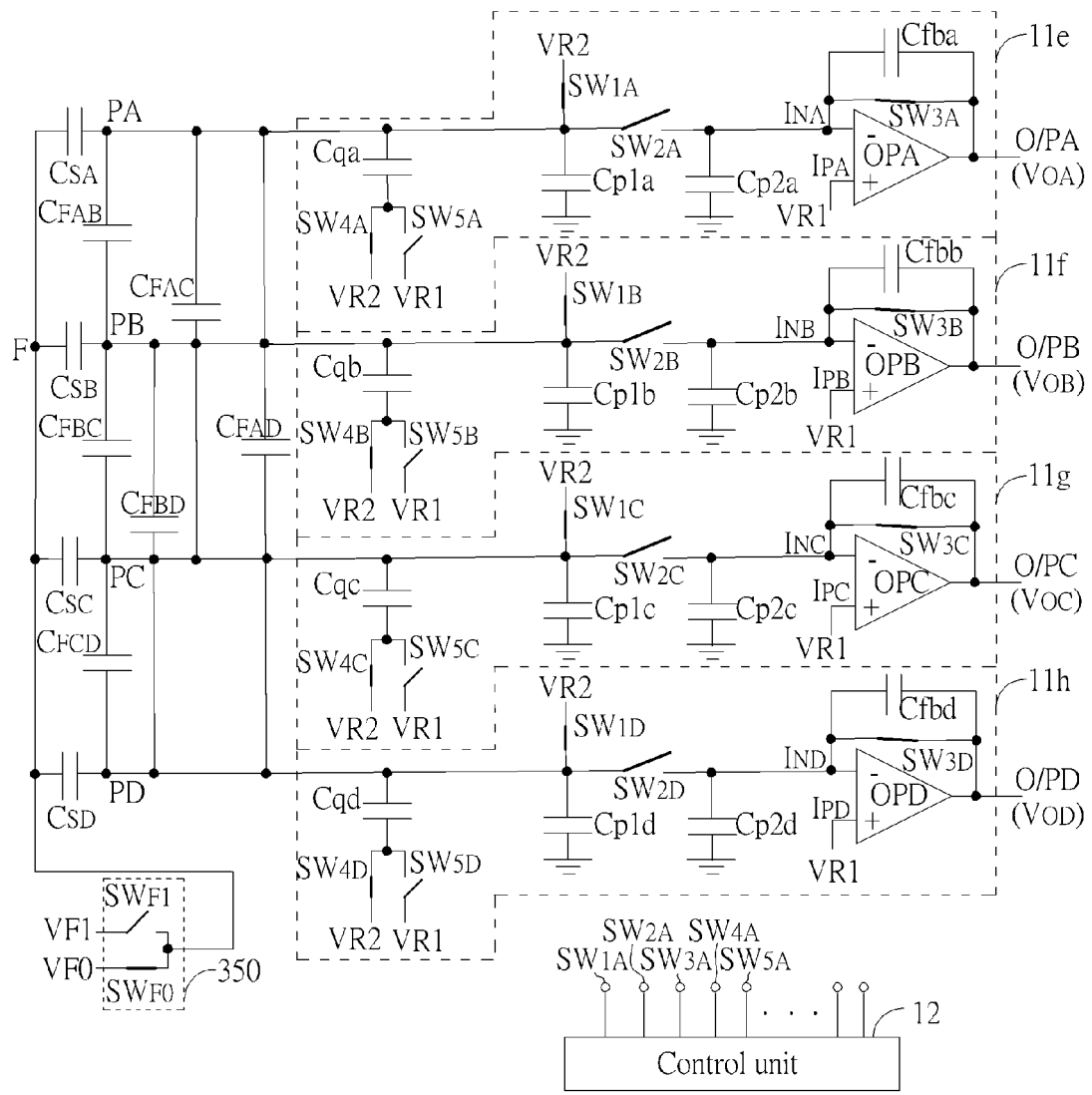
FIG. 27 is a circuit diagram of the sensing circuit shown in FIG. 26 in a first phase according to an embodiment of the present invention.
Figure 28:
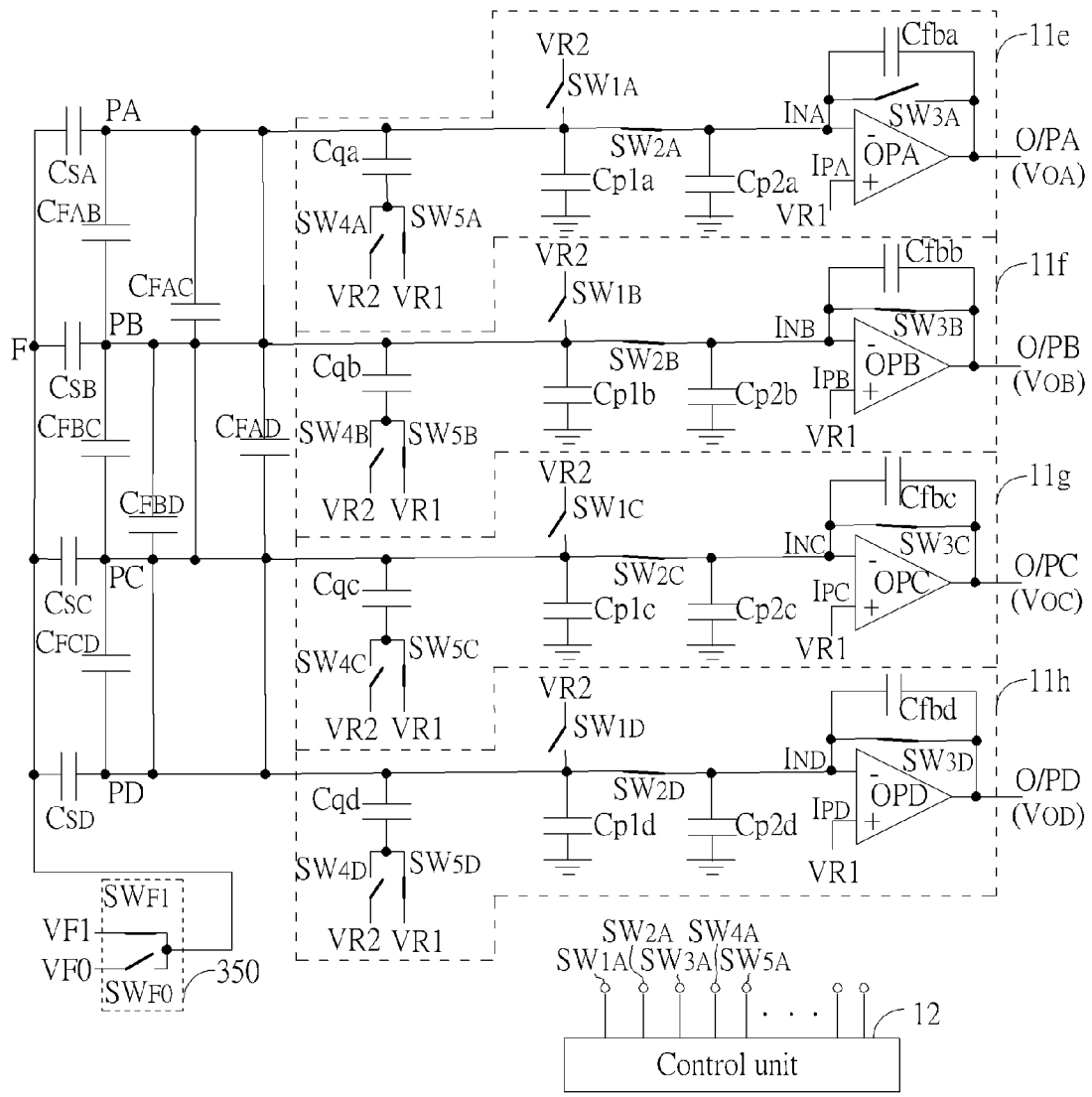
FIG. 28 is a circuit diagram of the sensing circuit shown in FIG. 26 in a second phase according to an embodiment of the present invention.

The embodiment of the measurement units shown in FIG. 27 may be applied to the device structure shown in FIG. 26. Compared to the structure shown in FIG. 22, the measurement units 11e-11h further includes a plurality of switches $SW_{4A}$-$SW_{4D}$ and $SW_{5A}$-$SW_{5D}$, wherein each of the switches $SW_{4A}$-$SW_{4D}$ couples the corresponding shielding plate to the voltage VR2, and each of the switches $SW_{5A}$-$SW_{5D}$ couples a corresponding shielding plate to the voltage VR1. In a first phase, the switches $SW_{4A}$-$SW_{4D}$ turn on, the switches $SW_{5A}$-$SW_{5D}$ turn off, and the shielding plates 20 are coupled to the voltage VR2. In a second phase shown in FIG. 28, the switches $SW_{4A}$-$SW_{4D}$ turn off, the switches $SW_{5A}$-$SW_{5D}$ turn on, and the shielding plates 20 are coupled to the voltage VR1. As operations of other switches shown in FIG. 28 are similar to those described in the paragraphs directed to FIG. 23 and FIG. 24, similar description is omitted here for brevity. In other embodiments, all of the shielding plates 20 are connected to two switches, one of which is coupled to the voltage VR2 and turns on in the first phase, and the other of which is coupled to the voltage VR1 and turns on in the second phase.

Figure 29:
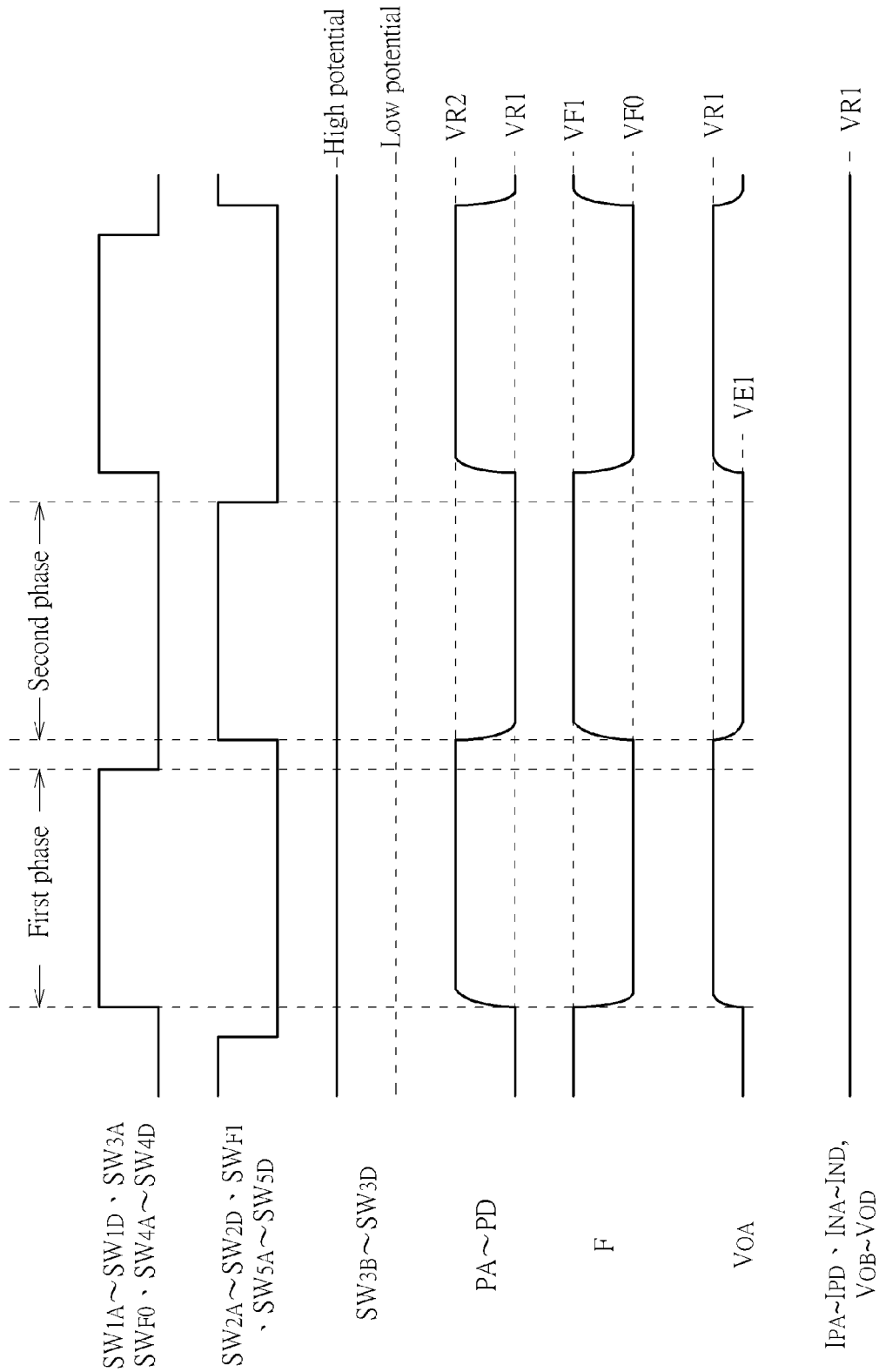
FIG. 29 illustrates a timing diagram of respective switch states of the switches and respective voltage levels of the nodes of the circuits shown in FIG. 27 and FIG. 28 according to an embodiment of the present invention.

FIG. 29 illustrates a timing diagram of respective switch states of the switches and respective voltage levels of the nodes of the fingerprint sensor in the first phase shown in FIG. 27 and in the second phase shown in FIG. 28 according to an embodiment of the present invention. Regarding each switch, a high electric potential corresponds to an ON state (the switch turns on), and a low electric potential corresponds to an OFF state (the switch turns off). In the embodiment shown in FIG. 29, the voltage VR2 is greater than the voltage VR1. In addition, over a period of time during which the fingerprint sensor switches from the first phase to the second phase, the switches $SW_{2A}$-$SW_{2D}$, $SW_{F1}$ and $SW_{5A}$-$SW_{5D}$ turn on after the switches $SW_{1A}$-$SW_{1D}$, $SW_{3A}$, $SW_{F0}$ and $SW_{4A}$-$SW_{4D}$ turn off.

In the first phase, the voltage VR2 is applied to the shielding plate 20 and the electrode plate to be measured PA; in the second phase, the voltage VR1 is coupled to the shielding plate 20 and the electrode plate to be measured PA. The shielding plate 20 and the electrode plate to be measured PA have the same electric potential. Accordingly, the output voltage $V_{OA}$ is not affected by the capacitance Cqa between the electrode plate to be measured PA and the shielding plate 20.

Figure 30:
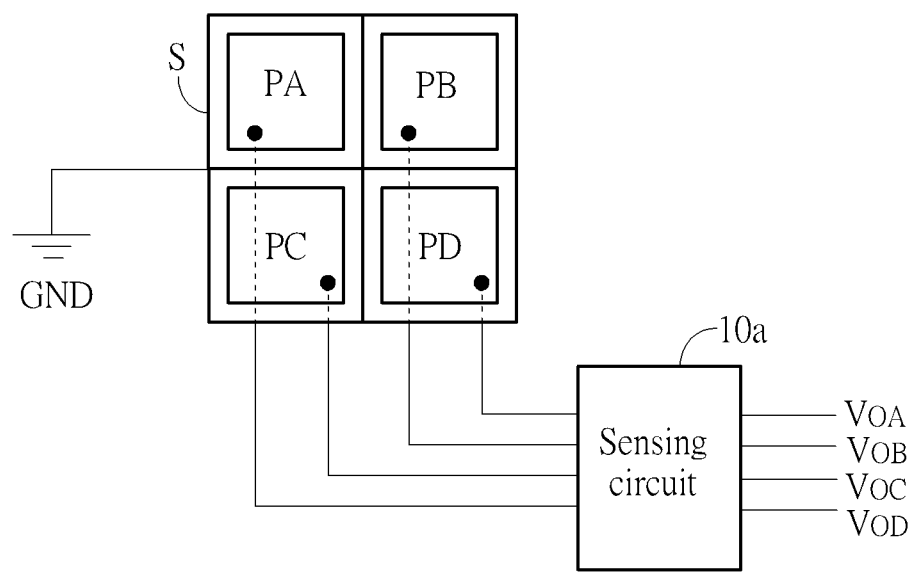
FIG. 30 illustrates an exemplary electrostatic discharge protection structure of a fingerprint sensor according to an embodiment of the present invention.

The fingerprint sensor shown in FIG. 30 includes the protection electrode S surrounding the electrode plates PA-PD. In any phase, the protection electrode S may be connected to a ground terminal GND so as to provide ESD protection for the electrode plates PA-PD. For example, the protection electrode S and the ground terminal GND may provide a discharge path to remove electrostatic charges from a body, thus preventing damages to the electrode plates PA-PD. However, the capacitance $C_{FAS}$ (a fringe capacitance) between the protection electrode S and the electrode plate to be measured PA may affect the output voltage $V_{OA}/V_{OB}/V_{OC}/V_{OD}$ of the sensing circuit 10a.

Figure 31:
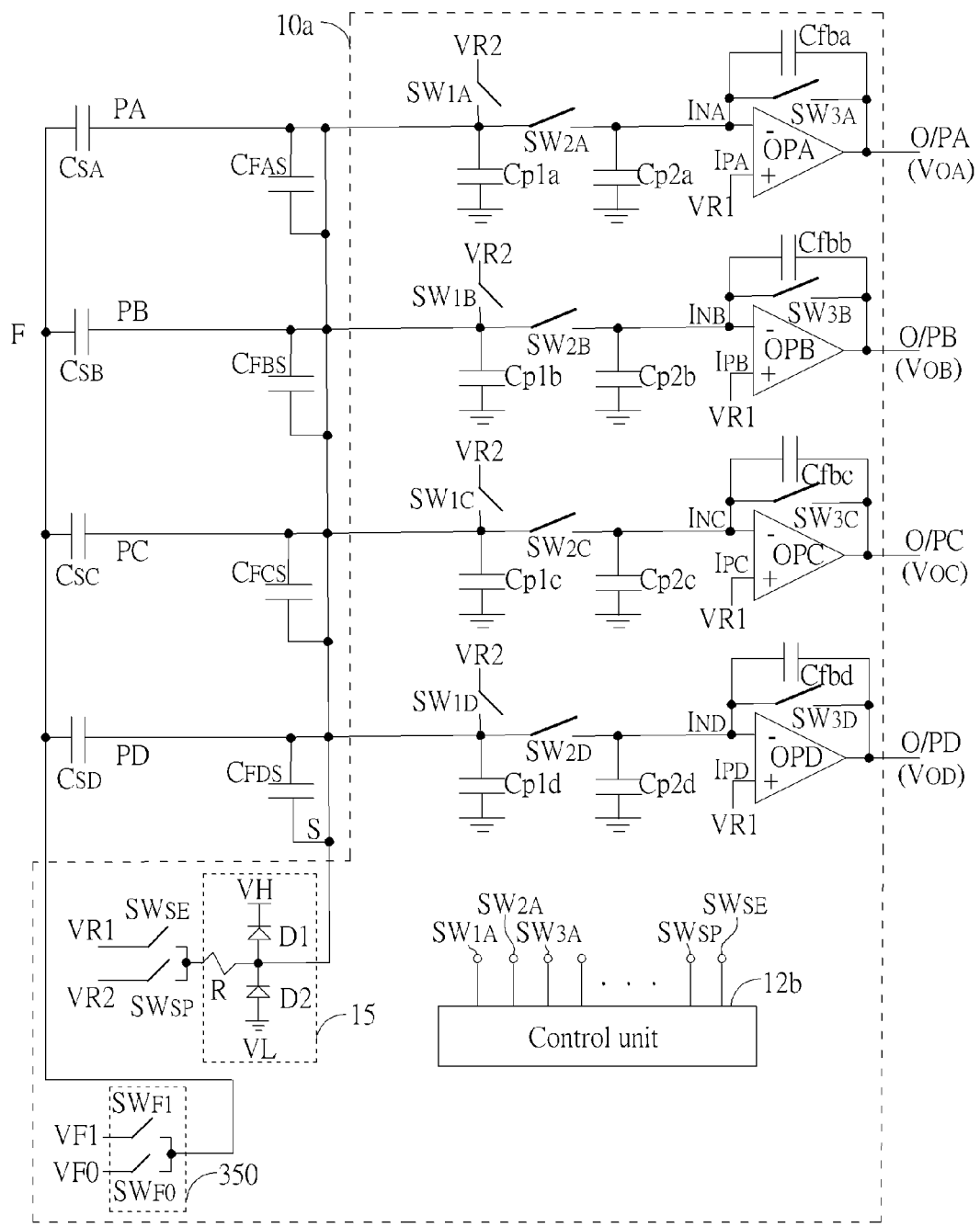
FIG. 31 is a circuit diagram of the sensing circuit shown in FIG. 31 according to an embodiment of the present invention.

In the embodiment shown in FIG. 31, the effects of the fringe capacitance $C_{FAS}$ between the protection electrode S and the electrode plate to be measured PA can be reduced. Compared to the sensing circuit 10 shown in FIG. 22, the sensing circuit 10a shown in FIG. 31 further includes an ESD protection circuit 15, a switch $SW_{SP}$ and a switch $SW_{SE}$. One terminal of the switch $SW_{SP}$ is coupled to the voltage VR2, and another terminal of the switch $SW_{SP}$ is coupled to the protection electrode S through the ESD protection circuit 15. One terminal of the switch $SW_{SE}$ is coupled to the voltage VR1, and another terminal of the switch $SW_{SE}$ is coupled to the protection electrode S through the ESD protection circuit 15. The switches $SW_{SP}$ and $SW_{SE}$ are coupled to the control unit 12b, and are controlled by the control unit 12b.

Figure 32:
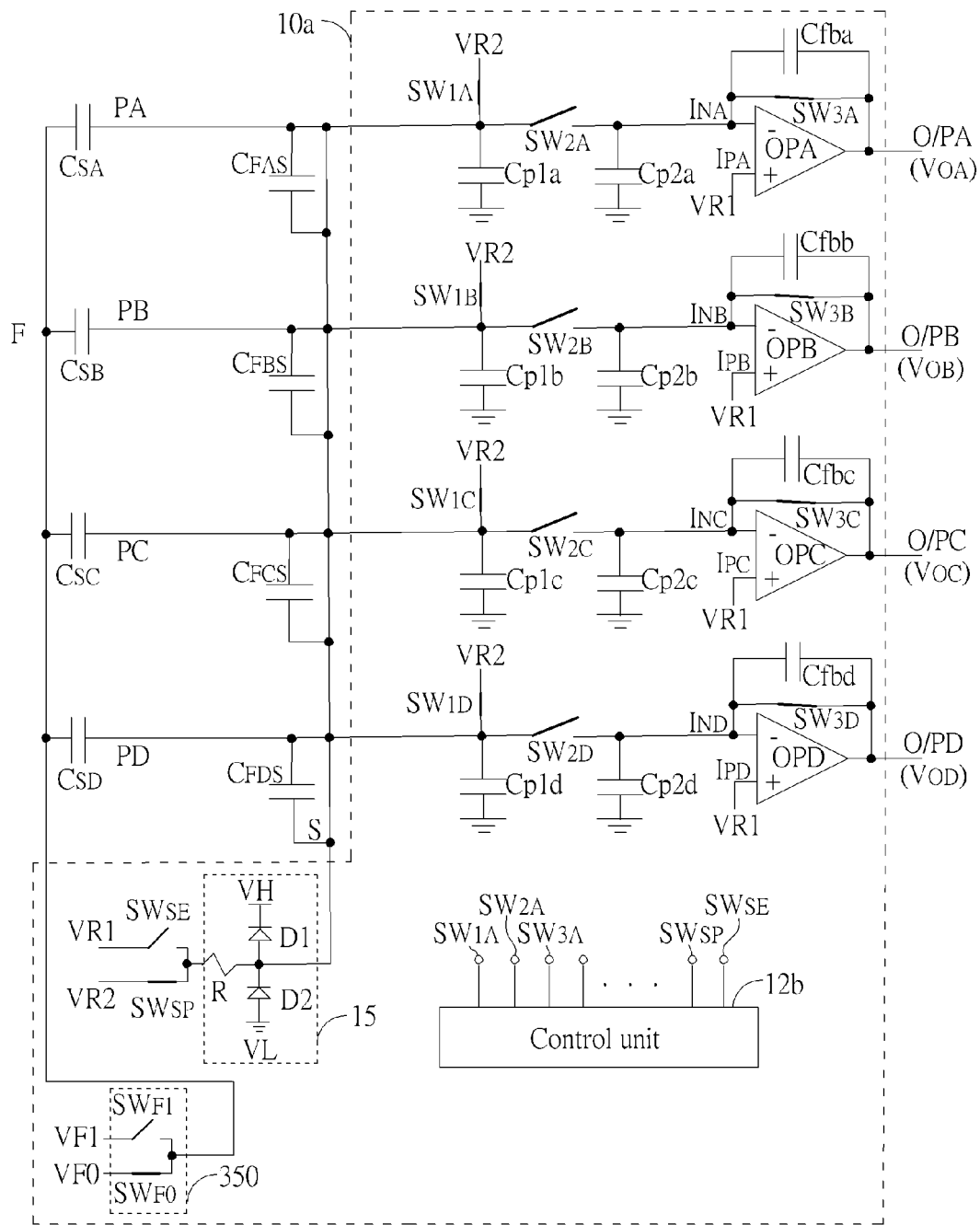
FIG. 32 is a circuit diagram of the sensing circuit shown in FIG. 31 in a first phase according to an embodiment of the present invention.

In a first phase shown in FIG. 32, the switch $SW_{SP}$ turns on, the switch $SW_{SE}$ turns off, and the protection electrode S is coupled to the voltage VR2.

Figure 33:
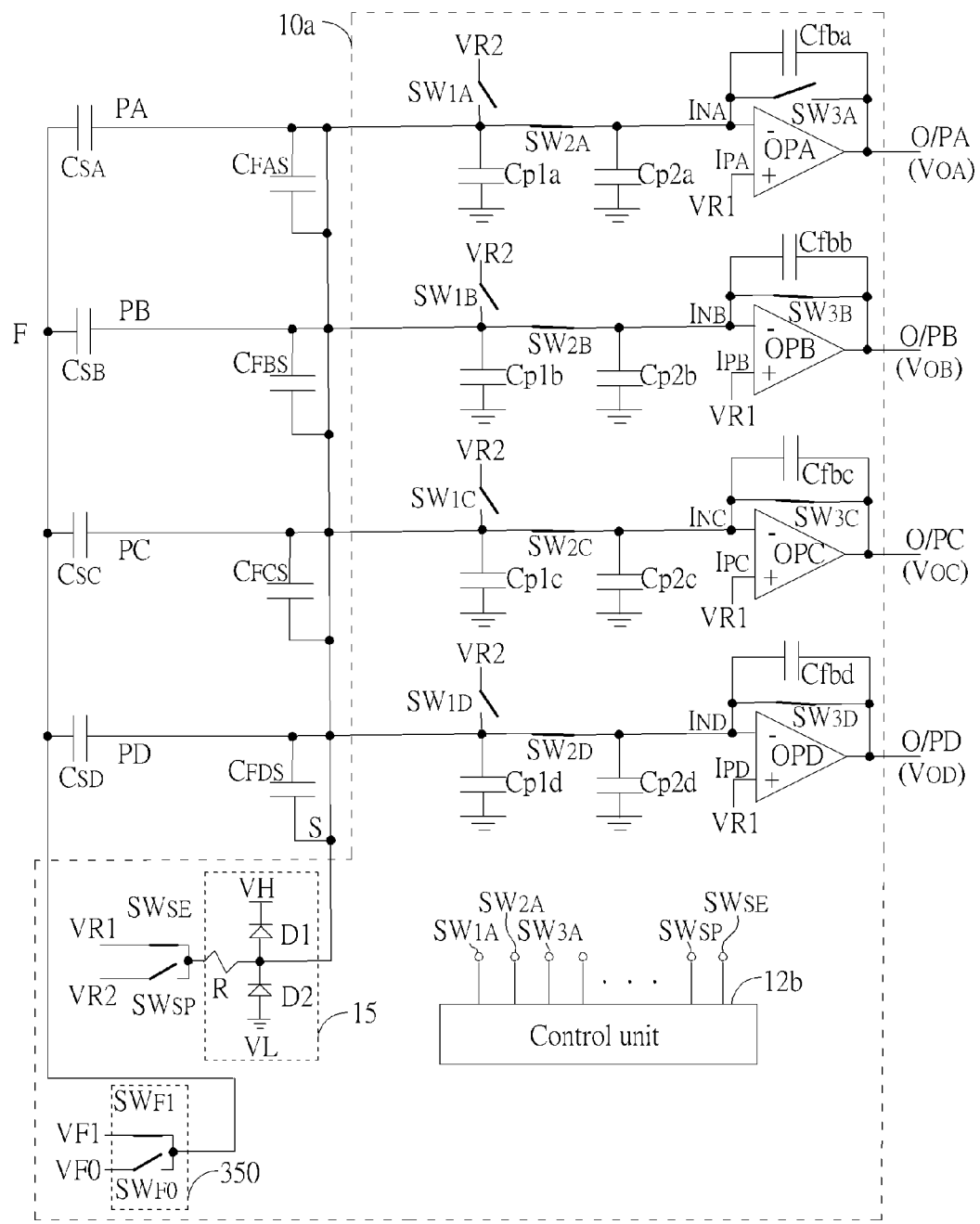
FIG. 33 is a circuit diagram of the sensing circuit shown in FIG. 31 in a second phase according to an embodiment of the present invention.

In a second phase shown in FIG. 33, the switch $SW_{SP}$ turns off, the switch $SW_{SE}$ turns on, and the protection electrode S is coupled to the voltage VR1.

In the first phase, as the voltage VR2 is applied to the protection electrode S and the electrode plate to be measured PA, the protection electrode S and the electrode plate to be measured PA have the same electric potential. In the second phase, as the voltage VR1 is coupled to the protection electrode S and the electrode plate to be measured PA, the protection electrode S and the electrode plate to be measured PA have the same electric potential. Accordingly, the output voltage $V_{OA}$ is not affected by the fringe capacitance $C_{FAS}$ between the electrode plate to be measured PA and the protection electrode S.

Figure 34:
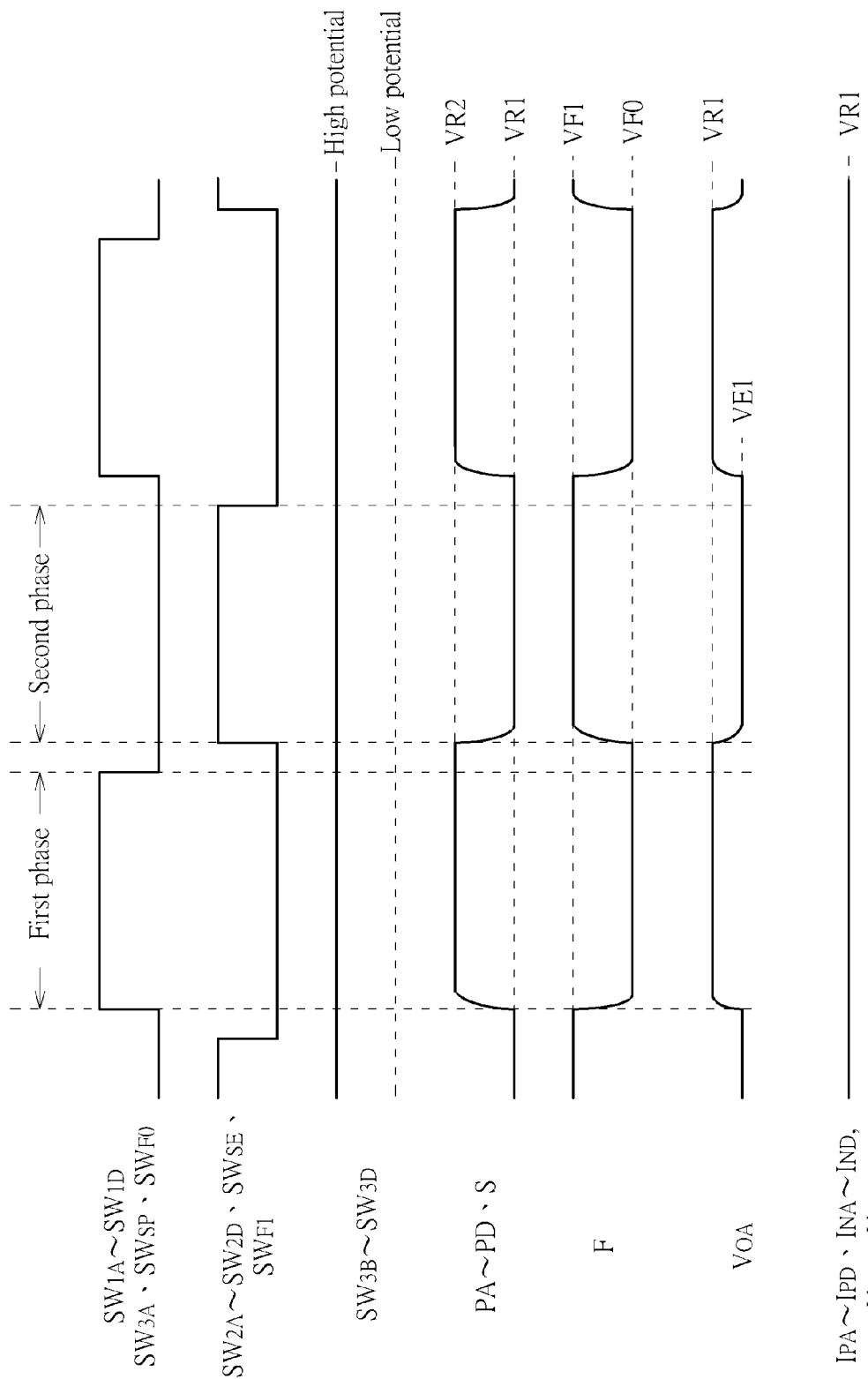
FIG. 34 illustrates a timing diagram of respective switch states of the switches and respective voltage levels of the nodes of the circuits shown in FIG. 32 and FIG. 33 according to an embodiment of the present invention.

FIG. 34 illustrates a timing diagram of respective switch states of the switches and respective voltage levels of the nodes of the fingerprint sensor in the first phase shown in FIG. 32 and in the second phase shown in FIG. 33 according to an embodiment of the present invention. Regarding each switch, a high electric potential corresponds to an ON state (the switch turns on), and a low electric potential corresponds to an OFF state (the switch turns off). In the embodiment shown in FIG. 34, the voltage VR2 is greater than the voltage VR1. In addition, over a period of time during which the fingerprint sensor switches from the first phase to the second phase, the switches $SW_{2A}$-$SW_{2D}$, $SW_{SE}$ and $SW_{F1}$ turn on after the switches $SW_{1A}$-$SW_{1D}$, $SW_{3A}$, $SW_{SP}$ and $SW_{F0}$ turn off.

In this embodiment, the ESD protection circuit 15 may employ the circuit structure of the ESD protection circuit 370 shown in FIG. 3.

The above embodiments using four electrodes for fingerprint sensing are for illustrative purposes only. It is possible to employ the proposed fingerprint sensing method in other fingerprint sensors having more than four electrode plates. In addition, the above embodiments using a single electrode plate to be measured are for illustrative purposes only. In other embodiments, sensing signals of more than one electrode plate may be measured and read out concurrently. For example, sensing signals of electrode plates corresponding to the same row may be measured and readout concurrently. Further, in other embodiments, the proposed control mechanisms described above may be employed, alone or in combination, in a fingerprint sensor. In other words, it is possible to switch electric potential(s) of an electrode plate to be measured, and at least one of an adjacent electrode plate, an ESD protection plate and a shielding plate.

Figure 35:
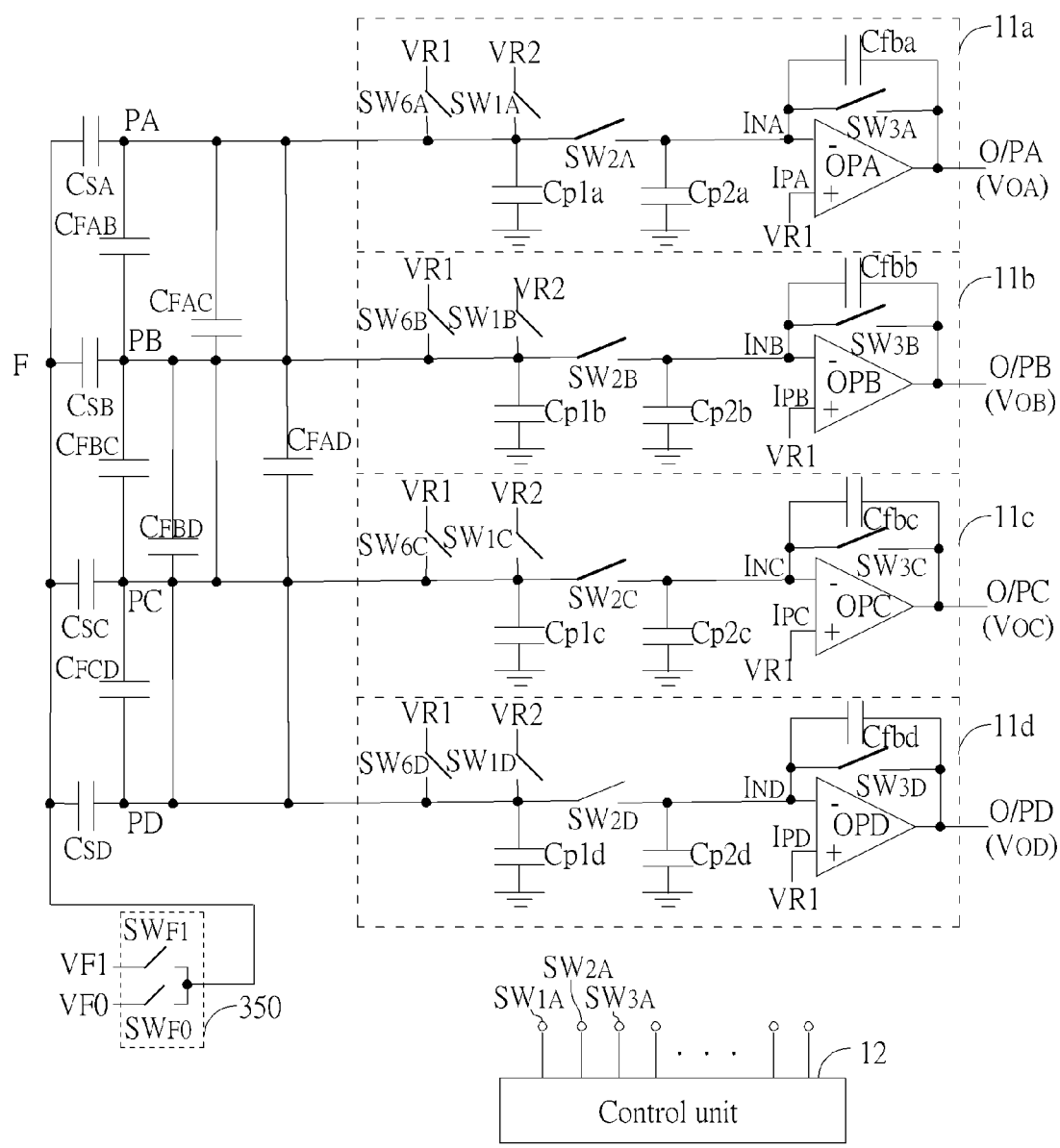
FIG. 35 is a circuit diagram of an exemplary sensing circuit of a fingerprint sensor according to another embodiment of the present invention.

FIG. 35 is a diagram illustrating an exemplary circuit structure of a fingerprint sensor according to another embodiment of the present invention. The circuit structure shown in FIG. 35 is substantially identical to that shown in FIG. 22, wherein the main difference is that the circuit structure shown in FIG. 35 further includes switches $SW_{6A}$-$SW_{6D}$. One terminal of each of the switches $SW_{6A}$-$SW_{6D}$ is connected to a corresponding electrode plate (one of the electrode plates PA-PD), and another terminal of each of the switches $SW_{6A}$-$SW_{6D}$ is coupled to the voltage VR1.

In this embodiment, the operations of the circuit structure in a first phase are identical to those shown in FIG. 23. All of the switches $SW_{6A}$-$SW_{6D}$ turn off.

In a second phase, all of the switches $SW_{1A}$-$SW_{1D}$ turn off, the switch $SW_{3A}$ turns off, the switch $SW_{2A}$ turns on, and the switches $SW_{6B}$-$SW_{6D}$ connected to the electrode plates PB-PD turn on. Due to a virtual ground characteristic of an operational amplifier, the electric potential of the inverting input terminal $I_{NA}$ of the operational amplifier OPA, which is connected to the electrode plate PA, equals to the voltage VR1. Hence, the electrode plate PA and the adjacent electrode plates PB-PD are coupled to the voltage VR1. Compared to the embodiment shown in FIG. 24, the switches $SW_{2B}$-$SW_{2D}$ and $SW_{3B}$-$SW_{3D}$ of the measurement units 11b-11d (connected to the electrode plates PB-PD) may stay in the same switch states as in the first phase when the fingerprint sensor shown in FIG. 35 operates in the second phase. As long as the switches $SW_{6B}$-$SW_{6D}$ turn on, the electrode plates PB-PD can be coupled to the voltage VR1.

Figure 36:
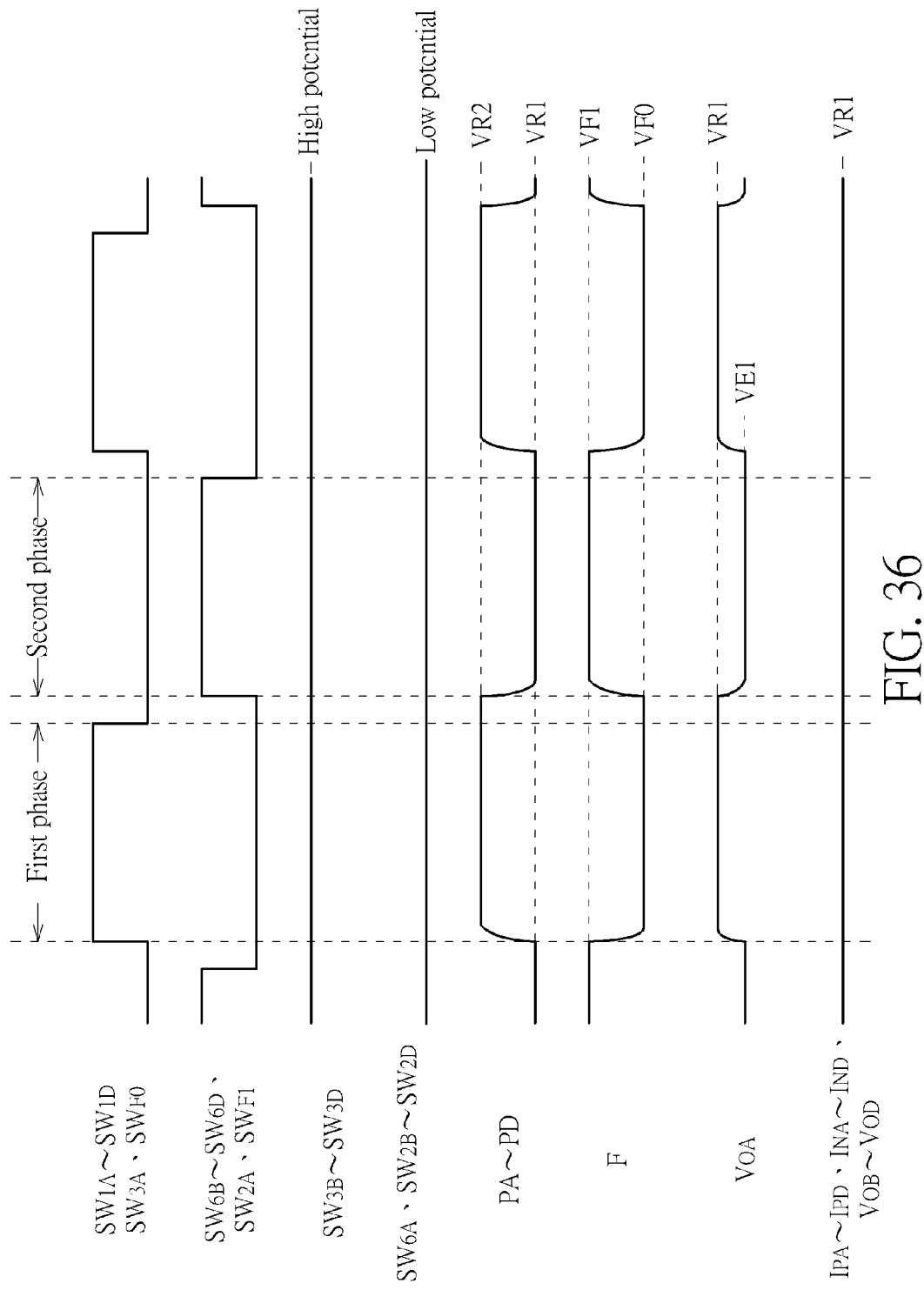
FIG. 36 illustrates a timing diagram of respective switch states of the switches and respective voltage levels of the nodes of the fingerprint sensor shown in FIG. 35 in the first phase and in the second phase according to an embodiment of the present invention.

FIG. 36 illustrates a timing diagram of respective switch states of the switches and respective voltage levels of the nodes of the fingerprint sensor shown in FIG. 35 in the first phase and in the second phase according to an embodiment of the present invention. Regarding each switch, a high electric potential corresponds to an ON state (the switch turns on), and a low electric potential corresponds to an OFF state (the switch turns off). In this embodiment, the voltage VR2 is greater than the voltage VR1. In addition, over a period of time during which the fingerprint sensor switches from the first phase to the second phase, the switches $SW_{2A}$, $SW_{6B}$-$SW_{6D}$ and $SW_{F1}$ turn on after the switches $SW_{1A}$-$SW_{1D}$, $SW_{3A}$ and $SW_{F0}$ turn off.

Figure 37:
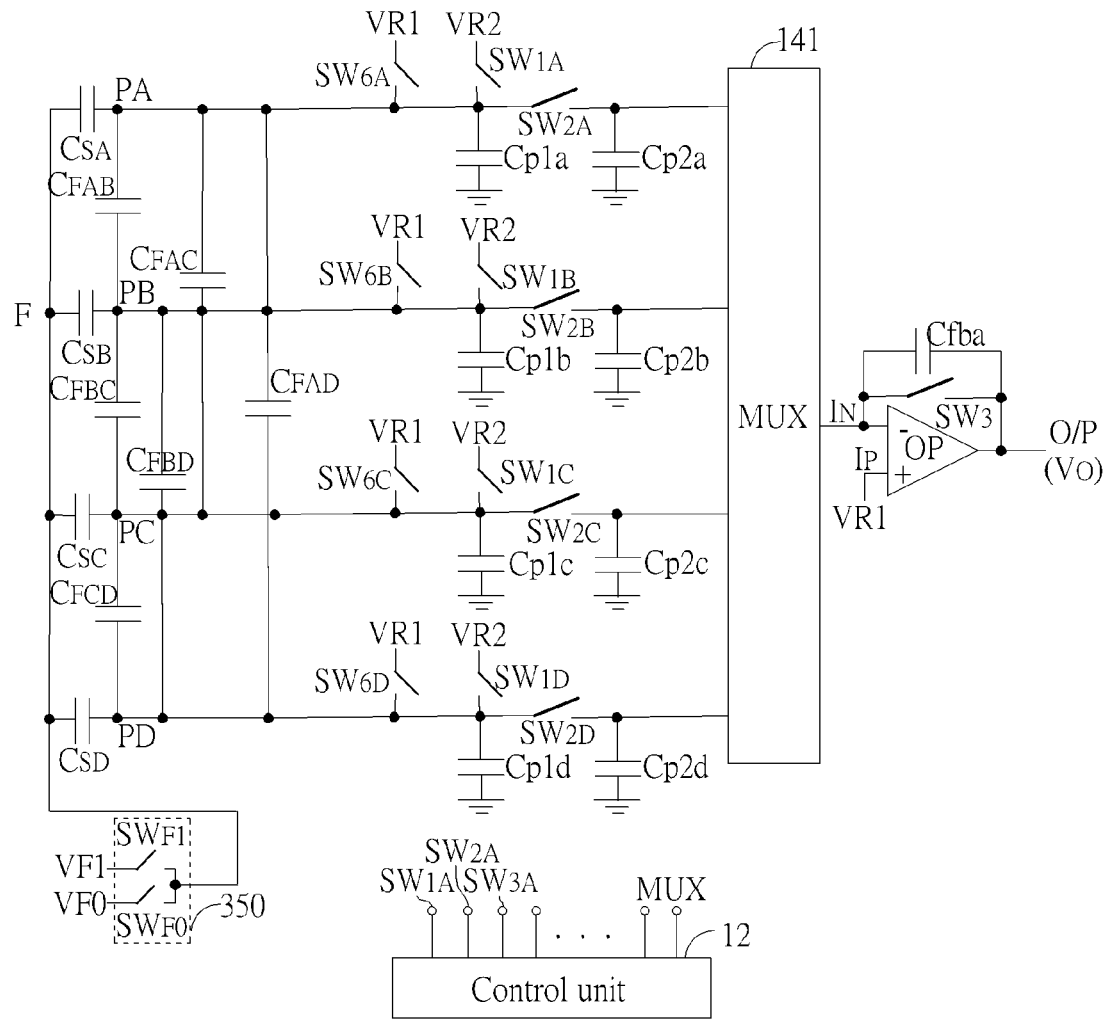
FIG. 37 is a circuit diagram of an exemplary sensing circuit of a fingerprint sensor according to another embodiment of the present invention.

FIG. 37 is a diagram illustrating an exemplary circuit structure of a fingerprint sensor according to another embodiment of the present invention. The circuit structure shown in FIG. 37 is substantially identical to that shown in FIG. 35, wherein the main difference is that the switches $SW_{2A}$-$SW_{2D}$ shown in FIG. 37 are connected to an operational amplifier OP through a multiplexer (MUX) 141. When the electrode plate PA is under measurement, the control unit 12 controls the MUX 141 to connect the switch $SW_{2A}$ to an inverting input terminal $I_N$ of the operational amplifier OP. A non-inverting input terminal $I_P$ of the operational amplifier OP is coupled to the voltage VR1.

In a first phase, all of the switches $SW_{1A}$-$SW_{1D}$ turn on, and all of the switches $SW_{2A}$-$SW_{2D}$ turn off. As this embodiment uses only one operational amplifier, the control unit 12 turns on the switch $SW_3$ connected to the operational amplifier OP.

In a second phase, all of the switches $SW_{1A}$-$SW_{1D}$ turn off, switch $SW_3$ turns off, the switch $SW_{2A}$ connected to the electrode plate PA turns on, and the switches $SW_{6B}$-$SW_{6D}$ connected to the electrode plates PB-PD turn on.

Compared to the embodiment shown in FIG. 35, the sensing circuit shown in FIG. 37 may not switch the switches $SW_{2B}$-$SW_{2D}$ corresponding to the electrode plates PB-PD. Further, the operational amplifiers OPB-OPD shown in FIG. 35 may be omitted due to the use of the MUX 141.

Figure 38:
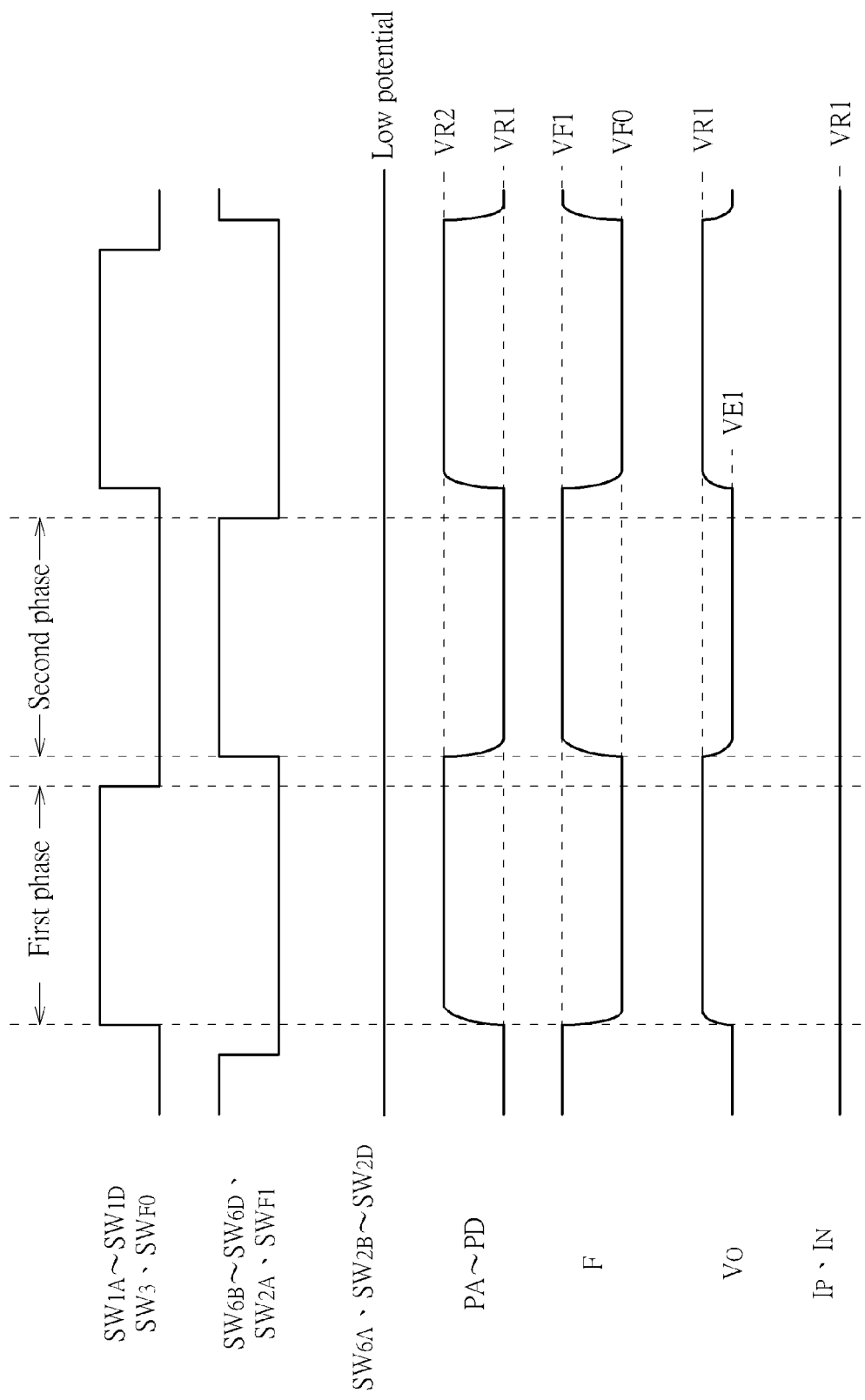
FIG. 38 illustrates a timing diagram of respective switch states of the switches and respective voltage levels of the nodes of the fingerprint sensor shown in FIG. 37 in the first phase and in the second phase according to an embodiment of the present invention.

FIG. 38 illustrates a timing diagram of respective switch states of the switches and respective voltage levels of the nodes of the fingerprint sensor shown in FIG. 37 in the first phase and in the second phase according to an embodiment of the present invention. Regarding each switch, a high electric potential corresponds to an ON state (the switch turns on), and a low electric potential corresponds to an OFF state (the switch turns off). In this embodiment, the voltage VR2 is greater than the voltage VR1. In addition, over a period of time during which the fingerprint sensor switches from the first phase to the second phase, the switches $SW_{2A}$, $SW_{6B}$-$SW_{6D}$ and $SW_{F1}$ turn on after the switches $SW_{1A}$-$SW_{1D}$, $SW_3$ and $SW_{F0}$ turn off.

In the embodiments shown in FIGS. 22-38, the voltage VR2 is greater than the voltage VR1, and the finger drive voltage VF1 is greater than the finger drive voltage VF0. In other embodiments, the voltage VR2 is less than the voltage VR1, and the finger drive voltage VF1 is less than the finger drive voltage VF0.

In view of the above, the proposed sensing method used for sensing an electrode plate to be measured of a fingerprint sensor may be summarized as follows: in a first phase, applying a first finger drive voltage to a finger (or a finger drive electrode used for coupling the finger), applying a first voltage to the electrode plate to be measured and a conductor adjacent to the electrode plate to be measured, and setting a voltage across a sensing capacitor, wherein the sensing capacitor is coupled between a first input terminal and an output terminal of an operational amplifier, and the electrode plate to be measured is disconnected from the first input terminal of the operational amplifier in the first phase; and in a second phase, applying a second finger drive voltage different from the first finger drive voltage to the finger (or the finger drive electrode), stopping applying the first voltage to the electrode plate to be measured and the conductor, connecting the electrode plate to be measured to the first terminal to make the voltage across the sensing capacitor vary. The second phase may be regarded as a readout phase, during which a signal on the output terminal of the operational amplifier may be read out to obtain a measurement result of the electrode plate to be measured.

It is possible to combine at least two of the embodiments shown in FIGS. 22-37. For example, in one embodiment where a fingerprint sensor has an ESD protection electrode and/or a shielding plate, the aforementioned control mechanisms may be utilized to prevent a capacitance between an electrode plate to be measured and an adjacent conductor (e.g. an ESD protection electrode or a shielding plate) from affecting a measurement result.

According to one embodiment of the present invention, an exemplary sensing circuit of a fingerprint sensor, which is used for sensing an electrode plate to be measured of the fingerprint sensor, is provided. The sensing circuit includes: a first operational amplifier, including a first input terminal, second input terminal and an output terminal; a first sensing capacitor, coupled between the first input terminal and the output terminal of the first operational amplifier; a first switch unit, one terminal of which is connected to the electrode plate to be measured, and another terminal of which is connected a first voltage; a second switch unit, coupled between the electrode plate to be measured and the first input terminal of the first operational amplifier; a third switch unit, coupled between the output terminal and the first input terminal of the first operational amplifier; a fourth switch unit, one terminal of which is connected to a conductor, and another terminal of which is connected to the first voltage; a fifth switch unit, one terminal of which is connected to the conductor, and another terminal of which is connected to a second voltage; and a sixth switch unit, arranged for coupling a first finger drive voltage or a second finger drive voltage different from the first finger drive voltage to a finger (or a finger drive electrode used for coupling the finger). In a first phase, the sixth switch unit couples the first finger drive voltage to the finger (or the finger drive electrode), the second switch unit and the fifth switch unit turn off, the first switch unit turns on such that the electrode plate to be measured is coupled to the first voltage, the fourth switch unit turns on such that the conductor is coupled to the first voltage, and the third switch unit turns on. In a second phase, the sixth switch unit couples the second finger drive voltage to the finger (or the finger drive electrode), the first, third and fourth switch units turn off, the fifth switch unit turns, the second input terminal of the first operational amplifier and the conductor are coupled to the second voltage, and the second switch unit turns on such that the electrode plate to be measured is connected to the first input terminal of the first operational amplifier.

According to one embodiment of the present invention, an exemplary process for measuring an electrode plate includes the step: turning on the switch $SW_{F0}$ and the switch $SW_{F1}$ in sequence so as to couple the different finger drive voltages VF0 and VF1 to the finger. The switches $SW_{F0}$ and $SW_{F1}$ do not turn on concurrently. In the above embodiments, the switch $SW_{F0}$ may turn off when the first phase (or the third phase) ends, and the switch $SW_{F1}$ may turn on when the second phase starts. In other embodiments, the switch $SW_{F0}$ may turn off at an arbitrary point in time during the first phase (or the third phase) to the second phase. For example, the switch $SW_{F0}$ may turn off before the first phase ends, between the first and second phases, or after the second phase starts. The switch $SW_{F1}$ does not turn on until the first phase (or the third phase) ends and the switch $SW_{F0}$ turns off.

The above is for illustrative purposes only, and is not meant to be a limitation of the present invention. Even though numerous characteristics and advantages of the present invention have been set forth in the foregoing description, together with details of the structure and features of the invention, the disclosure is illustrative only. Those skilled in the art will readily observe that numerous modifications and alterations of the device and method may be made while retaining the teachings of the invention. Changes may be made in the details, especially in matters of shape, size, and arrangement of parts within the principles of the invention to the full extent indicated by the broad general meaning of the terms in which the appended claims are expressed.

What is claimed is:

1. A sensing method of a fingerprint sensor, the sensing method being used for sensing a capacitance between an electrode plate to be measured of the fingerprint sensor and a finger, the sensing method comprising:
    (a) applying a first voltage to a first node connected to the electrode plate to be measured, applying a second voltage different from the first voltage to a second node disconnected from the first node, and applying a third voltage to a conductor adjacent to the electrode plate to be measured;
    (b) providing a first finger drive voltage for the finger;
    (c) stopping applying the first voltage, the second voltage and the third voltage to the first node, the second node and the conductor respectively;
    (d) after step (c), applying a fourth voltage different from the third voltage to the conductor, and connecting the first node to the second node;
    (e) after steps (b) and (c), providing a second finger drive voltage different from the first finger drive voltage for the finger; and
    (f) after steps (d) and (e), obtaining a measurement result of the electrode plate to be measured according to a signal on the second node;
    wherein the first voltage is greater than the second voltage, the third voltage is greater than the fourth voltage, and the first finger drive voltage is less than the second finger drive voltage; or the first voltage is less than the second voltage, the third voltage is less than the fourth voltage, and the first finger drive voltage is greater than the second finger drive voltage.

2. The sensing method of claim 1, wherein the first voltage is equal to the third voltage, and the second voltage is equal to the fourth voltage.

3. The sensing method of claim 1, further comprising: after step (d), performing the following steps:
    disconnecting the first node from the second node;
    applying the first voltage to the first node, and applying the third voltage to the conductor;
    applying the first finger drive voltage to the finger;
    stopping applying the first voltage and the third voltage, and then performing step (d) again; and
    applying the second finger drive voltage to the finger.

4. The sensing method of claim 1, wherein the conductor is an adjacent electrode plate adjacent to the electrode plate to be measured, and the adjacent electrode plate is arranged for sensing fingerprints.

5. The sensing method of claim 1, wherein the conductor is a protection electrode adjacent to the electrode plate to be measured, and the protection electrode is arranged for providing electrostatic discharge protection.

6. The sensing method of claim 1, wherein the conductor is a shielding plate, and the electrode plate to be measured is located between the finger and the shielding plate.

7. A sensing circuit for sensing a capacitance between an electrode plate to be measured of a fingerprint sensor and a finger, the sensing circuit comprising:
    a first switch unit, comprising a first node and a second node, the first node being connected to the electrode plate to be measured, wherein in a first phase, the first node is coupled to a first voltage, the second node is coupled to a second voltage different from the first voltage, and the first node is disconnected from the second node; and in a second phase, the first node is disconnected from to the first voltage, the second node is uncoupled to the second voltage, and the first node is connected to the second node;
    a second switch unit, wherein in the first phase, the second switch unit couples a third voltage to a conductor adjacent to the electrode plate to be measured; and in the second phase, the second switch unit couples a fourth voltage different from the third voltage to the conductor;
    a third switch unit, wherein in the first phase, the third switch unit couples a first finger drive voltage to a finger drive electrode; in the second phase, the third switch unit couples a second finger drive voltage different from the first finger drive voltage to the finger drive electrode, wherein the finger drive electrode is arranged for coupling the finger;
    a readout circuit, coupled to the second node of the first switch unit, the readout circuit arranged for reading out a measurement result of the electrode plate to be measured according to a signal on the second node; and
    a control unit, arranged for controlling operations of the first switch unit, the second switch unit and the third switch unit in the first phase and the second phase;
    wherein the first voltage is greater than the second voltage, the third voltage is greater than the fourth voltage, and the first finger drive voltage is less than the second finger drive voltage; or the first voltage is less than the second voltage, the third voltage is less than the fourth voltage, and the first finger drive voltage is greater than the second finger drive voltage.

8. The sensing circuit of claim 7, wherein the first voltage is equal to the third voltage, and the second voltage is equal to the fourth voltage.

9. The sensing circuit of claim 7, wherein in a third phase after the second phase, the control unit controls the first switch unit, the second switch unit and the third switch unit to perform the following operations:
    coupling the first voltage to the first node, and disconnecting the first node from the second node;
    applying the third voltage to the conductor; and
    applying the first finger drive voltage to the finger drive electrode;
    wherein after the third phase, the control unit controls the first switch unit, the second switch unit and the third switch unit to perform again the operations performed in the second phase.

10. The sensing circuit of claim 7, wherein the first switch unit comprises:
    a first switch, for coupling the first voltage to the first node;
    a second switch, for coupling the second voltage to the second node; and
    a third switch, for connecting the first node to the second node;
    wherein in the first phase, the first switch and the second switch turn on, and the third switch turns off; and in the second phase, the first switch and the second switch turn off, and the third switch turns on.

11. The sensing circuit of claim 7, wherein the second switch unit comprises:
    a first switch, for coupling the third voltage to the conductor; and
    a second switch, for coupling the fourth voltage to the conductor;
    wherein in the first phase, the first switch turns on, and the second switch turns off; and in the second phase, the first switch turns off, and the second switch turns on.

12. The sensing circuit of claim 7, wherein the third switch unit comprises:
    a first switch, for coupling the first finger drive voltage to the finger drive electrode; and
    a second switch, for coupling the second finger drive voltage to finger drive electrode;
    wherein in the first phase, the first switch turns on, and the second switch turns off; and in the second phase, the first switch turns off, and the second switch turns on.

13. The sensing circuit of claim 7, wherein the conductor is an adjacent electrode plate adjacent to the electrode plate to be measured, and the adjacent electrode plate is arranged for sensing fingerprints.

14. The sensing circuit of claim 7, wherein the conductor is a protection electrode adjacent to the electrode plate to be measured, and the protection electrode is arranged for providing electrostatic discharge protection.

15. The sensing circuit of claim 14, further comprising:
    an electrostatic discharge protection circuit, coupled between the protection electrode and the second switch unit, the electrostatic discharge protection circuit comprising:
        a first diode, wherein an anode of the first diode is connected to the protection electrode, and a cathode of the first diode is connected to a first electric potential;
        a second diode, wherein an anode of the second diode is connected to a second electric potential less than the first electric potential, and a cathode of the second diode is connected to the protection electrode; and
        a resistive element, coupled between the protection electrode and the second switch unit, wherein a terminal of the resistive element is connected to the protection electrode, and another terminal of the resistive element is connected to the second switch unit.

16. The sensing circuit of claim 7, wherein the readout circuit comprises a buffer, and a single input terminal of the buffer is connected to the second node.

17. The sensing circuit of claim 7, wherein the readout circuit comprises:
    a differential circuit, having an inverting input terminal, a non-inverting input terminal and an output terminal, wherein the non-inverting input terminal is connected to the second node;

a capacitor, having a first terminal and a second terminal, wherein the first terminal is connected to the inverting input terminal, the second terminal is connected to ground, and the first terminal is selectively coupled to the second voltage;

wherein in the first phase, the first terminal is coupled to the second voltage; and in the second phase, the first terminal is uncoupled to the second voltage.

18. The sensing circuit of claim 7, wherein the readout circuit comprises:
a differential circuit, having an inverting input terminal, a non-inverting input terminal and an output terminal, wherein the inverting input terminal is coupled to the second voltage, and the non-inverting input terminal is connected to the second node.

19. The sensing circuit of claim 7, wherein the conductor is a shielding plate located below the electrode plate to be measured.

* * * * *